(12) United States Patent
Welton et al.

(10) Patent No.: US 9,195,699 B2
(45) Date of Patent: Nov. 24, 2015

(54) METHOD AND APPARATUS FOR STORAGE AND RETRIEVAL OF INFORMATION IN COMPRESSED CUBES

(75) Inventors: Caleb Welton, Malden, MA (US);
Ekrem Soylemez, Arlington, MA (US);
Albert A. Hopeman, Arlington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1758 days.

(21) Appl. No.: 10/913,143

(22) Filed: Aug. 6, 2004

(65) Prior Publication Data

US 2005/0065910 A1  Mar. 24, 2005

Related U.S. Application Data

(60) Provisional application No. 60/493,335, filed on Aug. 8, 2003.

(51) Int. Cl.
*G06F 17/30* (2006.01)

(52) U.S. Cl.
CPC .... *G06F 17/30333* (2013.01); *G06F 17/30489* (2013.01)

(58) Field of Classification Search
CPC .................. G06F 17/30333; G06F 17/30489
USPC ................................. 707/100, 711
See application file for complete search history.

(56) References Cited

U.S. PATENT DOCUMENTS

| | | | |
|---|---|---|---|
| 6,334,125 B1 * | 12/2001 | Johnson et al. | 707/3 |
| 2004/0193388 A1 * | 9/2004 | Outhred et al. | 703/1 |

* cited by examiner

*Primary Examiner* — Syling Yen
*Assistant Examiner* — Johnese Johnson
(74) *Attorney, Agent, or Firm* — Hickman Palermo Becker Bingham LLP; Marcel K. Bingham

(57) ABSTRACT

A method and data structure is described that builds summary information using processor time that is usually proportional to the size of input data and a depth of hierarchies for a plurality of attributes. The output of computation is stored in a smaller area by eliminating redundant storage and computation. An index is generated which includes tuples or rows that include lower bound values for each of the attributes, values of children of the lower bound values based on the hierarchies of the attributes, and coverage class indicators of the coverage classes of the children.

58 Claims, 55 Drawing Sheets

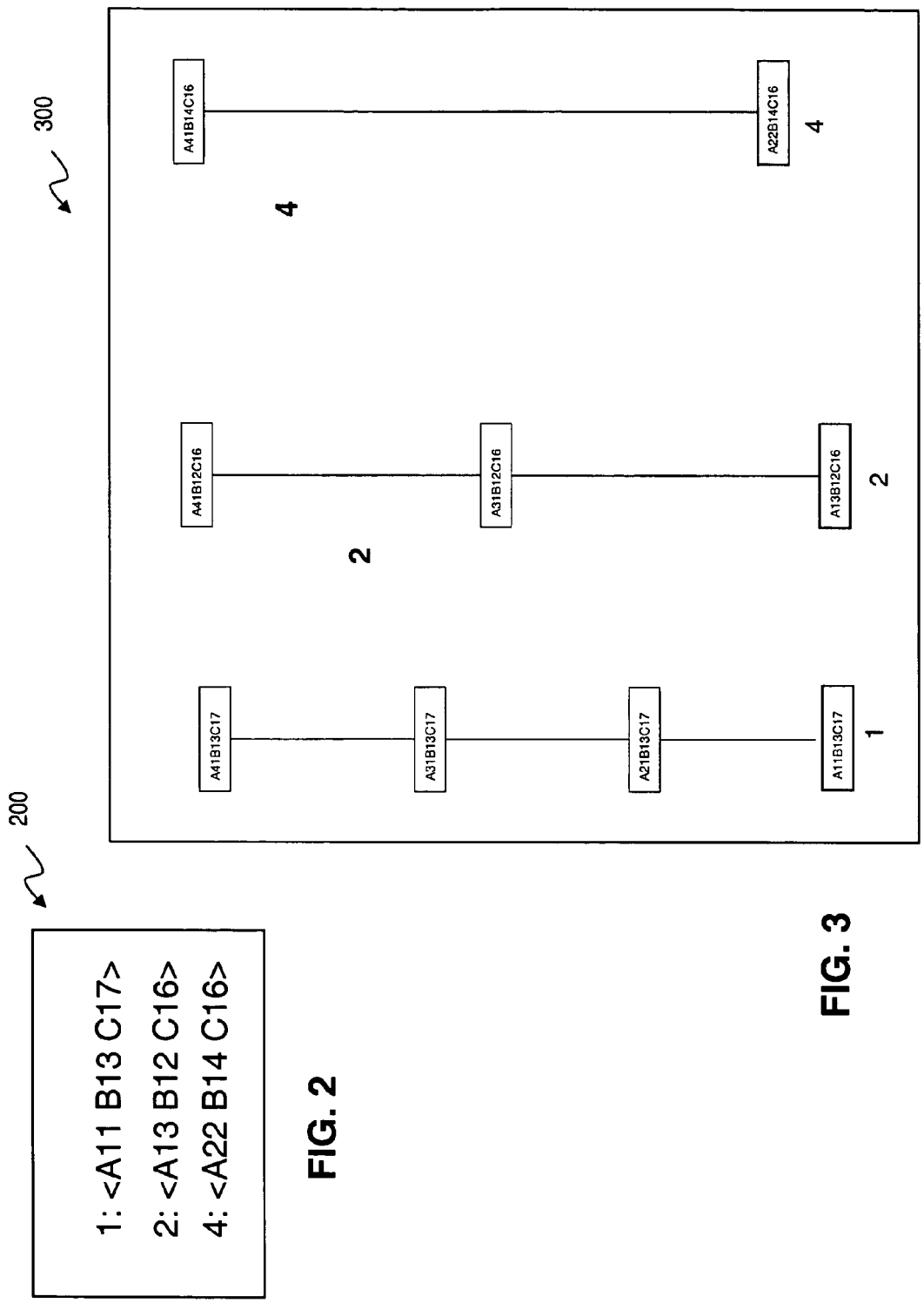

| Dimension A | Dimension B | Dimension C | Class # | Source Value |
|---|---|---|---|---|
| A11 | B13 | C17 | 1 | - |
| A13 | B12 | C16 | 2 | - |
| A22 | B14 | C16 | 4 | - |

| Dimension A | Dimension B | Dimension C | Class # | Source Value |
|---|---|---|---|---|
| A21 | B13 | C17 | 1 | A11 |
| A31 | B12 | C16 | 2 | A13 |
| A41 | B14 | C16 | 4 | A22 |

| Dimension A | Dimension B | Dimension C | Class # | Source Value |
|---|---|---|---|---|
| A31 | B12 | C16 | 2 | A21 |
| A31 | B13 | C17 | 1 | A13 [kept] |
| A41 | B14 | C16 | 4 | A22 [kept] |

| Dimension A | Dimension B | Dimension C | Class # | Source Value |
|---|---|---|---|---|
| A41 | B12 | C16 | 2 | A31 |
| A41 | B13 | C17 | 1 | A31 |
| A41 | B14 | C16 | 4 | A22 [kept] |

| Dimension A | Dimension B | Dimension C | Class # | Source Value |
|---|---|---|---|---|
| A41 | B21 | C16 | 2 | B12 |
| A41 | B21 | C17 | 1 | B13 |
| A41 | B22 | C16 | 4 | B14 |

```
A41  B31  C16  2        B21
A41  B31  C16  4        B22  ──┐ New →6: A41 B31 C16
A41  B31  C17  1        B21    ┘                ^  ^
                                           ? ? B21 B22
                                               2   4
```

| Dimension A | Dimension B | Dimension C | Class # | Source Value |
|---|---|---|---|---|
| A41 | B31 | C16 | 6 | - |
| A41 | B31 | C17 | 1 | B21 |

| Dimension A | Dimension B | Dimension C | Class # | Source Value |
|---|---|---|---|---|
| A41 | B31 | C23 | 6 | C16 |
| A41 | B31 | C24 | 1 | C17 |

| Dim A | Dim B | Dim C | Class # | Source Value |
|-------|-------|-------|---------|--------------|
| A41 | B31 | C31 | 6 | C23 |
| A41 | B31 | C31 | 1 | C24 ] New →7: A41 < ?? B31 < ?? C31 < C23 C24 |
| | | | | 6 1 |

|  | Dim A | Dim B | Dim C | Class # | Source Value |
|---|---|---|---|---|---|
|  | A41 | B12 | C31 | 2 | B21 |
|  | A41 | B13 | C31 | 1 | B21 |
| 3: | A41 | B21 | < |  |  |
|  | ? ? | B12 B13 |  |  |  |
|  |  | 2  1 |  |  |  |

Coverage Classes 4006

| S | C | P | M |
|---|---|---|---|
| S1 | C3 | P1 | 40 |
| S2 | C1 | P2 | 50 |
| S1 | C2 | P2 | 70 |
| S2 | C1 | P1 | 90 |
| S1 | * | * | 110 |
| * | * | P2 | 120 |
| * | * | P1 | 130 |
| * | * | * | 250 |

↑ Aggregate

4004

| S | C | P | M |
|---|---|---|---|
| S1 | C3 | P1 | 40 |
| S1 | C3 | * | 40 |
| S1 | * | P1 | 40 |
| * | C3 | P1 | 40 |
| * | C3 | * | 40 |
| S2 | C1 | P2 | 50 |
| S2 | * | P2 | 50 |
| * | C1 | P2 | 50 |
| S1 | C2 | P2 | 70 |
| S1 | C2 | * | 70 |
| S1 | * | P2 | 70 |
| * | C2 | P2 | 70 |
| * | C2 | * | 70 |
| S2 | C1 | P1 | 90 |
| S2 | * | P1 | 90 |
| * | C1 | P1 | 90 |
| S1 | * | * | 110 |
| * | * | P2 | 120 |
| * | * | P1 | 130 |
| S2 | C1 | * | 140 |
| S2 | * | * | 140 |
| * | C1 | * | 140 |
| * | * | * | 250 |

↑ cube(s,c,p)

4002

| S | C | P | M |
|---|---|---|---|
| S1 | C2 | P2 | 70 |
| S1 | C3 | P1 | 40 |
| S2 | C1 | P1 | 90 |
| S2 | C1 | P2 | 50 |

```
sb4    lower_bound[ndims];          /* Lower bound of the node */
sb2    nhiers;                      /* Number of Hierarchies in the node */
sb2    hier_children[nhiers];       /* Number of children in each hierarchy */
sb4    child_value[nchildren];      /* Value of each child */
sb4    child_node[nchildren];       /* Node index of each child */
```

Node: 1
```
lower_bound  = [A11 B13 C17]
nhiers       = 0
```

Node: 2
```
lower_bound  = [A13 B12 C16]
nhiers       = 0
```

Node: 4
```
lower_bound  = [A22 B14 C16]
nhiers       = 0
```

Node: 3
```
lower_bound    = [A31 B21 C31]
nhiers         = 2
hier_children  = [ 2  2 ]
child_value    = [A13 A21 B12 B13]
child_node     = [ 2   1   2   1 ]
```

Node: 3'
```
lower_bound    = [A31 B31 C31]
nhiers         = 1
hier_children  = [ 2 ]
child_value    = [A13 A21]
child_node     = [ 2   1 ]
```

Node: 6
```
lower_bound    = [A41 B31 C16]
nhiers         = 2
hier_children  = [ 2  2 ]
child_value    = [A22 A31 B21 B22]
child_node     = [ 4   2   2   4 ]
```

Node: 7
```
lower_bound    = [A41 B31 C31]
nhiers         = 3
hier_children  = [ 2  2  2 ]
child_value    = [A22 A31 B21 B22 C23 C24]
child_node     = [ 4   3'  3   4   6   1 ]
```

Example: A31   B21   C16

FIG. 42

Query for  A31   B21   C16

```
Query for   A31        B21        C16        C31
7:          A41        B31        C31        —
            ^          ^                     C23   —
            A22 A31    B21 B22    C23 C24    C16
            4   3'     3   4      6    1
```

FIG. 45 (4500)

```
Query for   A31        B21        C16
6:          A41        B31        C16
            ^          ^
            A31 A22    B21 B22
            2   4      2   4
```

```
Query for A31    C16

```
Query for A31    C16       B21       A31

| Class ID | Dim | DimVal | Node ID |
|---|---|---|---|
| 3 | A | A13 | 2 |
| 3 | A | A21 | 1 |
| 3 | B | B12 | 2 |
| 3 | B | B13 | 1 |
| 3' | A | A13 | 2 |
| 3' | A | A21 | 1 |
| 6 | A | A22 | 4 |
| 6 | A | A31 | 2 |
| 6 | B | B21 | 2 |
| 6 | B | B22 | 4 |
| 7 | A | A22 | 4 |
| 7 | A | A31 | 3' |
| 7 | B | B21 | 3 |
| 7 | B | B22 | 4 |
| 7 | C | C23 | 6 |
| 7 | C | C24 | 1 |

6904

| Class ID | Low A | Low B | Low C |
|---|---|---|---|
| 1 | A11 | B13 | C17 |
| 2 | A13 | B12 | C16 |
| 4 | A22 | B14 | C16 |
| 3 | A31 | B21 | C31 |
| 3' | A31 | B31 | C31 |
| 6 | A41 | B31 | C16 |
| 7 | A41 | B31 | C31 |

6902

Node 7 lower bound = [A41  B31  C31]

METHOD AND APPARATUS FOR STORAGE AND RETRIEVAL OF INFORMATION IN COMPRESSED CUBES

RELATED APPLICATIONS

The present application claims the benefit of U.S. Provisional Patent Application Ser. No. 60/493,335 filed on Aug. 8, 2003 entitled "Compressed Cube,", the contents of which are hereby incorporated by reference.

FIELD OF THE INVENTION

The present invention relates to database systems and more particularly to storage and retrieval of information in compressed cubes.

BACKGROUND OF THE INVENTION

Relational databases have become the dominant database technology for businesses to keep track of their sales, transactions, and other affairs. Designed for efficient selection, storage, and retrieval of data, relational databases are used to house large quantities of detailed data in data warehouses. The information housed in data warehouses can be analyzed to yield critical information about a business, such as sales trends and product line profitability, and can provide a critical edge in an increasingly competitive marketplace.

The data processing required to answer analytical questions is quite different from the data processing required to answer transactional questions. For example, while a transactional query might ask, "When did order 84305 ship?", an analytical query might ask, "How do sales in the Southwestern region for this month compare with plan or with sales a year ago?" The first question involves the selection and retrieval of data usually contained in a single row, but the second question involves inter-row calculations, time series analysis, and access to aggregated historical and current data. This data processing is known as online analytical processing (OLAP). An OLAP application is a computer program designed to access the company's raw data, aggregate the data into various summaries, and present the summaries to the company's data analysts. Various kinds of aggregations may be performed, and the most common include summation (e.g. totaling sales) and finding maximums and minimums.

Aggregation is a cornerstone operation frequently done in virtually all large data warehouses. When data is aggregated on many attributes or dimensions, however, the amount of summary data becomes much larger than the amount of detail data that was input. However, conventional attempts to perform aggregation require processor time that is proportional to the amount of summary data. Since the amount of summary data outweighs the input data, aggregation can become very expensive.

Sparsity is one way to characterize input detail data. Although the detail data can be characterized by values for a number of different attributes or dimensions, there may be many combinations of values that are not available (NA) in the detail data. Sparsity is typically measured in terms of the number of logical cells that have a non-NA value relative to the total size of a wireframe, which can be conceived as a space that encloses the possible attribute or dimensional values that the detail data can take. For example, if the wireframe has three attributes or dimensions with one hundred possible values in each attribute or dimension, there are one million possible cells. If a variable dimensioned by these three dimensions has 10,000 non-NA values, then the variable is 1% dense. If there were 100 such non-NA cells, then it would be 0.01% dense. If there were only one non-NA cell, it would be 0.0001% (or $10^{-4}$%) dense.

In traditional multidimensional database systems, data is stored as a linearized multi-dimensional array. The dimensions operate as the array indexes. In this format, any cell can be retrieved very quickly by simply computing the Cartesian product of the dimension offsets that correspond with the desired values and looking that value up in the linearized array. However, when the data is sparse, many of the cells in the array are NA (i.e., null). In these cases, long stretches of the stored array are empty. Thus, the space occupied by the data is dwarfed by the space occupied by null values.

Relational databases do not generally store data multi-dimensionally. Instead, data is stored in rows, with the value of each column explicitly included. Thus, if a fact table contains a list of dimensions and a measure, each row contains data values for each dimension and the measure. By contrast, only the measure is stored in the multidimensional data model, because the dimension values are implicit in the location that data is written to. Since relational databases do not store anything for dimension combinations that have no data, they are more efficient than purely multidimensional storage for somewhat sparse data.

When data is at least 20% dense, then purely multidimensional storage is usually the most efficient, as it does not store the dimension values. However, as data density decreases, the number of values stored on a physical page gradually decreases. Similar to the relational model, the multidimensional space can be compressed down to dimension combinations where data exists. This is done by constructing a B+ tree which stores the index values of the dimensions where data can be found. This mechanism is called composite dimensions (composites). Using a composite, several dimensions that are sparse relative to each other can be transformed into a much more dense space. This densification is accomplished by using a B+ tree to map the wireframe positions of the base dimensions to a single integer offset. Composite dimensions may perform well when the number of entries within the B+ tree does not grow large. Once the composite grows too large, there may be a sharp decrease in performance. For example, this decrease may occur once the composite grows beyond the tens of millions of physical entries.

As data becomes more sparse, every dimension may be placed in the composite, thus imposing a limit on the size of any variable within the system. In order to avoid bloating the composite, it may be desirable to include one or more dense dimensions. As variables become more sparse, this desire becomes increasingly impractical. An example of this phenomenon is changing time data from monthly to daily. Typically, monthly data is relatively dense so that the monthly data will often be outside the composite. However, daily data is usually relatively sparse, so it may be desirable to put time in the composite. Historically, composites have worked well with data that is at least $10^{-5}$% dense, although this number can vary greatly depending on the number and size of dimensions.

FIG. 1 illustrates a set of three hierarchies used as a working example, in which an "A" dimension 102 might correspond to region, a "B" dimension 104 to time, and a "C" dimension 106 to product classification. In the region hierarchy in the "A" dimension 102, position A11 may correspond to Pittsburgh, position A12 to Philadelphia, and position A13 to Washington, D.C. A21 is a more general level in the hierarchy and corresponds to Pennsylvania, and A31 is an even higher level of generality, e.g. the east cost, that includes Pennsylvania (A21) and Washington D.C. The highest level in this example, A41 would correspond to the USA and would include the east coast (A31) plus California (A22). This example includes skip-level (the hierarchy is missing values at intermediate levels (e.g. the city Washington D.C. at A13 has no state level aggregate), and ragged hierarchies, where the detail exists on different logical levels. An example is a company that tracks sales at the city level on the east coast and at the state level on the west coast. Thus, the hierarchy for the "A" dimension is both skip-level (A13 goes to A31) and ragged (A22 is not at the same level as A11, A12 and A13).

The "B" dimension 104 also has a defined hierarchy, in which the most general level is B31 for sales made at any time. Positions B21 and B22 may correspond to years (e.g. 2004 and 2003, respectively), and positions B11, B12, B13, and B14 to the months of January, February, March, and December, respectively. The hierarchy in the "C" dimension 106 is simpler, in which there are two product models C16 and C17 in two lines of products (C23 and C24, respectively). The C31 position corresponds to a company's products.

Within these hierarchies, familial relationships are implicit in the structure; for example, A11 may be viewed as a child of A21, as the grandchild of A31, and as a great-grandchild of A41. Similarly, A41 may be viewed as the parent of A31 and A22, the grandparent of A21 and A13, and the great-grandparent of A11 and A12. Using graph theory terminology, A11 is connected to A21 via a single edge connection, i.e., a child is connected to its parent in the hierarchy via a single edge connection. Additionally, A41 is at a top level of the A hierarchy 102, and A11, A12, and A13 are all on a same level, which may be called a leaf level. A top-down path from A41 to A12 navigates the nodes A41, A31, A21, and A12, in order from the top of the hierarchy down, following edges connecting the respective nodes. A bottom-up path from A11 to A41 navigates the nodes A11, A21, A31, and A41, in order from the bottom of the hierarchy up.

A roll-up operation on the A hierarchy 102 navigates the nodes in a strict bottom-up direction, following the edge connecting a particular child node to its respective parent node (e.g., from A12 to A21 to A31 to A41). A drill down operation on the hierarchy navigates the nodes in a strict top-down direction, following the edge connecting a particular parent node to one of its respective children nodes (e.g., from A41 to A31 to A13). Without loss of generality, the hierarchy structure may be inverted so that the relationships and operations are described in a reverse manner.

FIG. 2 depicts three input rows 200 for the example. Each row is defined by a "tuple" that includes a position from each dimension. For example, input row <A11 B13 C17> includes a position A11 in the "A" dimension (e.g., Pittsburgh, Pa., of the east coast), position B13 in the "B" dimension (e.g. March 2004), and position C17 to product model C17. The number on the left-hand side of each row represents a measure value can be assigned to the input row. These exemplary measure values are chosen to illustrate which input rows produced which aggregate value, but in practice, measures correspond to information that a business measures, for example, to the amount of sales in thousands of dollars for a particular product in a corresponding city and month.

One exemplary operation involved in aggregating data is "roll up." For each of the input rows a new row for each logical position is produced to represent data at this location. A new row is stored whether or not it produced a new aggregation value. Thus, the output value is stored even if it is identical to the input. This is done by processing each hierarchy in turn in order to produce the aggregation path.

FIG. 3 depicts the creation of new rows 300 by rolling up the A hierarchy. For this example, no new values are produced. Thus, for the 6 new rows produced, each has the same value as the row from which it was derived. The operation thus consumed time and space but produced no new information.

FIG. 4 depicts a rollup 400 on the B hierarchy. This aggregation is performed on the rows produced by rolling up the A hierarchy as well as the input rows. Again, after producing 17 new rows, only one (A41, B31, C16) has a new value (6). All of the other rows still have the same value as the input row from which they were derived, as only the "6" cell has more than one immediate child in the join hierarchy. All others represent the rollup of one child into its parent.

FIG. 5 depicts a rollup 500 on the C hierarchy. The additional blocks indicate rows that are produced by rolling up the C hierarchy. This rollup produces several new aggregates, as indicated by the nodes labeled with "3" and "7." However, several times, multiple children were independently aggregated into the value 3 (e.g., <A31, B21, C31>, <A31, B31, C31> and <A41, B31, C31>). In FIG. 6, these nodes (indicated by the dotted box) were all aggregated from the same leaf nodes (1 and 2). However, even though the number is and will be identical, the addition of 1 and 2 is done multiple times, because the immediate children of each "3" node are different.

Thus, the three input rows produced a large number of new rows, but there was relatively little actual aggregation. Most new rows were generated from one input row, so required no addition. Three input rows produced 75 final output rows. In FIG. 6, it can be seen that these 75 rows can be broken into six regions where every row in a region shares the same value. Regions 6, 7, and 3 are the regions produced by aggregation. In region 3, three points of aggregation all produce the same value. The lowest point in a region where aggregation occurs is called a lower bound. In region 6, the lower bound is represented by the tuple <A41 B31 C16>.

Current OLAP customers are pushing towards data models that are larger and more sparse than can be efficiently supported by many conventional products. The observation of redundancy inherent when extremely sparse data is rolled up in a multidimensional space has been a topic in many research circles. Recent research has leaned toward avoiding storing or logically differentiating these redundant tuples. For example, "Quotient Cube: How to summarize the semantics of a data cube," describes how an aggregated cube can be reduced to a series of classes that describe an entire aggregated cube with a fraction of the storage. If many of the values in the aggregate space repeat, an index of repeating values can be created in a logically contiguous region of a "cube lattice" and only store a single value. The build time for the structures described in the paper, however, includes a "brute force" approach which requires excessive processing resources and would accordingly not be feasible in business environments.

Therefore, there is a need for data processing of large amounts of sparse detail data that does not require infeasible amounts of processing time.

SUMMARY OF THE INVENTION

This and other needs are addressed by the present invention by reducing redundant storage and computation with methods and data structures that build summary information using processing time that is usually proportional to the input data and the depth of hierarchies. For many data warehouses, this is faster than conventional mechanisms. Some tests using realistic data sets have shown performance improvements 10 to 100 times faster than conventional techniques.

The present invention stems from the realization that a major factor contributing to aggregate bloat at very low densities is that many higher levels of generality in an aggregation hierarchy (e.g., at the month level instead of the day level) may often include aggregate data for no more than one descendant node at the leaf level. Aggregation of the data then causes redundant physical rows to be added to a table, one for each combination of parent values with the same single descendant leaf. Each of these new tuples (of the rows keys) represents a different combination of parent attribute or dimension values, but contains the same data value as the corresponding leaf. For the standard table, which may have up to 7 or 8 base attributes or dimensions key columns with aggregation hierarchies, these redundant parent rows can end up taking many times the storage of the leaf rows whose data values they duplicate.

Methods, systems, and articles of manufacture consistent with the present invention dispense with the storage of redundant parent rows, instead storing each distinct data value only once, or at most a very small number of times. Each such distinct value, along with information about which ancestor tuples the value applies to, will define what is known as a "coverage class." The ancestor tuples within a coverage class are virtual, and can be derived at need by special-purpose looping or point-access algorithms. This technology provides for very fast aggregation and very lean storage of very large and sparse data. It may not work well if data is too dense, but it performs orders of magnitude faster than normal tables if data is sparse.

A method of generating an index for a body of data is disclosed. The method receives a plurality of values associated with a plurality of respective attributes characterized by a plurality of respective hierarchies. A parent entry in the index to include a plurality of bounds associated respectively with the values and located at respective positions within the respective hierarchies is generated. A child position associated with one of the bounds and located at a first position in one of the respective hierarchies is determined, wherein the child position is strictly included within the one of the bounds within the one of the respective hierarchies. A child entry in the index to include a child bound that is located at a second position in the one of the respective hierarchies is generated, wherein the child bound is strictly included within the one of the bounds within the one of the respective hierarchies, and the child position is stored in association with the parent entry and the child entry.

A computer-readable medium bearing an index for a body of data defined by a plurality of attributes, the attributes characterized by respective hierarchies, is disclosed. The index comprises a first indicator of a parent coverage class, wherein the parent coverage class specifies a plurality of parent bounds, each of the parent bounds located in one of the hierarchies characterizing the attributes. The index further comprises a child position within one of the hierarchies for a corresponding one of the attributes, wherein the position is strictly included in one of the parent bounds specified for the corresponding one of the attributes; and a second indicator of a child coverage class, wherein the child coverage class specifies a plurality of child bounds, each of the child bounds located in one of the hierarchies characterizing the attributes.

A method of searching for an item using an index for a body of data defined by a plurality of attributes, said attributes characterized by respective hierarchies is disclosed. The method compares a value of the item in a first attribute with a first attribute lower bound value associated with a first node of the index. If the value of the item in the first attribute is lower in the hierarchy of the first attribute than the first attribute lower bound value associated with the first node of the index, then it is determined whether a child value of the first attribute lower bound value associated with the first node of the index is included in a path from the value of the item in the first attribute to the first attribute lower bound value associated with the first node of the index based on the hierarchy of the first attribute. If the child value is included in the path, the value of the item in the first attribute is compared with a first attribute lower bound value associated with a second node of the index, based on an indicator of a coverage class associated with the child value included in the first node of the index.

A method of traversing a body of data defined by a plurality of attributes, the attributes characterized by respective hierarchies, using an index, is disclosed. The method initializes an array on each one of the plurality of attributes based on a lower bound value of each attribute which is associated with a child node of a plurality of nodes included in the index, and a path from each lower bound value of the child node to a value of a parent node lower bound value in each of the respective hierarchies, wherein the child node is determined by accessing a child coverage class indicator associated with the parent node, and generates a cross product of rows based on the array on each one of the plurality of attributes.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 depicts exemplary input rows for building an index according to an embodiment of the present invention;

FIG. 3 depicts exemplary creation of new rows by rolling up a hierarchy according to conventional SQL groupby rollup techniques;

FIG. 12 depicts an exemplary in-memory data structure used to perform aggregation according to an embodiment of the present invention;

FIG. 13 depicts pushing up 1 level in the A hierarchy, sorting new rows, and identifying new classes according to an embodiment of the present invention;

FIG. 14 depicts a state of the building process in which a cell is not moved up the hierarchy until the other rows match the same height, according to an embodiment of the present invention;

FIG. 15 depicts reaching the top of the A hierarchy without having any matching rows according to an embodiment of the present invention;

FIG. 17 depicts rolling up the B hierarchy according to an embodiment of the present invention;

FIG. 18 depicts an aggregation occurring when two rows match according to an embodiment of the present invention;

FIG. 22 depicts multiple input cells in the worklist replaced with a single cell from a new class according to an embodiment of the present invention;

FIG. 23 depicts processing the C hierarchy when the top of the B hierarchy is reached according to an embodiment of the present invention;

FIG. 24 depicts matching rows after pushing up a level of the C hierarchy according to an embodiment of the present invention;

FIG. 28 depicts recursive descent of the B hierarchy for coverage class 3 according to an embodiment of the present invention;

FIG. 40 depicts aggregating a 4 row input table according to an embodiment of the present invention;

FIG. 41 depicts an exemplary data structure used for leaf nodes to store coverage class information according to an embodiment of the present invention;

FIG. 42 depicts processing for a point query of the index according to an embodiment of the present invention;

FIG. 43 depicts analyzing coverage class 7 to determine children of a cell value according to an embodiment of the present invention;

FIG. 44 depicts using the C hierarchy to trace the path from one cell value to another according to an embodiment of the present invention;

FIG. 45 depicts determining a lower bound of the C hierarchy in coverage class 6 according to an embodiment of the present invention;

FIG. 46 depicts a determination that coverage class 2 needs to be drilled using the B hierarchy according to an embodiment of the present invention;

FIG. 47 depicts a determination that the correct coverage class has been reached according to an embodiment of the present invention;

FIG. 49 depicts producing output rows using dimension arrays according to an embodiment of the present invention;

FIG. 51 depicts beginning a traversal of the index according to an embodiment of the present invention;

FIG. 52 depicts producing a Cartesian product of arrays according to an embodiment of the present invention;

FIG. 53 depicts processing in a next child according to an embodiment of the present invention;

FIG. 54 depicts a depth first search from coverage class 7 to coverage class 6 according to an embodiment of the present invention;

FIG. 55 depicts drilling down children starting with the most significant hierarchy greater than or equal to the hierarchy that was drilled down to reach this point according to an embodiment of the present invention;

FIG. 56 depicts a state wherein processing is at the bottom of the C hierarchy according to an embodiment of the present invention;

FIG. 57 depicts a state of processing at coverage class 6 according to an embodiment of the present invention;

FIG. 58 depicts expanding the B and A arrays based on the drill path between the upper and lower bounds according to an embodiment of the present invention;

FIG. 59 depicts drilling down the A hierarchy according to an embodiment of the present invention;

FIG. 60 depicts drilling down the A hierarchy without expanding the array between the lower and upper bounds of the B hierarchy according to an embodiment of the present invention;

FIG. 63 depicts returning processing to the parent according to an embodiment of the present invention;

FIG. 64 depicts returning to coverage class 7 according to an embodiment of the present invention;

FIG. 65 depicts drilling down the B hierarchy according to an embodiment of the present invention;

FIG. 66 depicts drilling down the B hierarchy according to an embodiment of the present invention;

FIG. 68 depicts a list of 75 rows produced by a traversal of the exemplary index according to an embodiment of the present invention;

FIG. 69 depicts compressed cube access structures stored within a relational database according to an embodiment of the present invention.

DESCRIPTION OF THE PREFERRED EMBODIMENT

Figure 1:
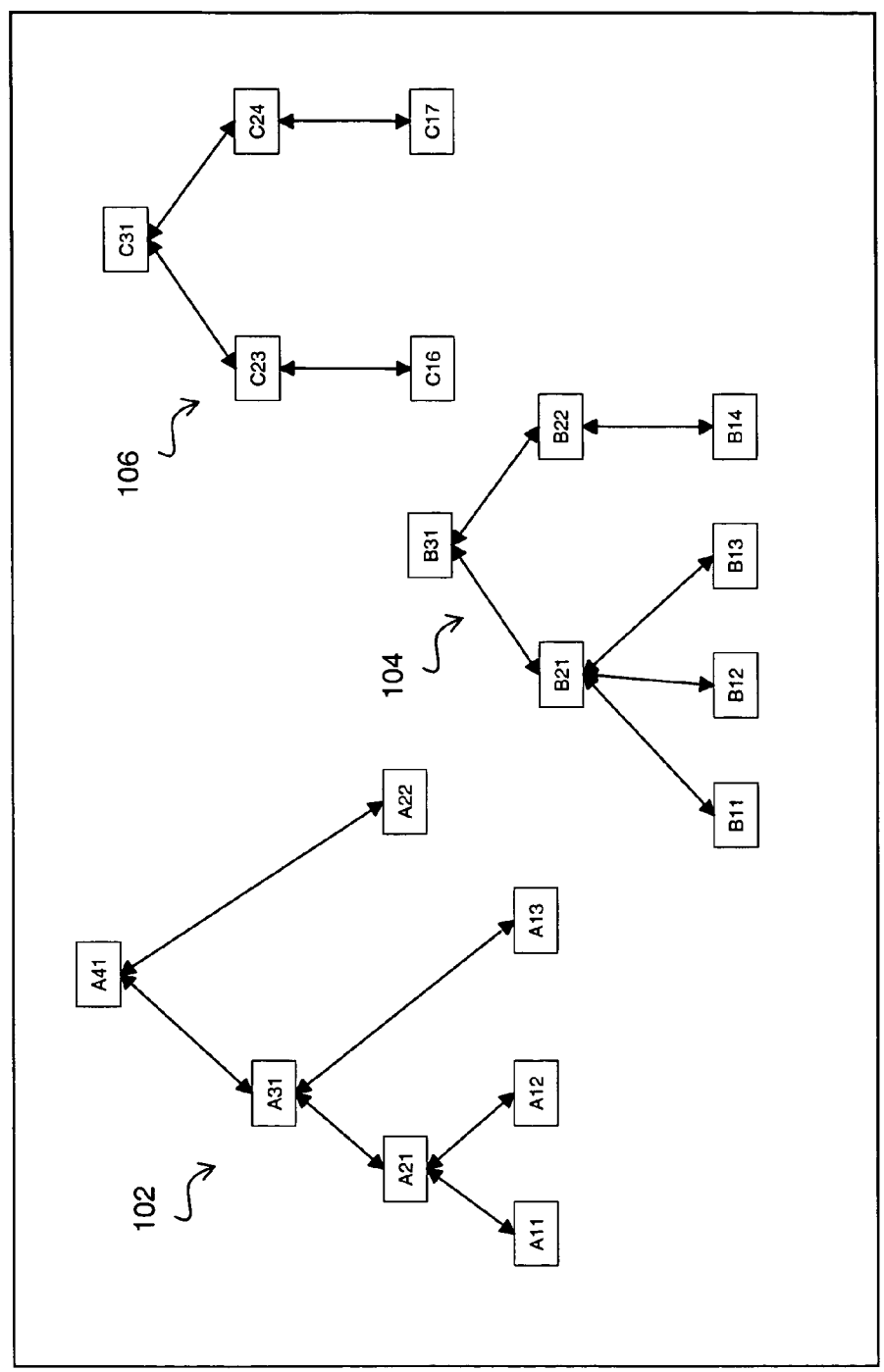
FIG. 1 depicts exemplary hierarchies of data.
Figure 4:
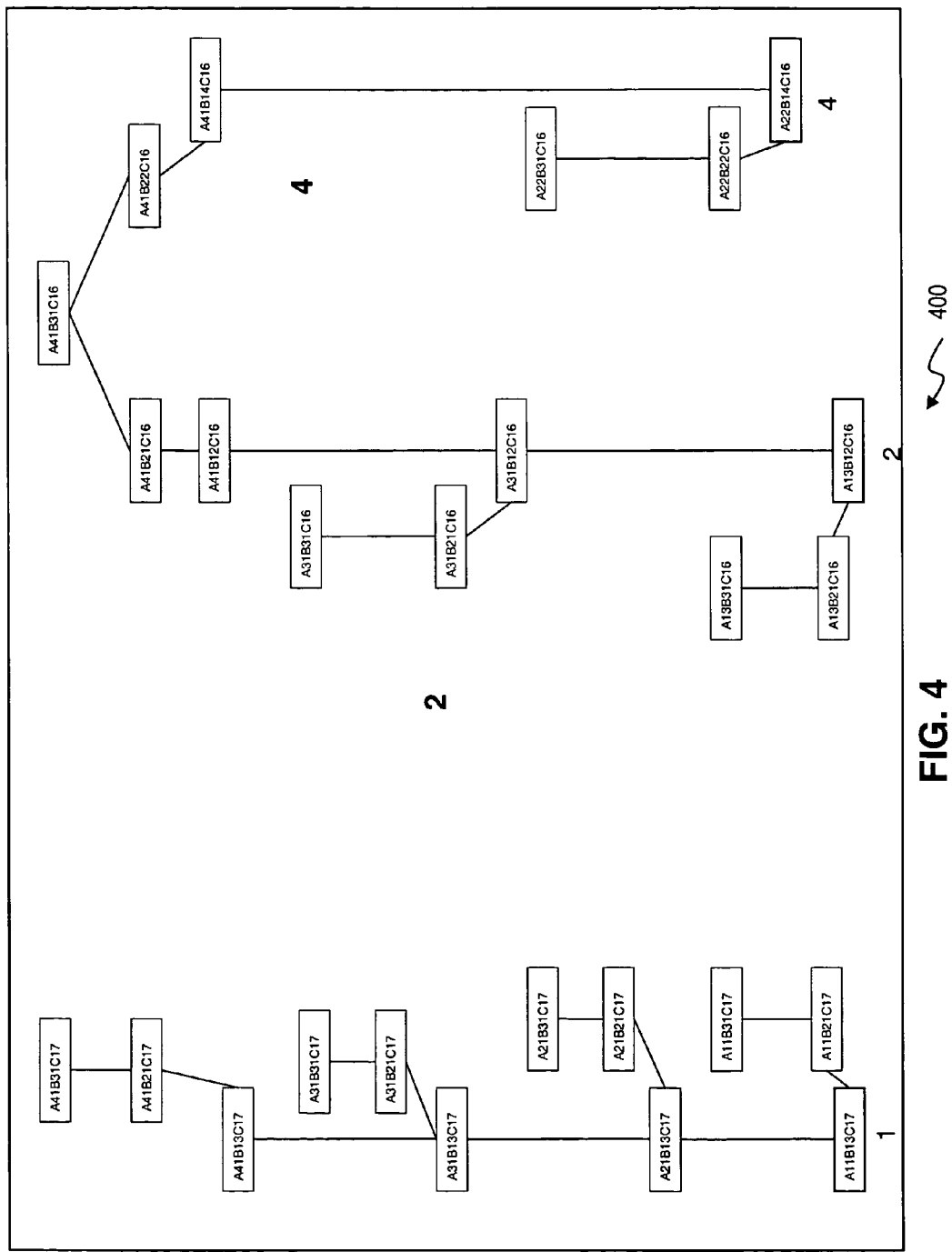
FIG. 4 depicts a rollup on the B hierarchy according to conventional SQL groupby rollup techniques.

A system, method, and software for building and searching a compressed cube index for a database represented using cubes are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Furthermore, the operation of an embodiment of the present invention is illustrated with respect to a particular working example. It is to be understood, however, that the present invention is not limited to the particular working example or even the number of the attributes or dimensions in the working example, but can be profitably applied to a wide variety of input data, attributes or dimensions, and hierarchies.

In a database management system, data is stored in one or more data containers, each container contains records, and the data within each record is organized into one or more fields. In relational database systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

A record may be conceptualized as a representation of an entity characterized by multiple attributes, such that the record includes, for each of the attributes, values associated with the represented entity. For example, the entity may be a person characterized by the attributes last name, first name, address, social security number, title within company, age, height, and salary. Thus, a record for Mary Smith may include values for each of these attributes which correspond to Mary Smith. As another example, the entity may be a product produced by a corporation, characterized by the attributes region, time, and product classification, for determining information regarding sales of the products of the corporation. For either of these examples, the attributes may be conceptualized as dimensions in multidimensional space, with the individual records conceptualized as points in the multidimensional space. An attribute is not necessarily explicitly characterized by a hierarchy, however; a hierarchy may be implied (e.g., a top level includes all the attribute values) or explicit (e.g., a product classification may explicitly include a predefined hierarchy of geography for countries, sales region, and store).

Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

Conceptual Overview

Figure 5:
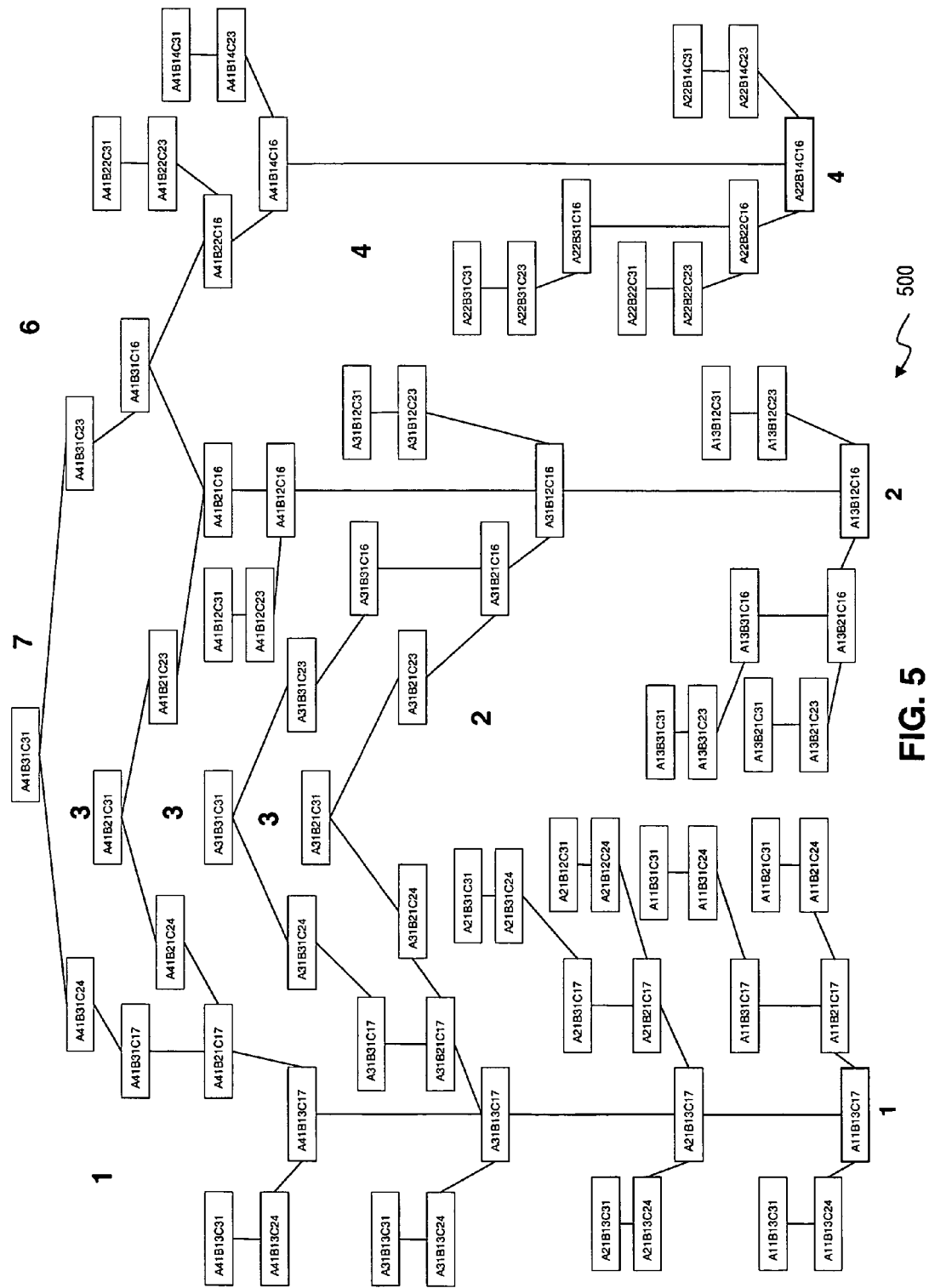
FIG. 5 depicts a rollup on the C hierarchy according to conventional SQL groupby rollup techniques.
Figure 6:
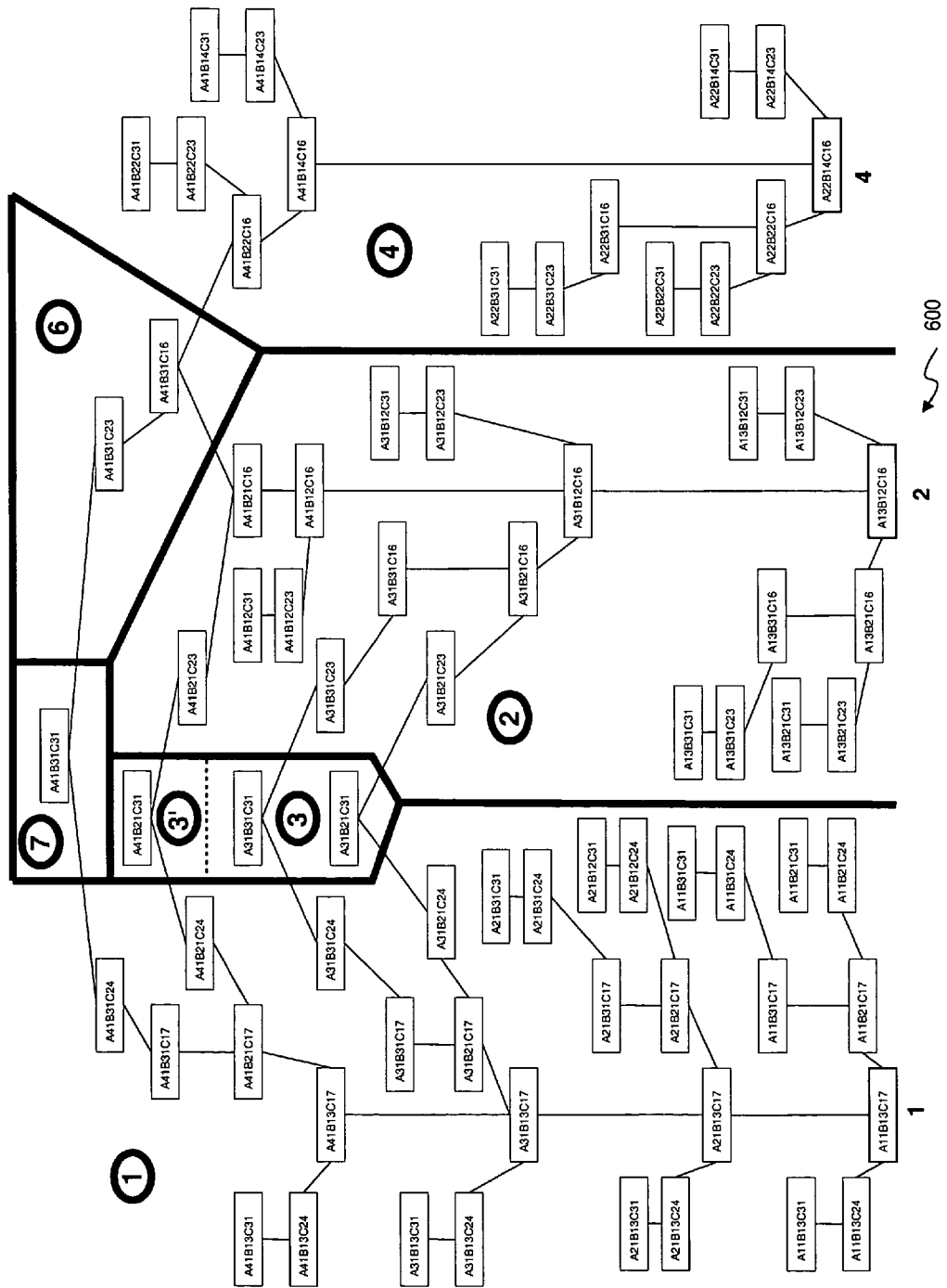
FIG. 6 depicts rows produced from the three exemplary input rows.

FIG. 6 depicts 75 rows produced in FIG. 5 from the three exemplary input rows to present six unique values. In FIG. 6 the aggregate space 600 is divided into regions where the value is the same. Each of these regions is a single row and yields a "compressed cube index" to indicate which other rows each single row represents. Each row in the compressed cube index corresponds to a coverage class, which describes a set of tuples such that each of the dimensional values of the tuples in the coverage class fall within a particular position in the predetermined hierarchy of each dimension. Thus, a coverage class generally corresponds to a node in the index that describes a single row (with a single aggregate value) and also describes which other rows have that same value.

One feature of the build process is maintenance of a constant memory footprint, thus enabling pre-allocation of pages from a buffer cache or allocation of memory that is constant for the life time of the aggregation process. The memory footprint is proportional to the number of input rows.

Each step of building the index has two phases. First, the hierarchy on the outer edge of the cube is rolled up. An edge of the cube may be interpreted as an extreme outside portion of the dimensional wireframe. After the edge is rolled up, if new coverage classes were created, the hierarchy is traversed downward in an operation referred as a "drill down" to determine if there are intermediate coverage classes and to establish a lower bound in the hierarchy with this value (e.g., the lowest point in the hierarchy with this value). The reason this is performed is that most aggregation occurs towards the top of a hierarchy.

Figure 7:
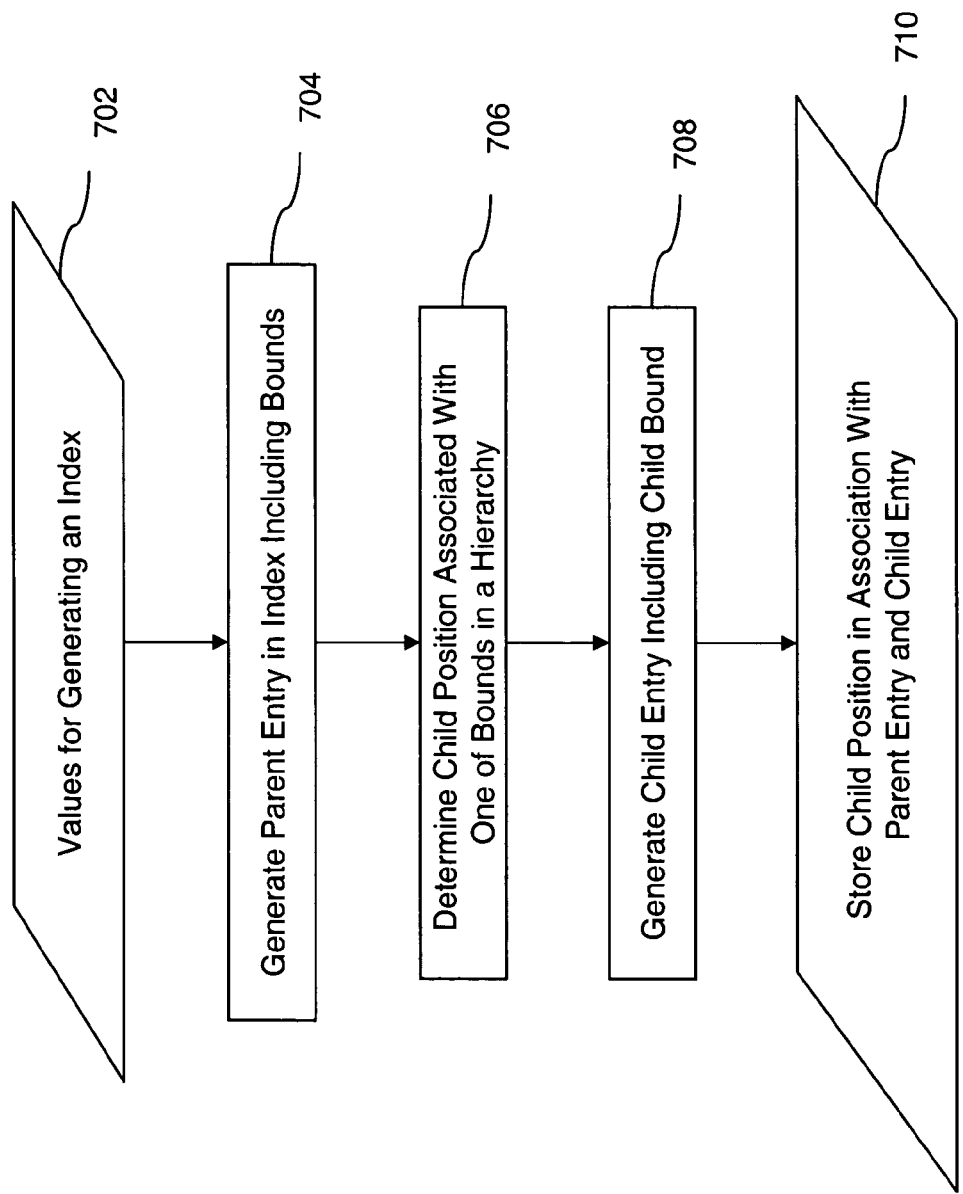
FIG. 7 depicts a flow of steps for generating an index according to an embodiment of the present invention.

FIG. 7 illustrates exemplary steps taken to generate an index. At step 702, a plurality of values associated with a plurality of respective attributes characterized by a plurality of respective hierarchies is received. The plurality of values may, for example take the form of tuples, or rows. At step 704, a parent entry in the index to include a plurality of bounds associated respectively with the values and located at respective positions within the respective hierarchies is generated. At step 706, a child position associated with one of the bounds and located at a first position in one of the respective hierarchies is determined. The child position is strictly included within the one of the bounds within the hierarchy. At step 708, a child entry to include a child bound that is located at a second position in the one of the respective hierarchies is generated. The child bound is strictly included within the one of the bounds within the one of the respective hierarchies. At step 710, the child position is stored in association with the parent entry and the child entry.

Figure 8:
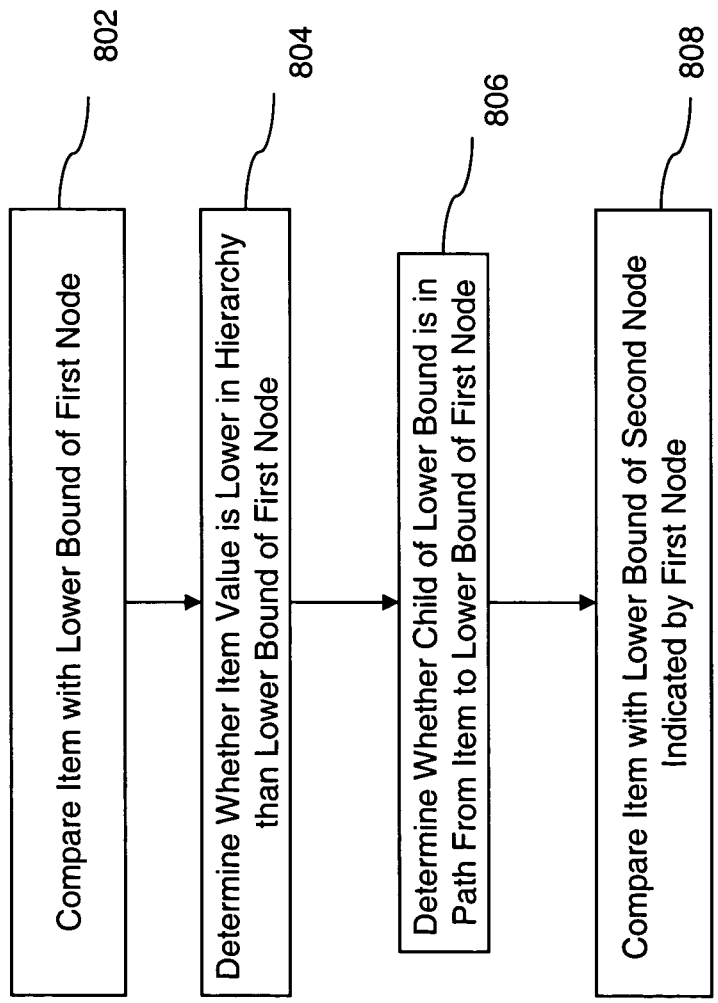
FIG. 8 depicts a flow of steps for searching an index according to an embodiment of the present invention.

FIG. 8 illustrates exemplary steps taken to search for an item in the index when a request is received, or a need is recognized, for searching for the item by using the index. At step 802, a value of the item in a first attribute is compared with a first attribute lower bound associated with a first node of the index. At step 804, a determination is made whether the value of the item in the first attribute is lower in the hierarchy of the first attribute than the first attribute lower bound associated with the first node. At step 806, a determination is made whether a child value of the first attribute lower bound is included in a path from value of the item in the first attribute to the first attribute lower bound. At step 808, the item value in the first attribute is compared with a first attribute lower bound value associated with a second node of the index indicated by the first node, e.g., a child value in a child coverage class based on an indicator of the child coverage class which is stored with the node information in the first node.

Figure 9:
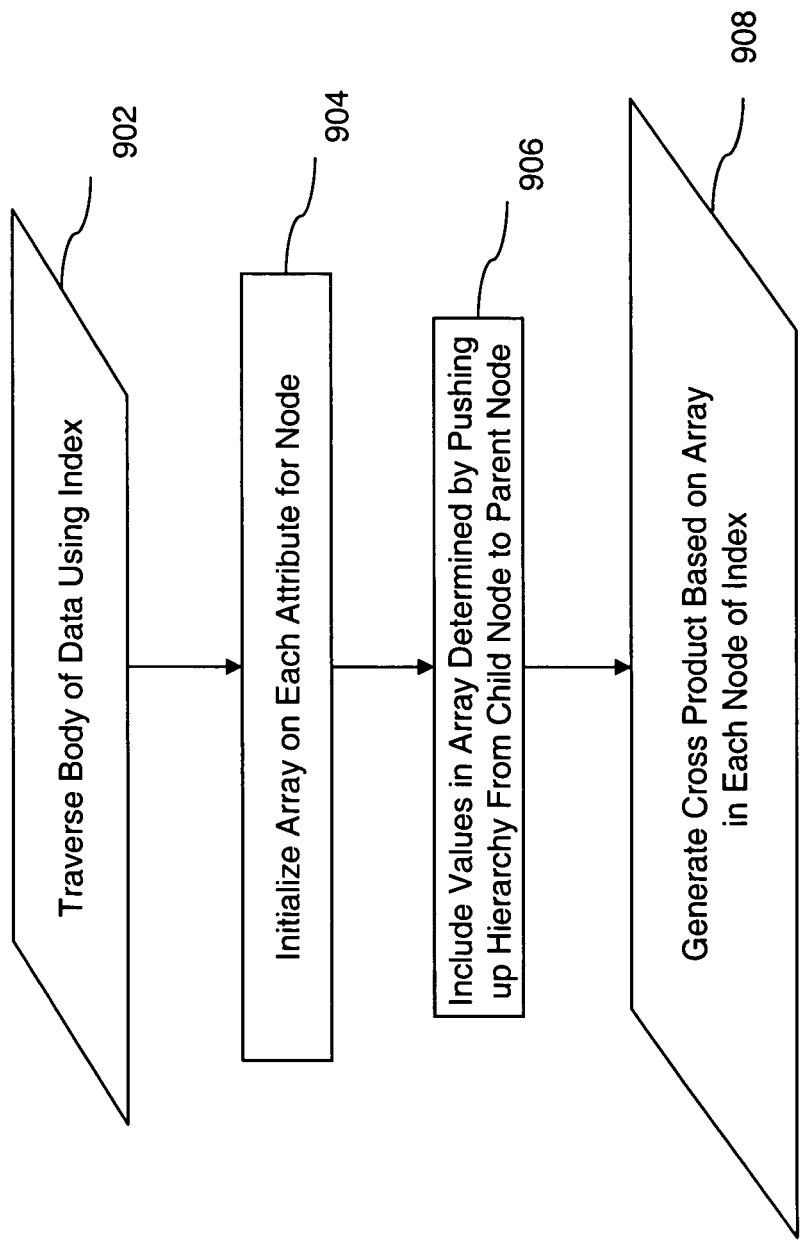
FIG. 9 depicts a flow of steps for traversing an index according to an embodiment of the present invention.

FIG. 9 illustrates exemplary steps taken for traversing a body of data using the index. At step 902, a request is received, or a need is recognized, for traversing the body of data, or visiting all points in a cube. At step 904, an array is initialized on each attribute or dimension for a node in the index. At step 906, values are included in the array by pushing up the hierarchy of an attribute from the node viewed as a child node to a parent node of the child node. At step 908, a cross product of the array values is generated based on that array for each attribute or dimension in each node of the index. When the first node of the index is processed, there is no parent node, and thus the array is initialized using single values.

Figure 10:
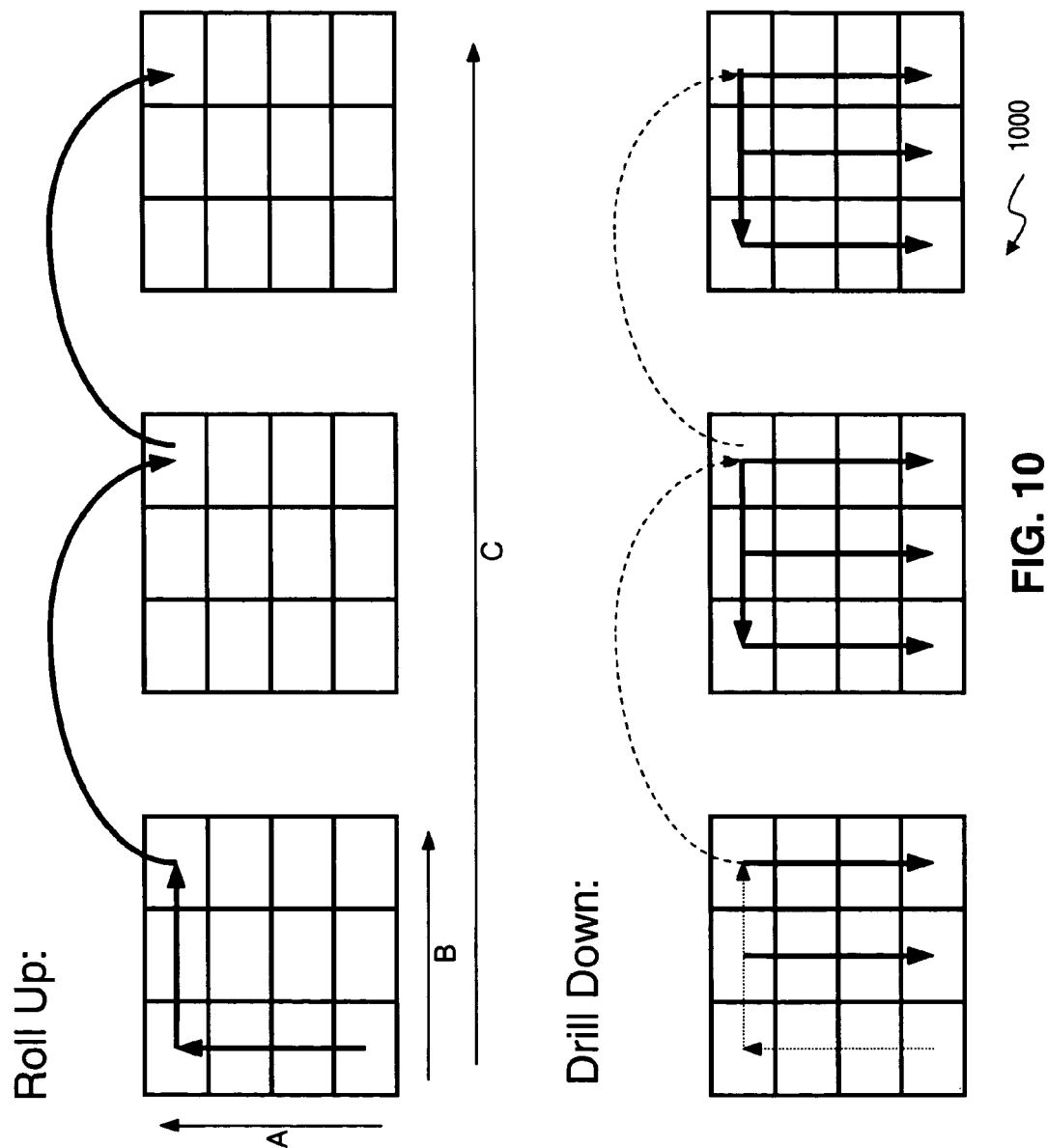
FIG. 10 depicts an overview of a cube traversal while computing aggregates.

FIG. 10 depicts an overview 1000 of traversing a cube while computing aggregates. The vertical direction represents aggregation up the A hierarchy. The horizontal arrows represent aggregation up the B hierarchy. The arrows jumping from box to box represent aggregation up the C hierarchy (e.g., as a 2D rendering of aggregation in the Z axis). Each box represents a level intersection between the 3 hierarchies. In relational terminology, each box represents a grouping set.

The top row of boxes illustrates aggregating up the outside edge of the cube. The bottom row of boxes shows drilling down from those points to detect new coverage classes in the interior of the cube.

Figure 11:
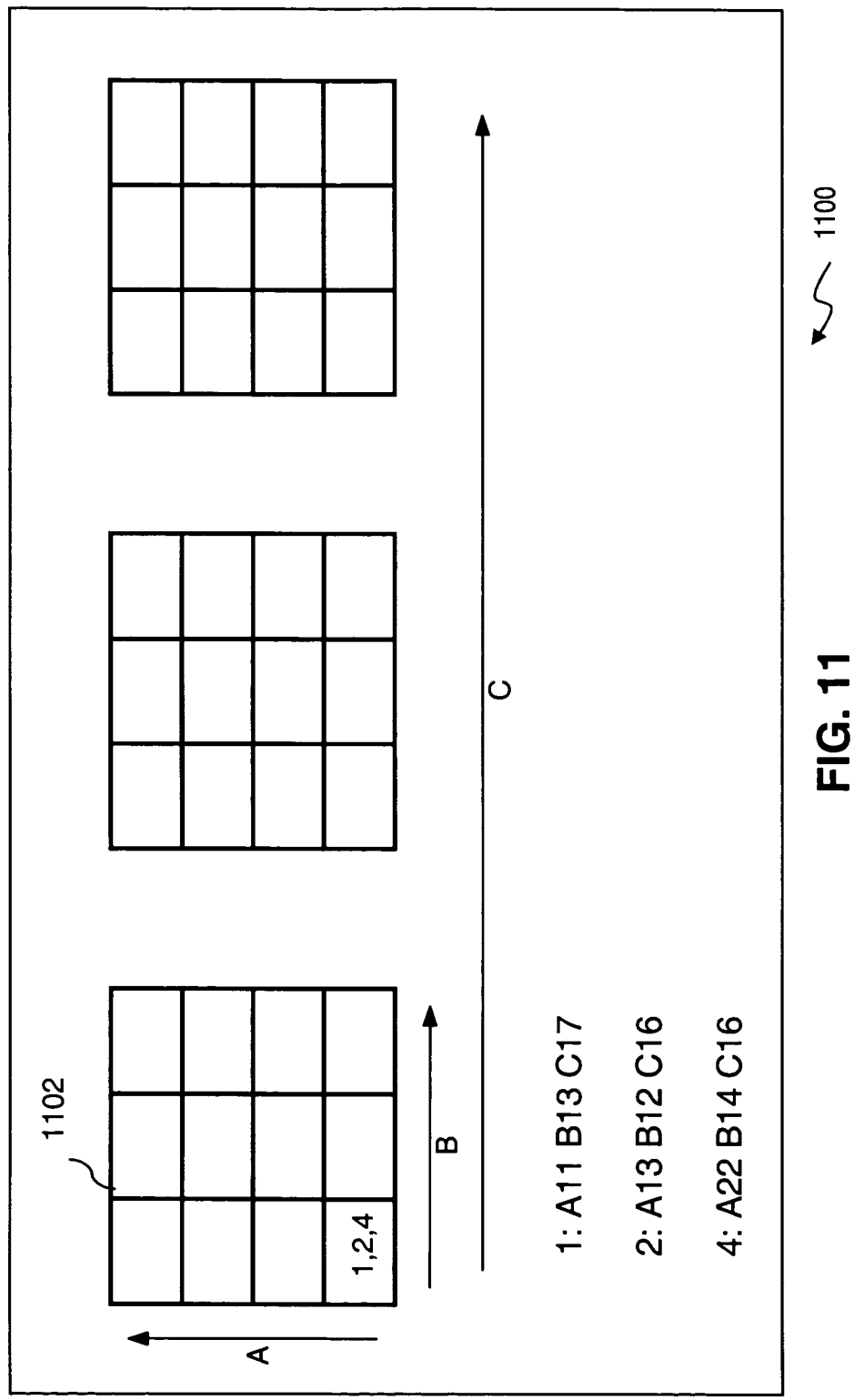
FIG. 11 depicts an exemplary index at the beginning of an exemplary aggregation according to an embodiment of the present invention.

An exemplary aggregation 1100 of the example data set is accomplished by starting with the 3 input rows, represented by the values 1, 2, and 4 in the lower left hand corner of a left most box 1102 of FIG. 11. At the bottom of FIG. 11 the input rows are shown preceded by their values. Each of these rows is a coverage class, since they all evolve from a different input row. One coverage class represents one or (as is typical) more rows. The coverage classes are held together in the compressed cube index. For purposes of description of the exemplary process, the index structure is built up in rounds. Each depiction of the index shows the index as it is at that point in the processing, thus indicating the persistent (e.g., on-disk) structure of the compressed cube dimension.

FIG. 12 depicts an exemplary in-memory data structure 1200 used to perform the aggregation. The first 4 columns enumerate a dimension member for each dimension and a value indicating the input coverage class. The final column is used to denote which value was used as the source of each row. Since these rows are input data, the initial value shown in the final column is null.

For the present example, the lower bounds of the three input classes are loaded into the processing buffer as tuples including class number and source value. During processing these tuples will be pushed upwards ultimately to the class's upper bound and then to the lower bound of the parent class.

The build process starts by stepping up the hierarchies one attribute or dimension at a time. To do this, the initial value of attribute or dimension A is determined, and replaced with its parent in the hierarchy, thus pushing 1 level up the A hierarchy, sorting the new rows and identifying new classes. Consequently, A11 becomes A21 and so on. Now the source value is set to the attribute or dimension member from which this started. For instance, the row A21, B31, C17 now has a source value of A11 since that was the original value of the A column, as shown in FIG. 13. If aggregation were going to occur (e.g., 2 rows were added together) two matching rows with identical attribute or dimension values would result. Since none of the rows match, no addition occurs. As shown in FIG. 13, processing pushes 1 level up the A hierarchy, sorts the new rows 1300 and identifies new classes. A new class is indicated by matching rows, but at this point there are no new classes.

As discussed previously, for this example, the A hierarchy is the most complex—both skip level and ragged. When processing is begun, the maximum height in the hierarchy of each dimension member is noted. If a cell is already at a higher height (e.g., because of skip-level hierarchies) than its neighbors, that cell is not moved up the hierarchy until the other rows match the same height, thus maintaining the current value of the row, as shown in the structure 1400 of FIG. 14. For every value of a dimension, its depth is known. If the current value of a cell is above the current depth, then it is kept, otherwise its parent is added.

As shown in the structure 1500 of FIG. 15, after continued pushing, the top of the A hierarchy is reached without having any matching rows (i.e., they all differed in the B and C columns). Thus, no aggregation occurred. The top of the A hierarchy is reached with no new classes, and now the next hierarchy is processed.

Figure 16:
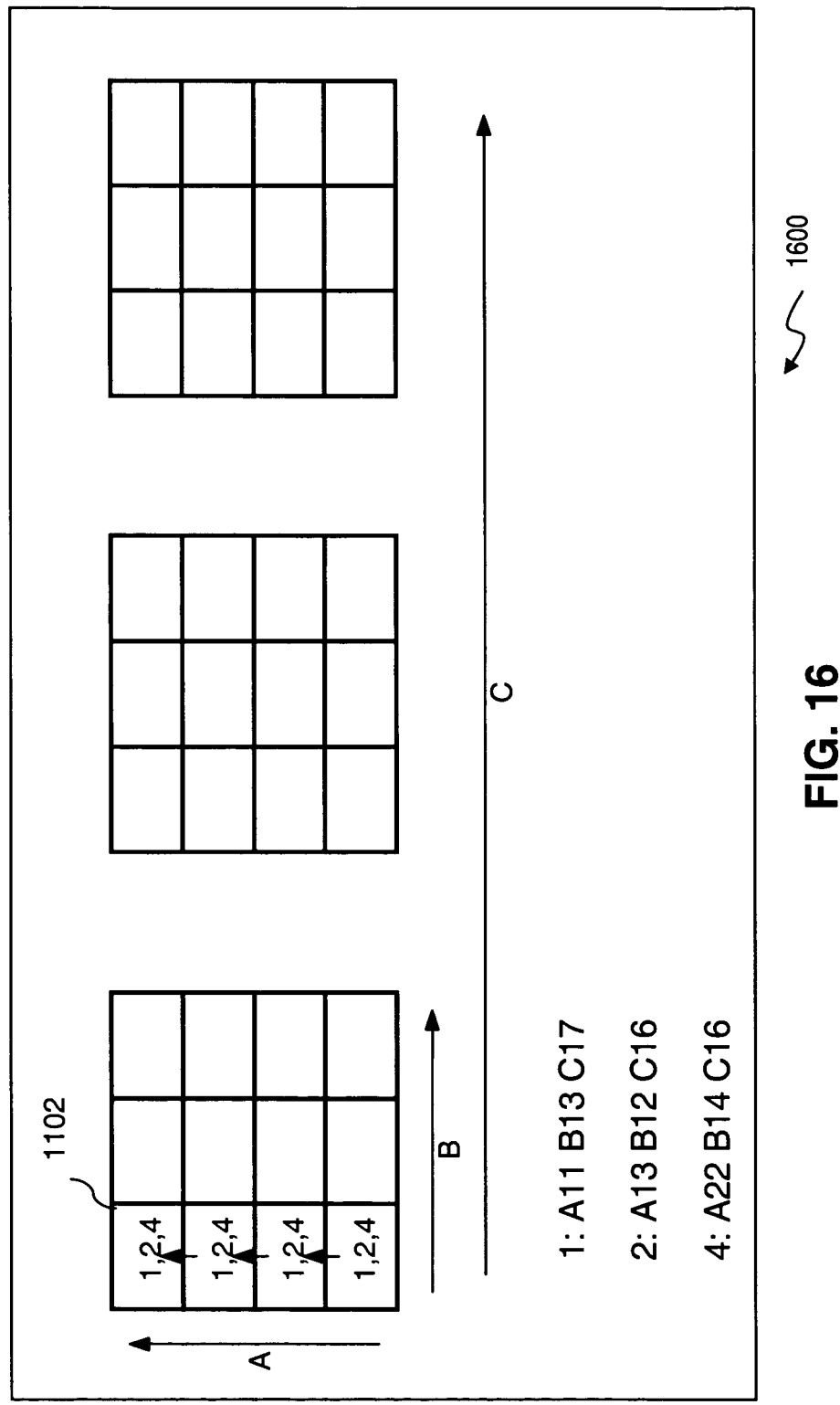
FIG. 16 depicts a state of the index in which processing has rolled up the A hierarchy and the accumulation rows are now at the top level of the A hierarchy according to an embodiment of the present invention.

As shown the structure 1600 of in FIG. 16, the A hierarchy has been rolled up and the accumulation rows are now at the top level of the A hierarchy, as denoted by the presence of the numbers in the upper left hand corner of the first box 1102. Thus, a height 4 of the hierarchy has been reached. When this level has been reached, there still exist the same 3 coverage classes that existed at the beginning. Again, this indicates no aggregation occurred while rolling up the A hierarchy. The coverage classes are still labeled with their lower bounds and children for that dimension (e.g., the input tuples).

Using the rows produced while rolling up the A hierarchy (now all at the A41 cell), the B hierarchy is rolled up, as shown in the structure 1700 of FIG. 17. Thus, the source value is now set to values of the B dimension.

As the B hierarchy is pushed up, two of the rows match, thus indicating that aggregation is occurring, as shown in the structure 1800 of FIG. 18. The two rows are added together to produce coverage class 6. FIG. 18 also depicts the compressed cube index that is being created. The lower bound (the point at which the aggregation occurs) is B31 for the B hierarchy. This is noted by recording the children in the B hierarchy that were used to construct this coverage class, as shown in FIG. 18.

However, the lower bound may be at a lower level for the A hierarchy (which is currently at the highest level of aggregation). Thus, processing will drill down the A hierarchy to determine the lower bounds and children for that dimension.

Since coverage class 6 has children down the B hierarchy, all previous hierarchies are drilled down for the node to be complete.

Figure 19:
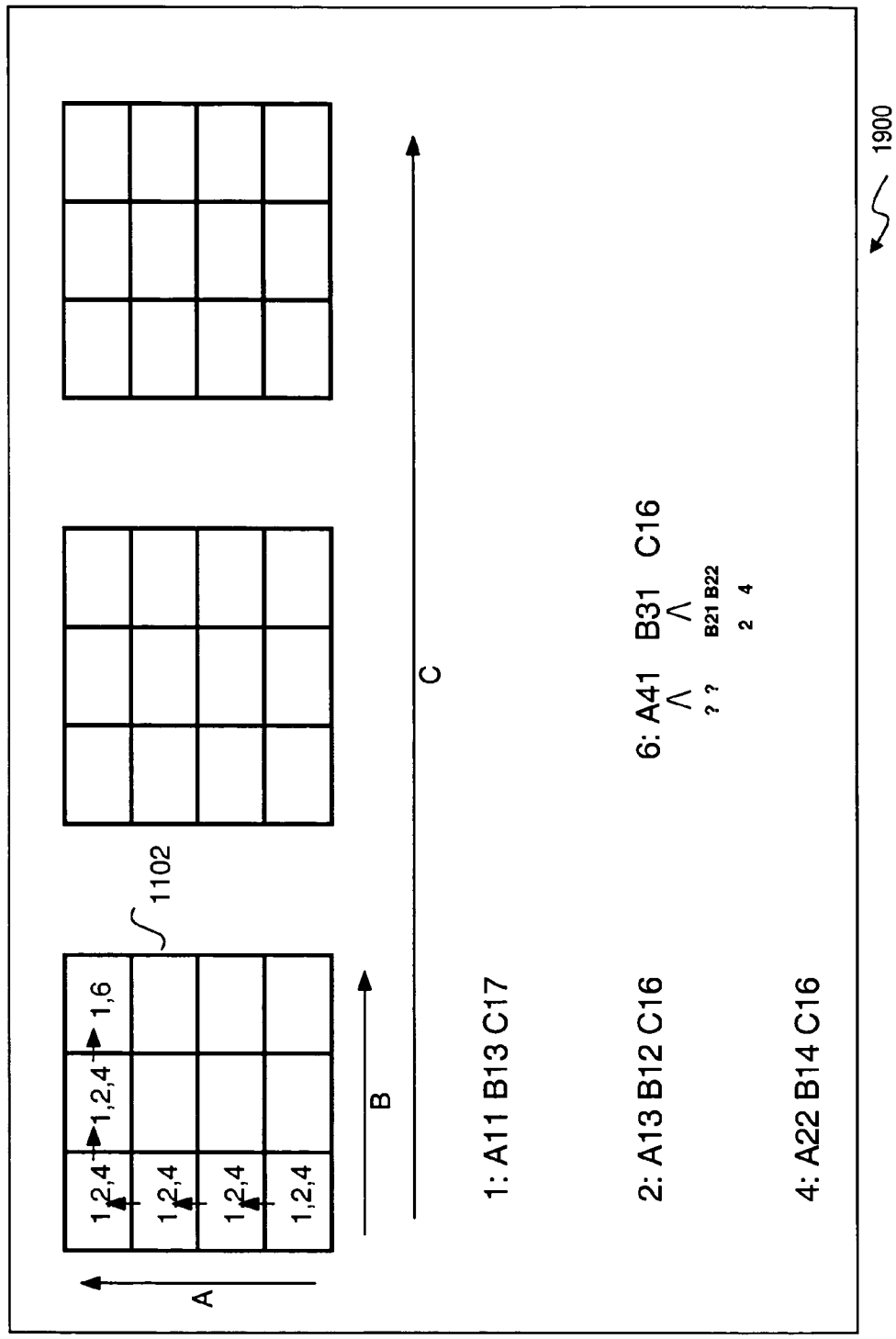
FIG. 19 depicts coverage class 6 in the index according to an embodiment of the present invention.

A structure 1900 of FIG. 19 depicts the creation of coverage class 6. Aggregates are taken from rolling up the A hierarchy and now rolling them up the B hierarchy. In the top right corner of the first box 1102 coverage classes 2 and 4 are shown collapsing (aggregating) into coverage class 6.

FIG. 19 shows coverage class 6 in the compressed cube index. The children have been filled in on the B hierarchy, and children for this class in the A hierarchy have not yet been determined.

Figure 20:
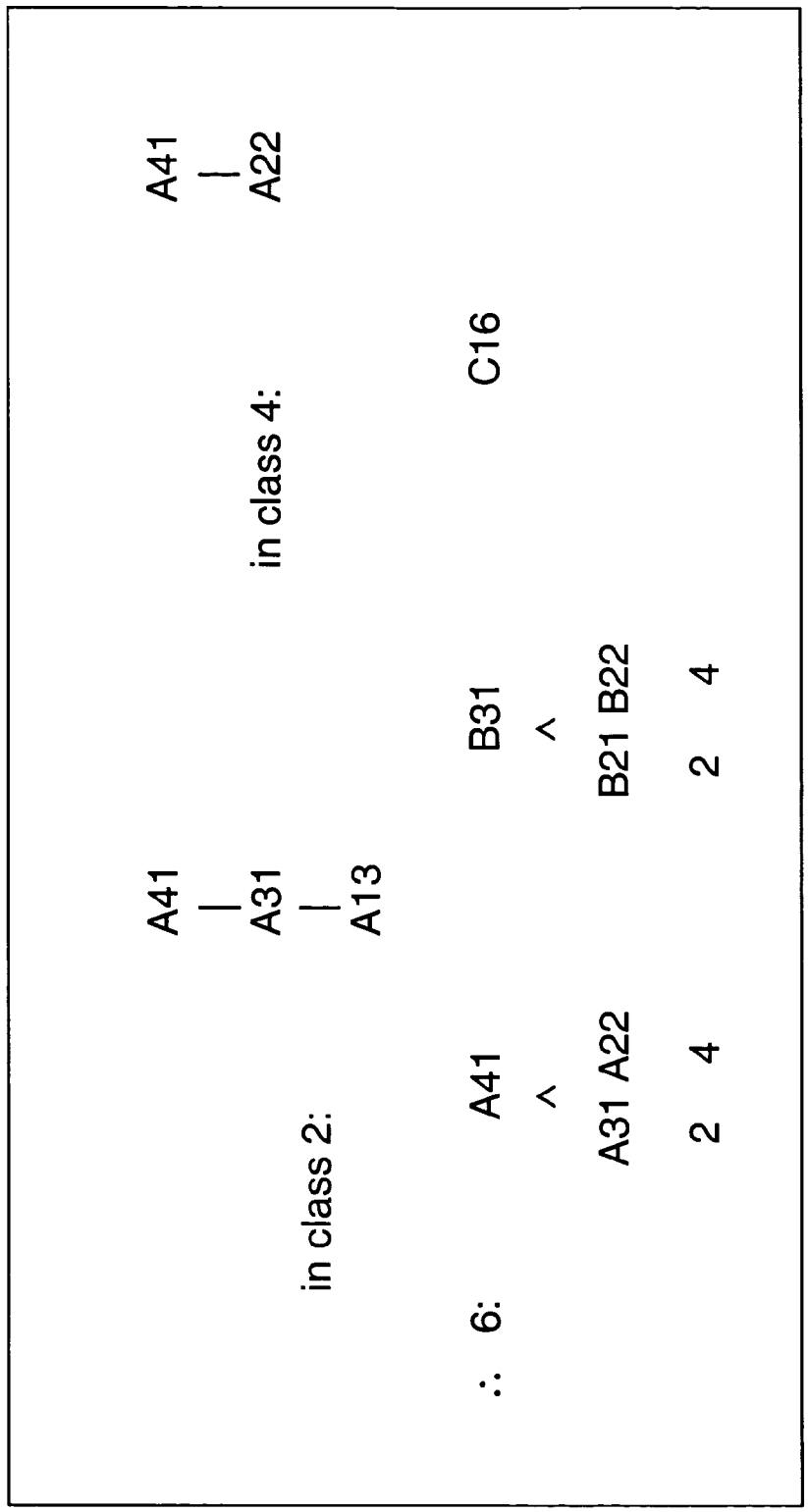
FIG. 20 depicts previous hierarchies being descended when a new coverage class is created according to an embodiment of the present invention.

Whenever a new coverage class is created, any previous hierarchies are descended to find the lower bound (when the aggregation occurs), as shown in a structure 2000 of FIG. 20. In the present example, the A hierarchy is descended to find the appropriate children of coverage class 6. There is nothing to do in the C hierarchy because the processing is still at the detail level there.

Drilling down the A hierarchy involves a determination of what children to descend to. This information is not entirely available from the definition of the hierarchy because the example only indicates those hierarchy values that this class represents, and drilling down involves knowledge of what nodes each of those is associated with.

In order to determine this information each of the children (which are both down the B hierarchy, but due to the process they know their children down the A hierarchy as well) is analyzed to determine how they would descend the A hierarchy. In this case a different A value is determined for each child so each of these values is recorded as the A children.

Had the exemplary data set been different, there could have been two other possible results. The first alternative would have been that the values from the children coverage classes were the same. In this case the value of the lower bound would simply be lowered and drilling would be continued. Alternatively, if some, but not all, of the child values had found the same value down the A hierarchy, a new coverage class would have been created. Thus, in order to find the children down all previous hierarchies the values of the children down the drill hierarchy are determined based on how the drill would be performed for the coverage classes down the primary hierarchy. If all children descend to the same value the lower bound processing would have been dropped. If some, but not all, children descend to the same value, then additional classes would be recursively created and recorded as the children.

Figure 21:
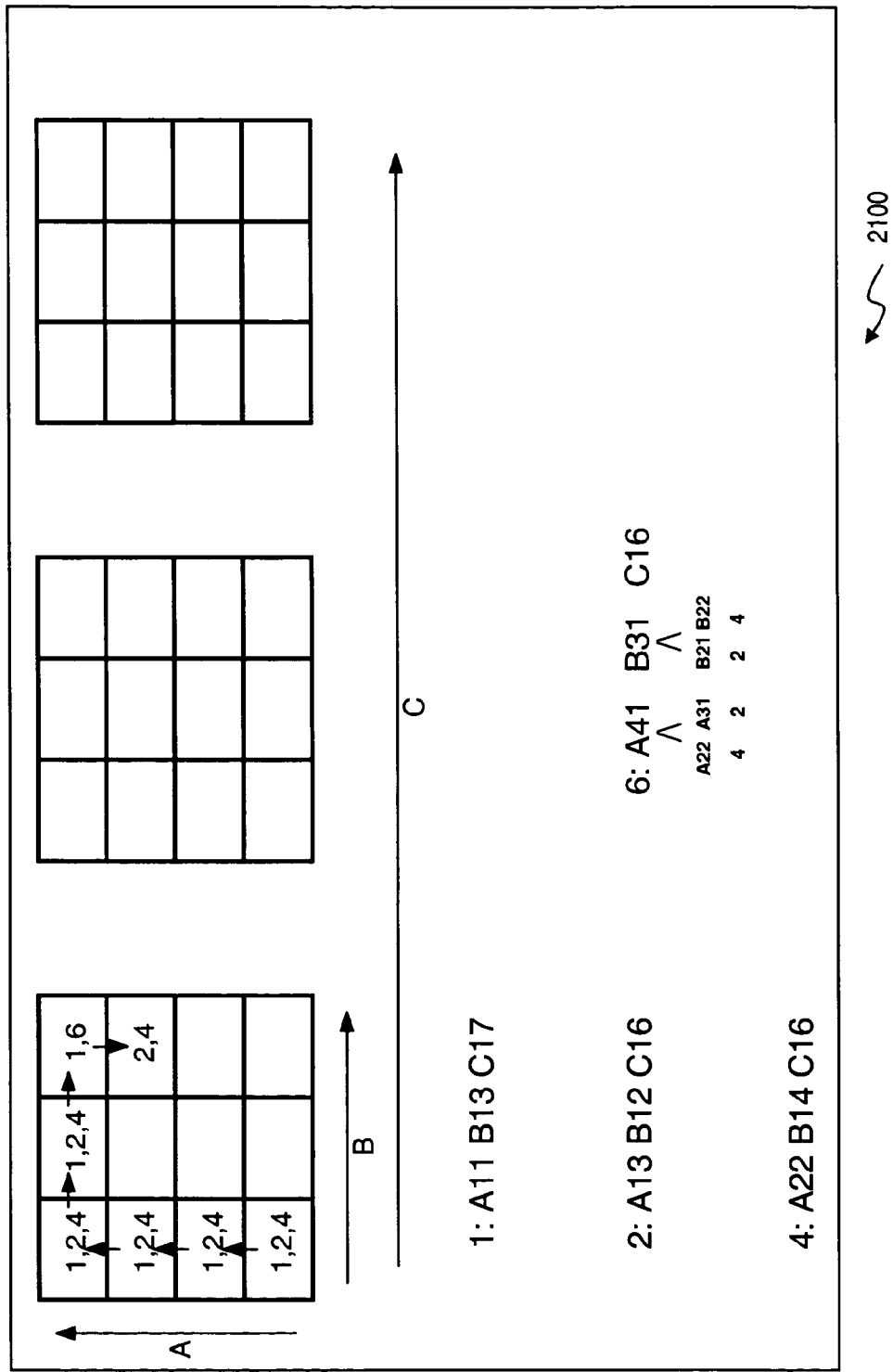
FIG. 21 depicts a drill down on the A hierarchy according to an embodiment of the present invention.

A structure 2100 of FIG. 21 depicts the drill down on the A hierarchy, reinforcing the existence of coverage classes 2 and 4 below the level at which coverage class 6 was created. Additionally, the child values in coverage class 6 for the A hierarchy are now filled in. The compressed cube index node for coverage class 6 is now complete.

The rows for coverage classes 2 and 4 are replaced with the single row for coverage class 6, thus ensuring that the accumulation region has a maximum size of the number of input rows. Over the course of aggregation, the space occupied by processing space will shrink, thus ensuring that the memory utilized by the algorithm is bounded by the initial memory, and hence is proportional to the number of input rows. As shown in a structure 2200 of FIG. 22, the multiple input cells in the worklist are replaced with the single cell from the new class. As shown, the first tuple now has class #6.

Since the top of the B hierarchy has been reached, the C hierarchy is processed, as shown in a structure 2300 of FIG. 23. The Source Value column values are reset to values in the C dimension and pushed upward. In FIG. 23, one level in the C hierarchy has been pushed up. Since the rows do not match, aggregation has not occurred. Pushing is continued upward in the C hierarchy.

When one more level in the C hierarchy is pushed up, the rows match, as shown in a structure 2400 of FIG. 24, thus signaling the creation of coverage class 7—the Top, Top, Top node for the three dimensions of the present example. As before, the preceding hierarchies are descended to discover the lower bounds in those dimensions. A recursive descent is performed to complete class 7.

Figure 25:
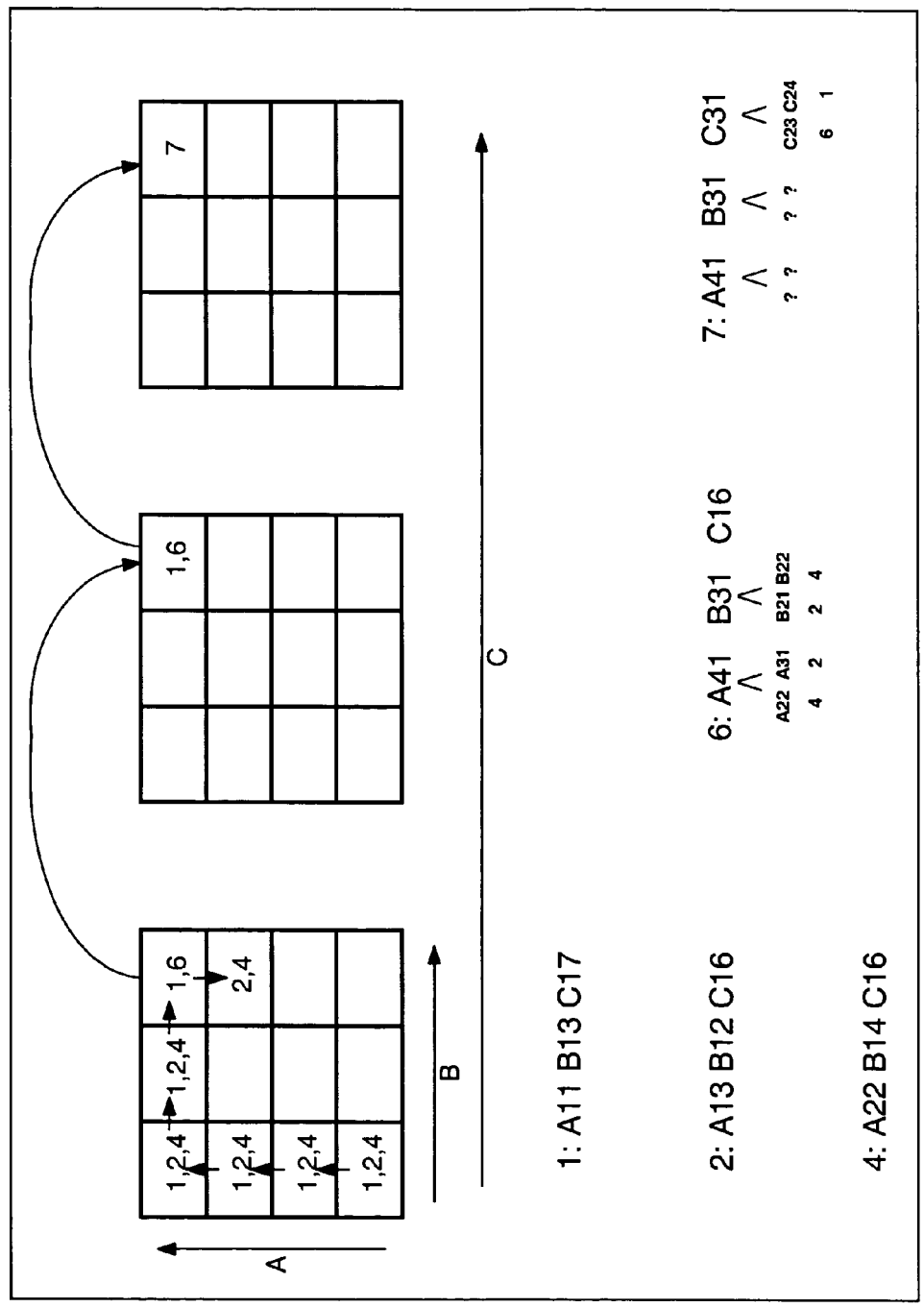
FIG. 25 depicts the creation of coverage class 7 according to an embodiment of the present invention.

A structure 2500 of FIG. 25 depicts the creation of coverage class 7. In the upper right hand corner of FIG. 25, coverage classes 1 and 6 join to make coverage class 7. The "child" values for the A and B hierarchies are then filled in.

Figure 26:
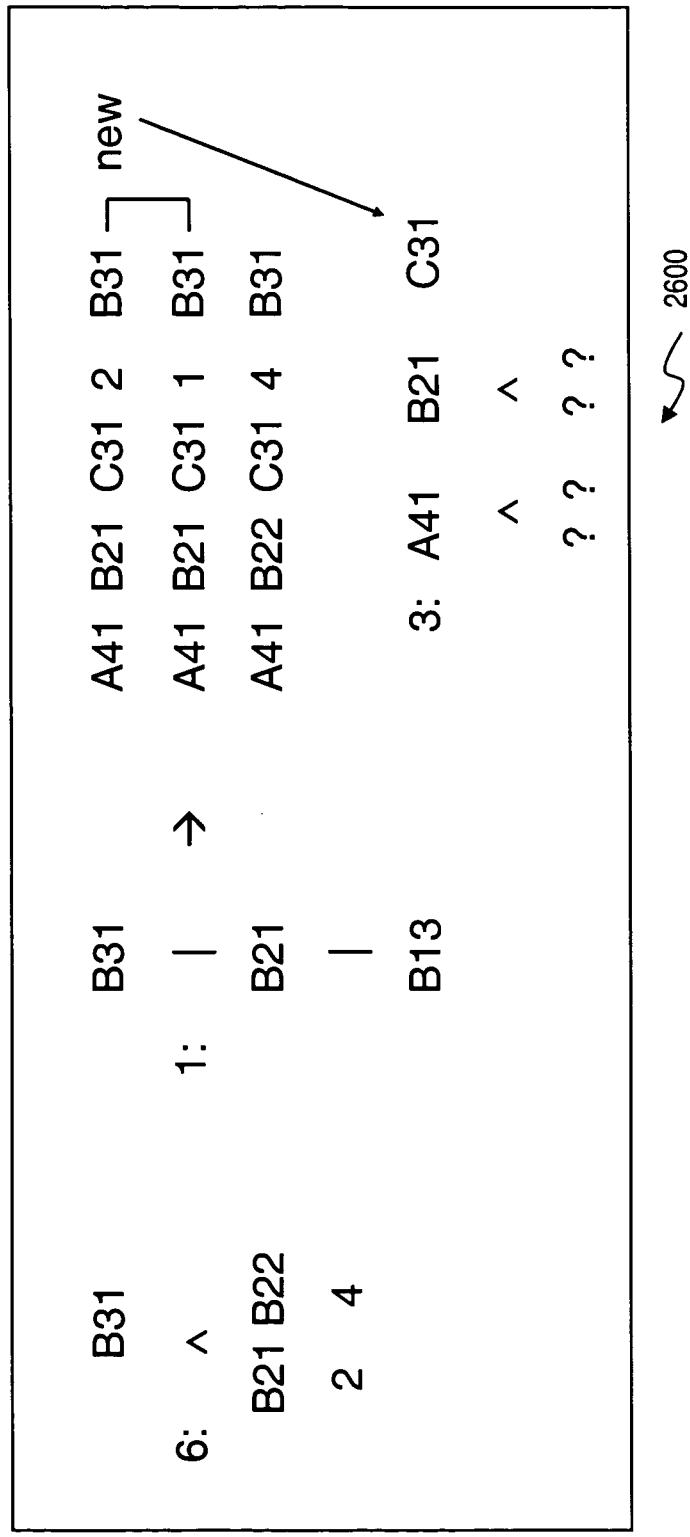
FIG. 26 depicts drilling down the B hierarchy by constructing rows of the input children according to an embodiment of the present invention.

As shown in a structure 2600 of FIG. 26, the B hierarchy is drilled down by constructing rows of the input children. Coverage class 6 comes from the rows (i.e., along the B hierarchy) <A41, B21, C31> (coverage class 2) and <A41, B22, C31> (coverage class 4). These rows are produced by using the lower bound of coverage class 7 by dropping the dimension of the drill hierarchy according to the specification of the child class. Coverage class 1 has the descendent row <A41, B21, C31>. When these rows are analyzed, it is determined that one of the dependent rows for coverage class 6 and coverage class 1 match, thus signaling the discovery of a new coverage class (i.e., the sum of coverage classes 2 and 1). For convenience, this coverage class is labeled coverage class 3. The recursive descent is continued for the A hierarchy on class 3.

Figure 27:
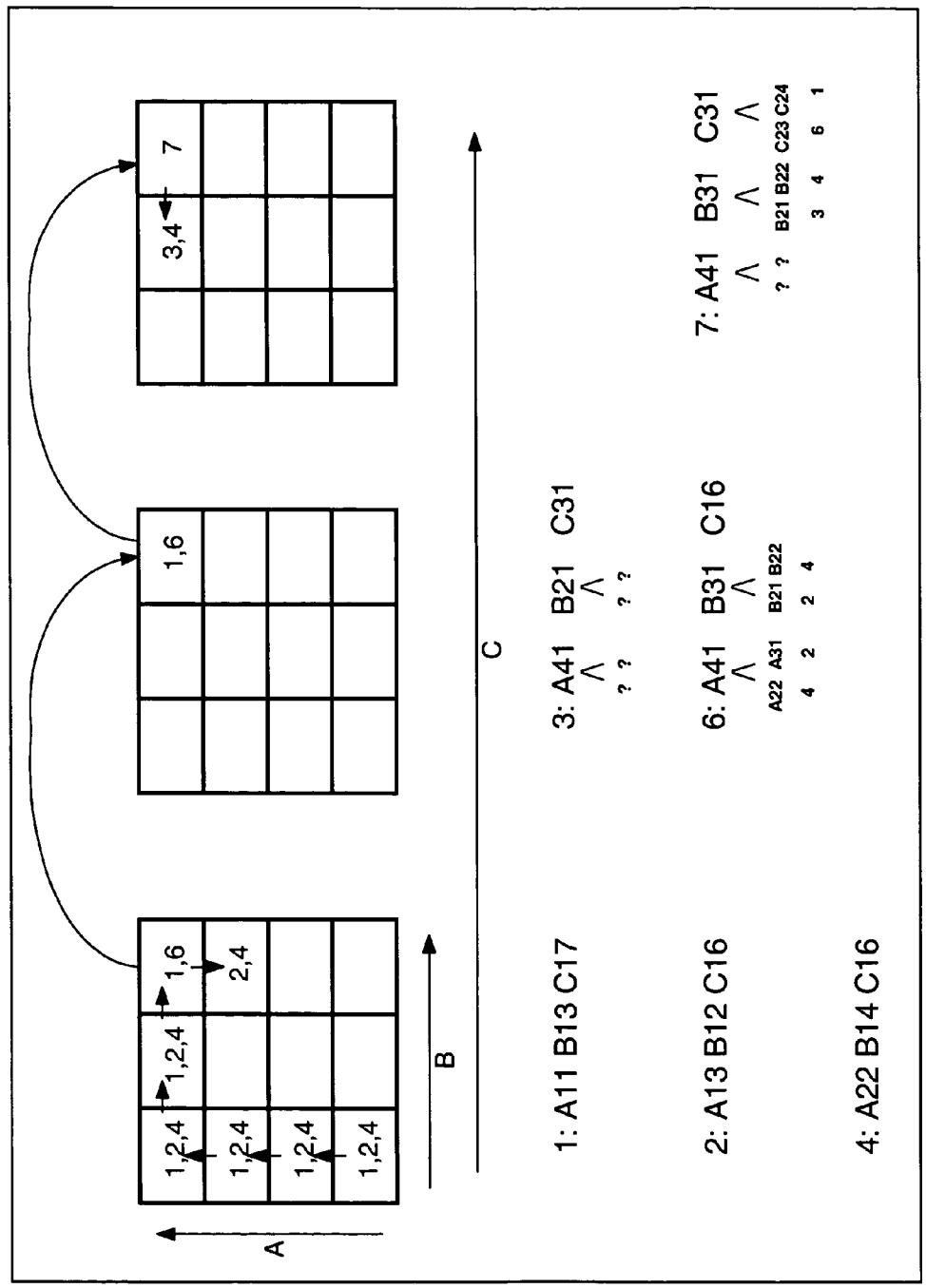
FIG. 27 depicts drilling from coverage class 7 back down the B hierarchy according to an embodiment of the present invention.

A structure 2700 of FIG. 27 depicts drilling from coverage class 7 back down the B hierarchy. Coverage classes 3 and 4 are recreated one level down the B hierarchy in this region of the C hierarchy. Also the compressed cube index has two coverage classes under construction, 3 and 7.

Figure 29:
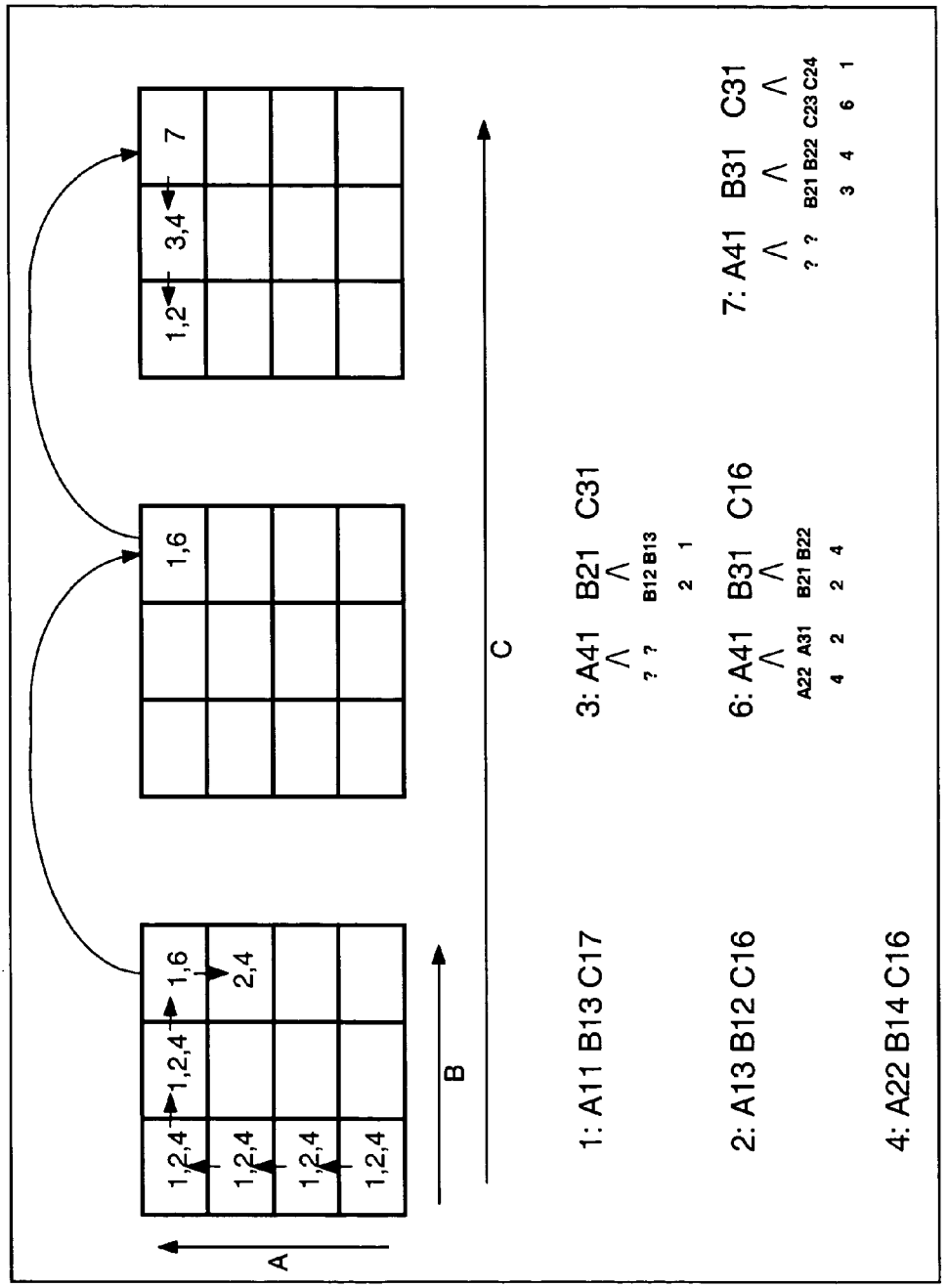
FIG. 29 depicts determining a lower bound of the coverage class 3 according to an embodiment of the present invention.

A structure 2800 of FIG. 28 depicts recursive descent of the B hierarchy for coverage class 3 to establish the lower bounds for that hierarchy (e.g., this could be at the top of a compressed region). However, when the drill is performed, coverage classes 2 and 1 are reached, indicating that B21 represents the lower bound for this coverage class, as shown in FIG. 29.

Figure 30:
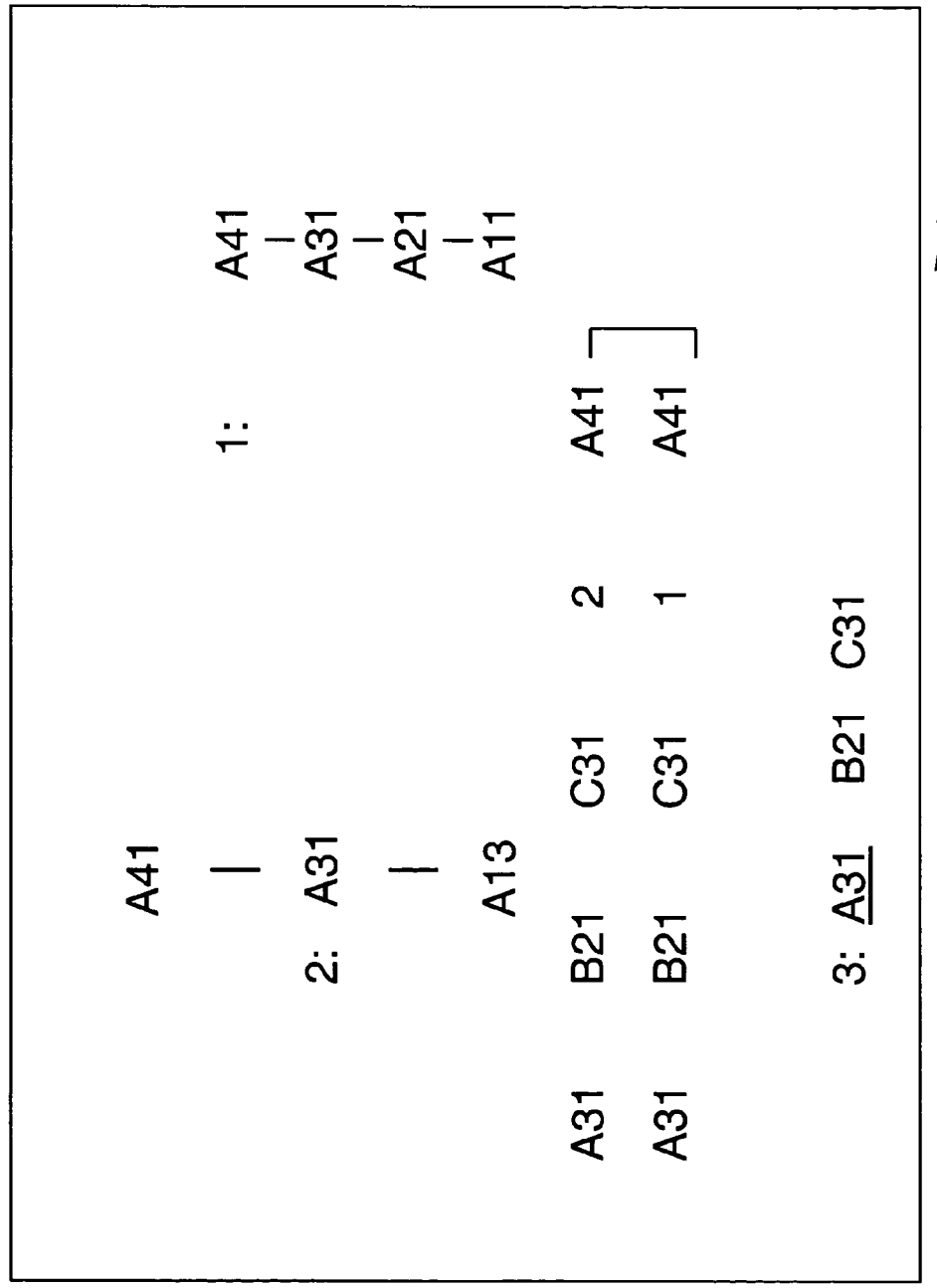
FIG. 30 depicts drilling down the A hierarchy from coverage class 3 and determining coverage classes 1 and 2 according to an embodiment of the present invention.

A structure 3000 of FIG. 30 depicts drilling down the A hierarchy from coverage class 3. The children of coverage class 3 down the B hierarchy, classes 1 and 2, both push down to A31 when they descend the A hierarchy. The lower bound for coverage class 3 is thus lowered to A31 and the drilling is continued.

Figure 31:
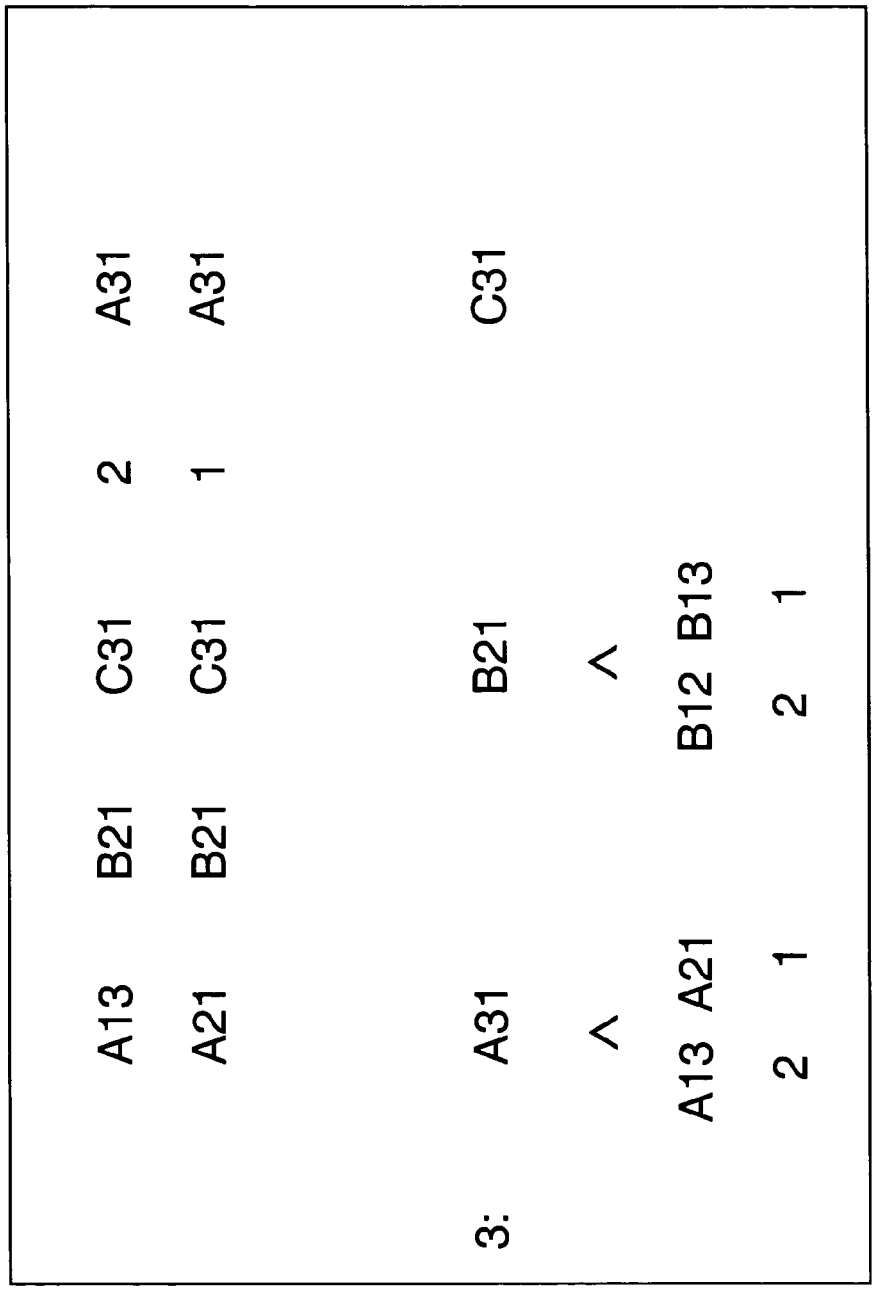
FIG. 31 depicts descending one more level on A for both coverage classes 1 and 2 according to an embodiment of the present invention.

One more level on A is descended for both coverage class 1 and 2, as shown in a structure 3100 of FIG. 31. The input classes are reached, and thus the true lower bound and the children for coverage class 3 have been determined.

Figure 32:
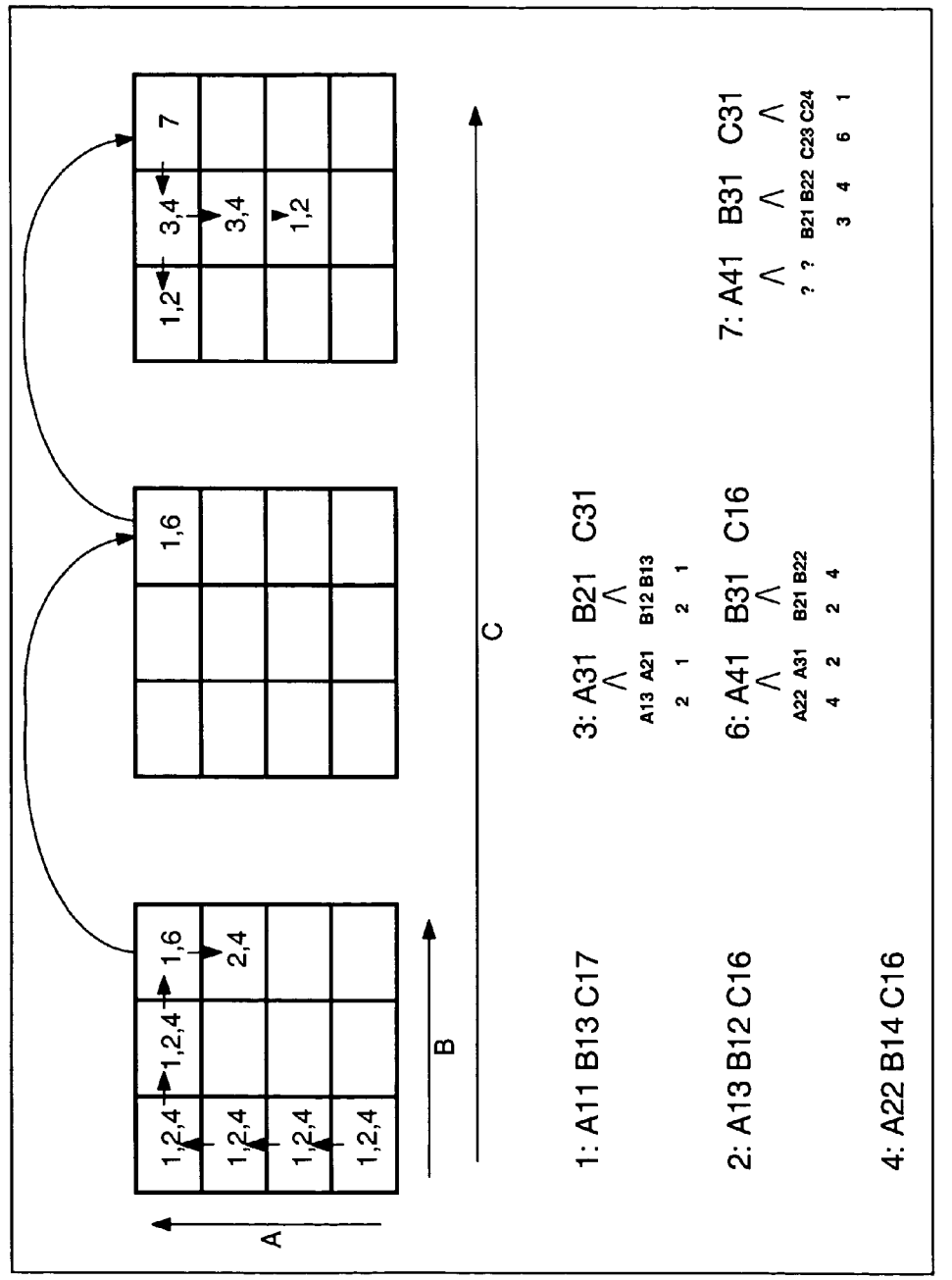
FIG. 32 depicts descending the A hierarchy for coverage class 3 and filling in child information according to an embodiment of the present invention.

A structure 3200 of FIG. 32 depicts descending the A hierarchy for coverage class 3 and filling in the child information of coverage class 3. As shown, the lower bound of class 3 is now A31 instead of A41.

Figure 33:
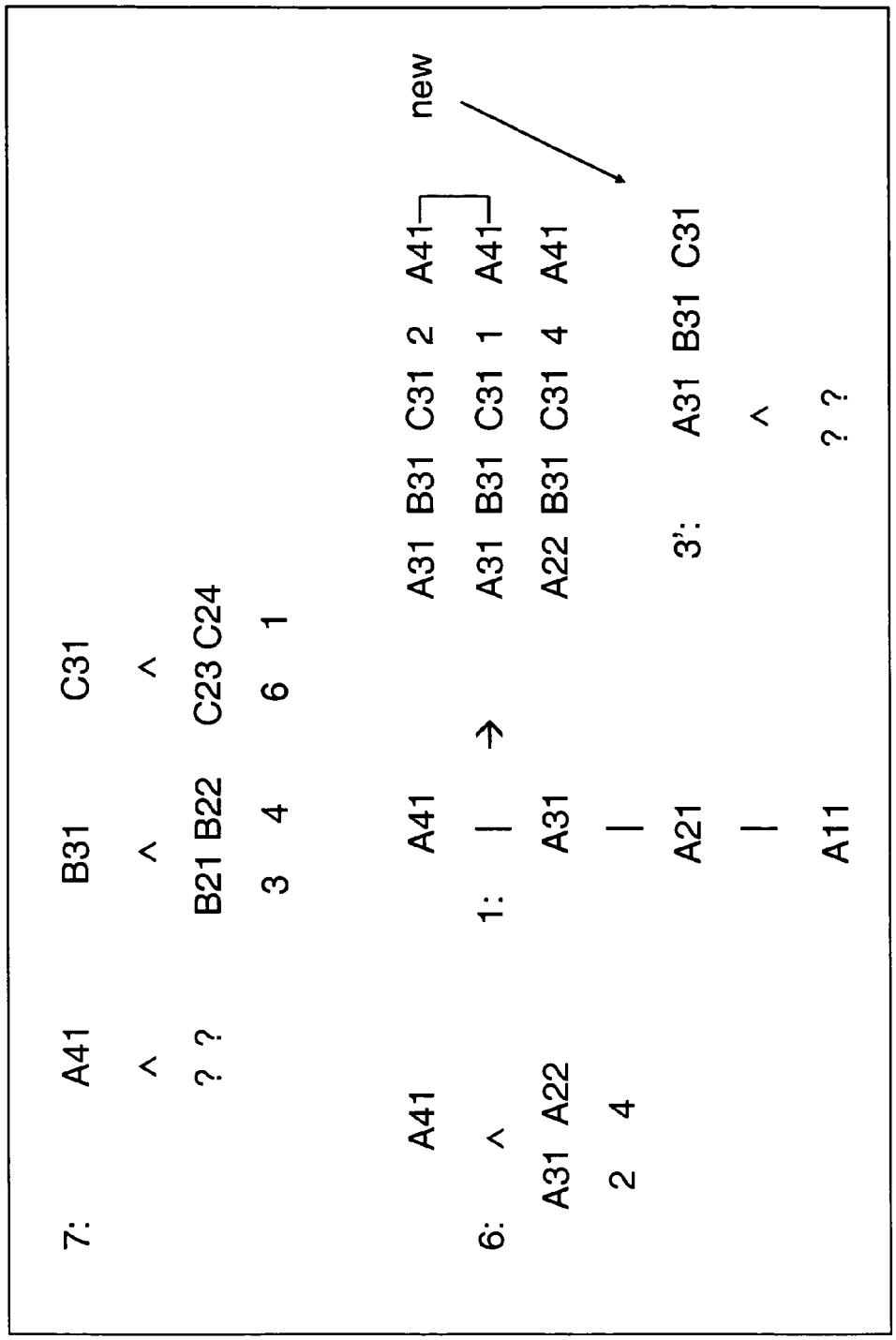
FIG. 33 depicts popping the recursion stack and beginning a drill down of the A hierarchy according to an embodiment of the present invention.

As shown by a structure 3300 of FIG. 33, the recursion stack is popped and a drill down of the A hierarchy is begun for coverage class 7. When the input classes (1 and 6) are drilled, matching rows are determined, signaling the creation of a new class—coverage class 3'. Coverage class 3' is the same as coverage class 3 (i.e., it is the aggregation of the same input rows), but detecting this redundancy is expensive in computation resources.

Figure 34:
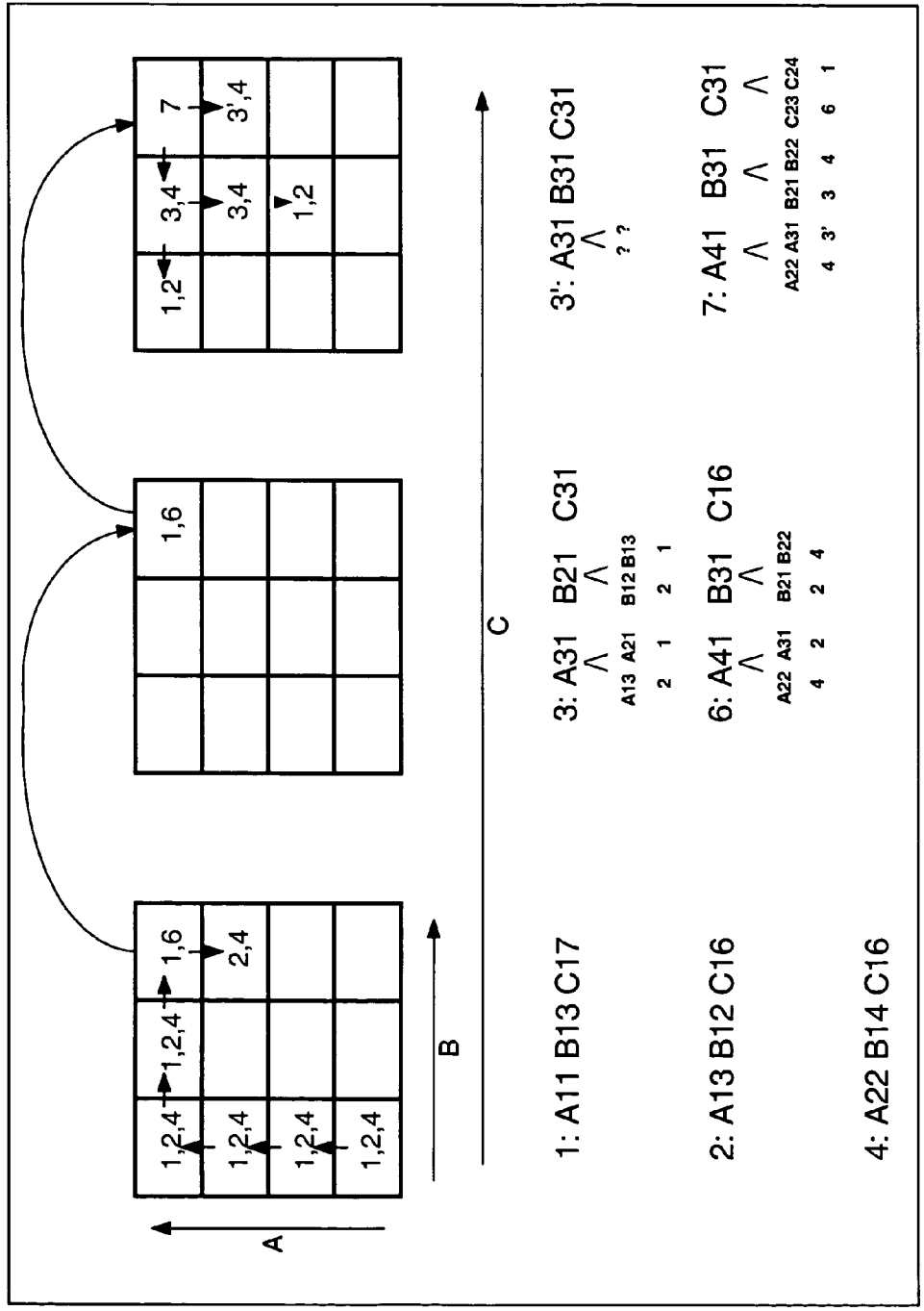
FIG. 34 depicts drilling down the A hierarchy from the 7 coverage class to yield the 3' coverage class according to an embodiment of the present invention.

A structure 3400 of FIG. 34 depicts drilling down the A hierarchy from coverage class 7 to yield the 3' coverage class. The descent from coverage class 7 along the A hierarchy goes into an area above the known top of class 3 (on the C hierarchy). It also shows the nearly completed compressed cube index, for which the lower bounds and children of 3' are yet to be filled in.

Figure 35:
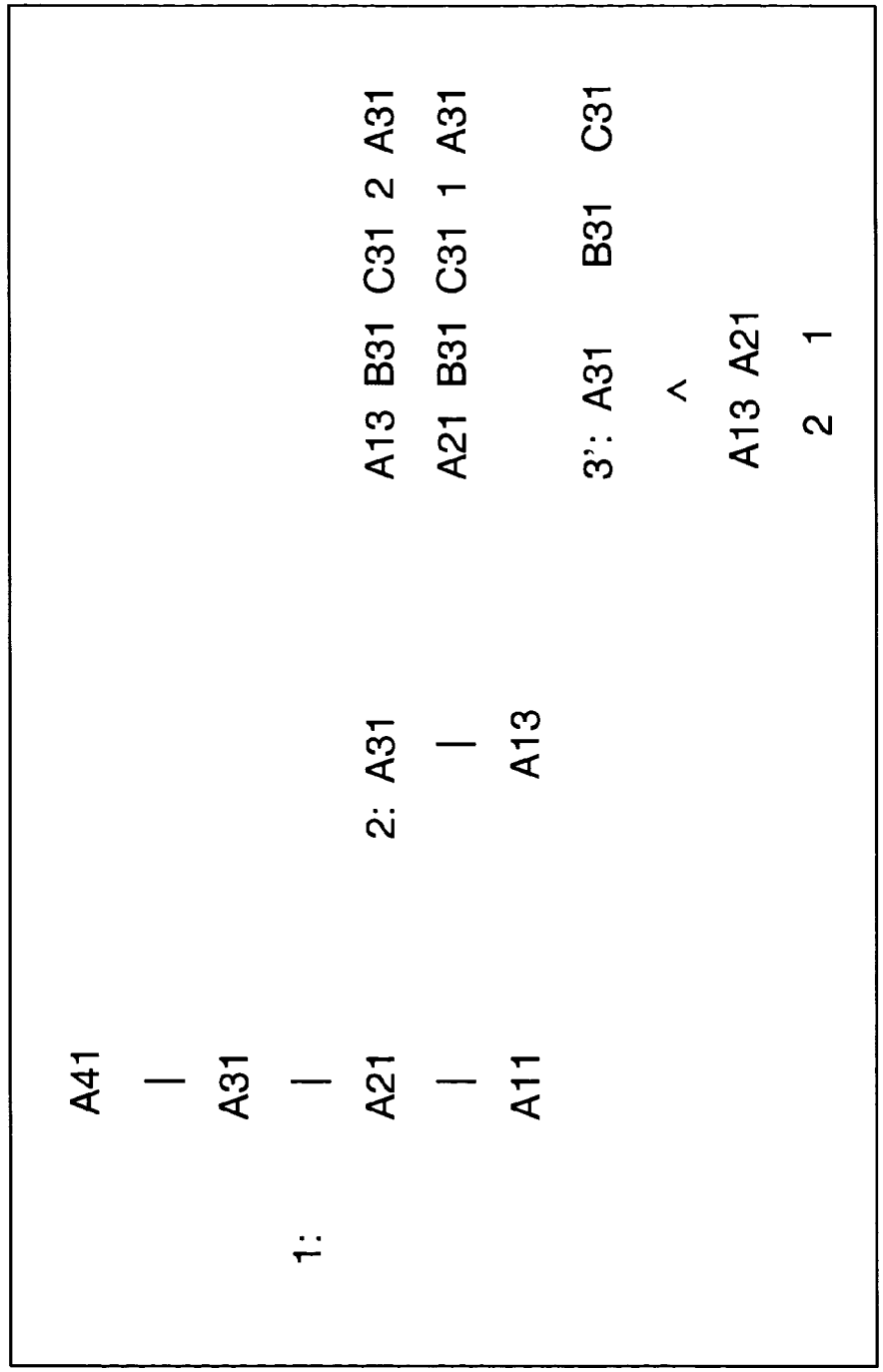
FIG. 35 depicts drilling down the A hierarchy further to determine whether the lower bound for coverage class 3' has been determined according to an embodiment of the present invention.

Since coverage class 3' was determined by drilling down the A hierarchy, it is now determined if the true lower bounds have been found. As shown in FIG. 35, the A hierarchy is drilled down further, and the input coverage classes 1 and 2 are reached, thus indicating that the lower bound for coverage class 3' has been determined.

Figure 36:
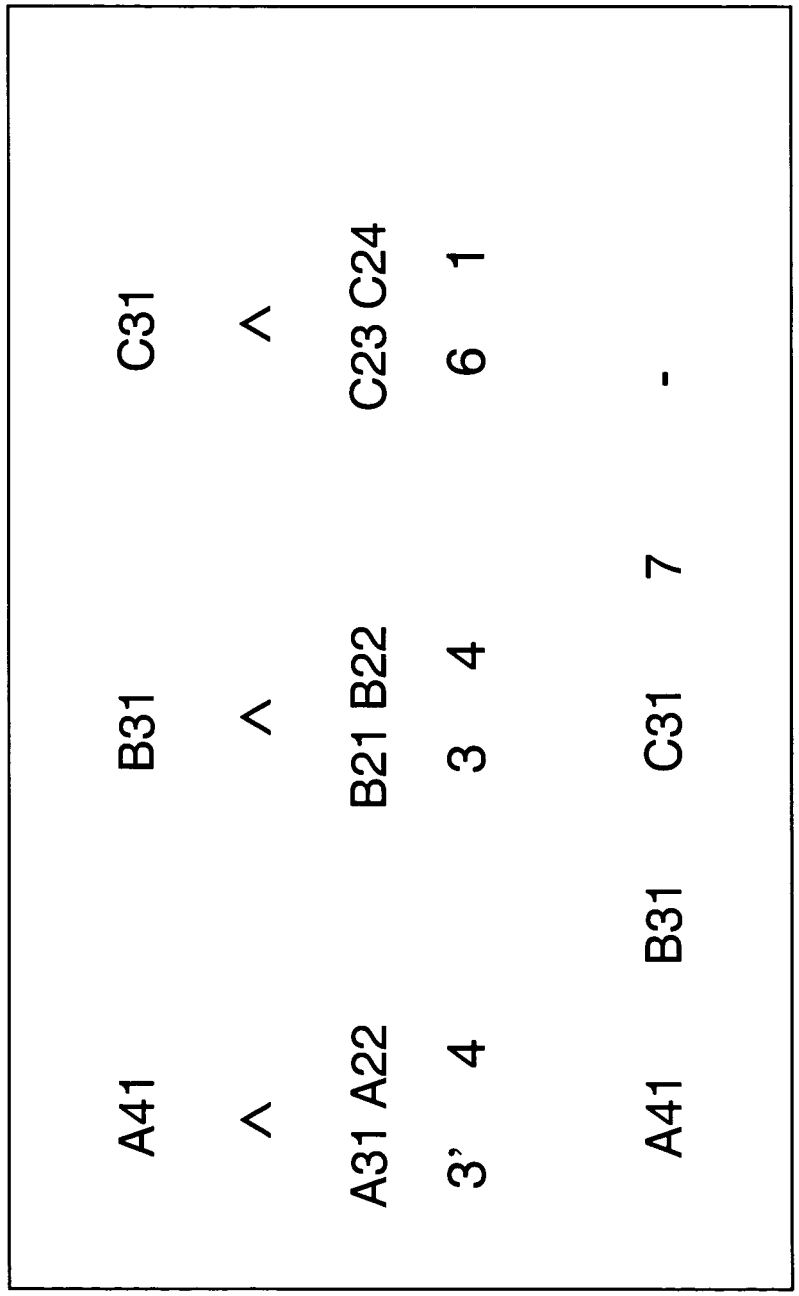
FIG. 36 depicts completing class 3' according to an embodiment of the present invention.

As shown in a structure 3600 of FIG. 36, completing class 3' completes the original drill down the A hierarchy from coverage class 7. The top of all hierarchies has been reached, so the single node is used as the root of the tree.

Figure 37:
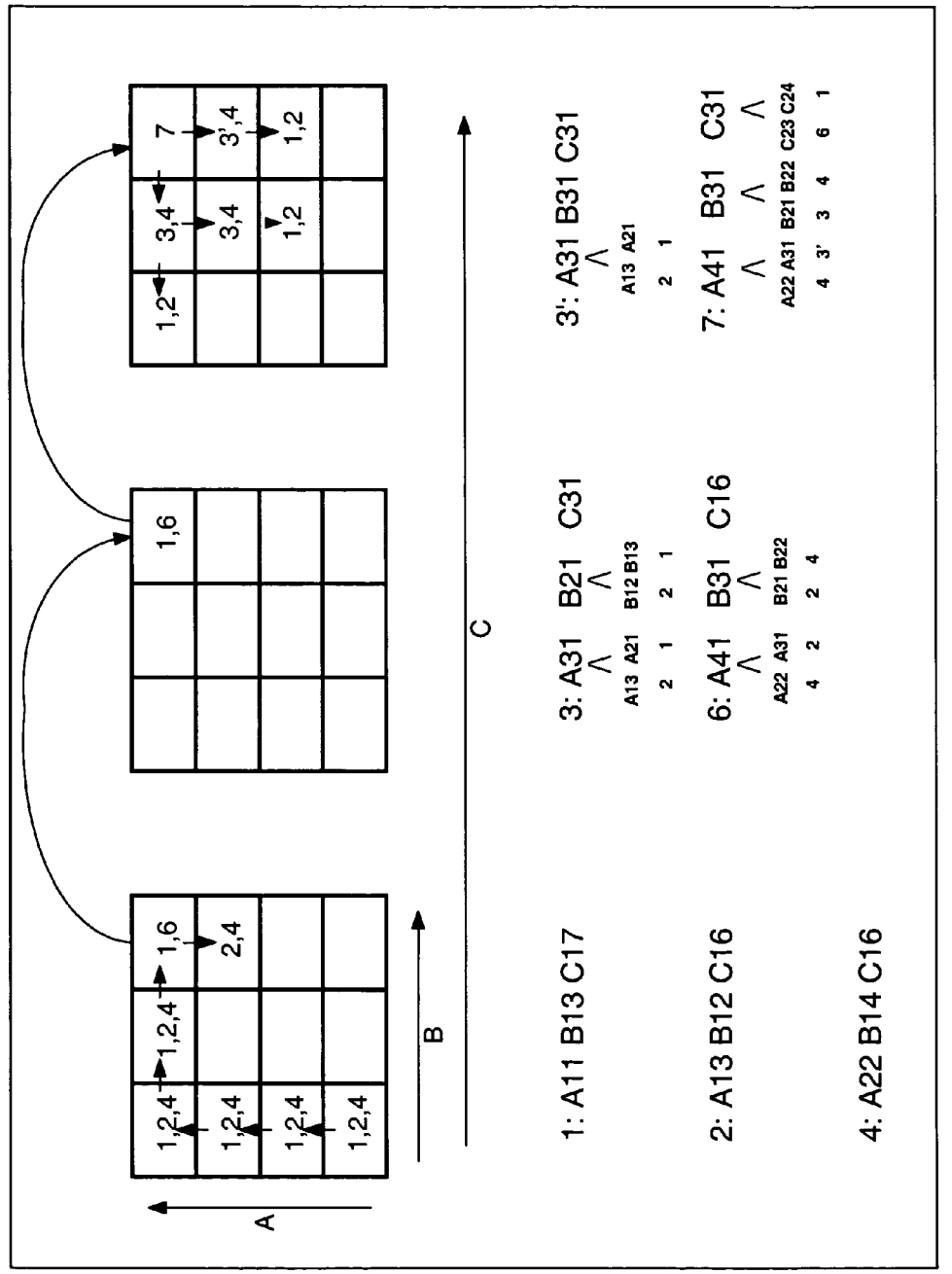
FIG. 37 depicts the completion of drilling down the A hierarchy from coverage class 7 to coverage class 3' to coverage classes 1 and 2 according to an embodiment of the present invention.

FIG. 37 depicts the completion 3700 of drilling down the A hierarchy from coverage class 7 to coverage class 3' to coverage classes 1 and 2. The filling in of the child information of coverage class 3' and 7 is now completed, thus indicating the completion of the aggregation. The bottom half of FIG. 37 depicts the completed compressed cube index.

As the example shows, the index build process is not perfect at detecting redundancy. Although coverage classes 3 and 3' are actually the same class, they were discovered by descents down different hierarchies and the exemplary index build process did not coalesce them. This redundancy could be detected, but it would be computationally more expensive to detect it. The duplication has not caused negative performance issues in practice, if the hierarchies are in a particular order.

As discussed previously, given the present exemplary process, it is cheaper computationally to accept duplicate coverage classes rather than scan for this possibility every time. However, research has indicated that the order in which the dimensions are aggregated may greatly affect the number of these duplicate classes. In general, it is desirable to rollup dimensions that have very few levels (e.g., 2) first and rollup deeper hierarchies last.

Figure 38:
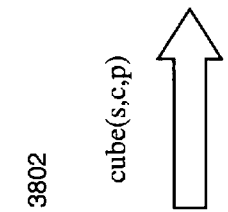
FIG. 38 depicts rewriting the SQL CUBE operation into a dimensional form according to an embodiment of the present invention.

FIG. 38 depicts rewriting the SQL CUBE operation into a dimensional form and computing it using the present exemplary compressed cube algorithm. A fact table 3802 with 3 key columns: S, C, and P, is input. The cube operator groups each of the members of the columns into a single node represented as "*". A "*" entry appears for every recombination of the other 2 rows. As shown in FIG. 38, the exemplary fact table 3802 includes 3 rows. The operation "Select S, C, P, sum(M), From fact_table Group By Cube (S, C, M);" is performed, for a result including 22 rows 3804. Each column in a row determines others, e.g. S1→C2, C2→S1.

Thus: "GBY S1=GBY C2=GBY S1, C2, . . . ="

Figure 39:
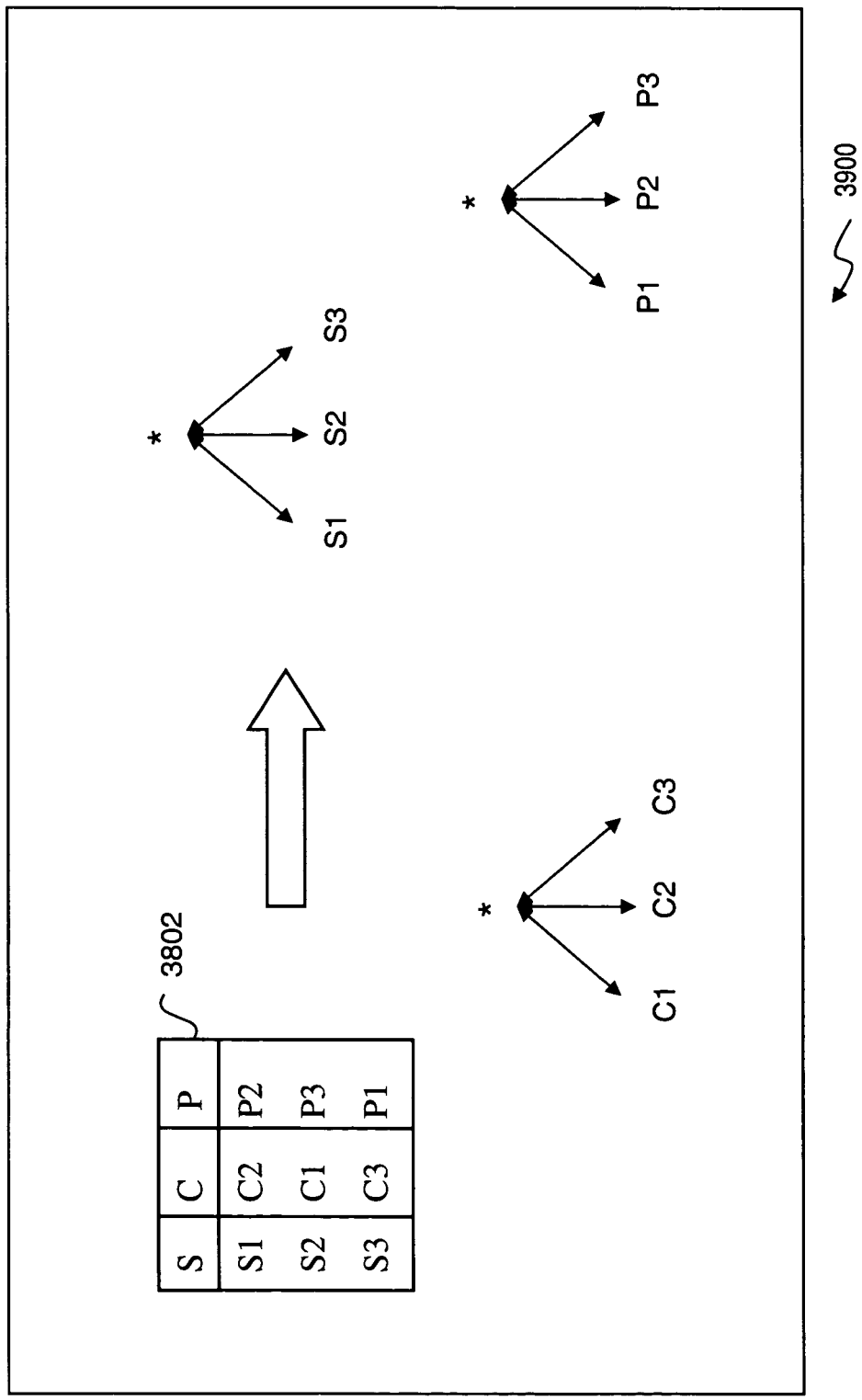
FIG. 39 depicts turning columns into dimensions according to an embodiment of the present invention.

A first step 3900 in performing a CUBE operation is to transform the columns into dimensions, as shown in FIG. 39. The distinct list for each column of the cube operation is converted to a dimension. Once this is done, a "*" member for each of these dimensions is created to hold the results of the aggregation. Each column is converted into a dimension with a 2 level hierarchy. Additionally, the dimension includes distinct values for each column.

The compressed cube aggregation techniques can also be applied to implement the SQL CUBE operator. The following discussion illustrates a simple example.

When an exemplary 4 row input table 4002 is aggregated as shown in FIG. 40, 8 coverage classes 4006 are determined for the resulting aggregated cube. This corresponds with 23 rows 4004 that would have been produced by the conventional SQL CUBE operation. Fortunately, users can still query the entire compressed cube and all of the desired rows are produced.

FIG. 41 depicts an exemplary data structure 4100 used for the leaf nodes to store coverage class information for the example shown in FIG. 37.

FIG. 42 depicts the beginning of processing involved for a point query 4200, by using the coverage class index (i.e., compressed cube index) to request specific cells. In the example of FIG. 42, it is desired to find the cell <A31, B21, C16>. All probes into the compressed cube index are performed in the reverse order of aggregation. Since the ordering of rolling up in creation of the compressed cube index was first the A dimension, then B, then C, probes of the coverage classes will be performed in the order C, B, A, (i.e., the tree is structured so that the hierarchies are drilled down in a specific order [C, B, A]). Since all of the hierarchies have a "top" node, coverage class 7 represents the top of the aggregation.

As shown in FIG. 43, coverage class 7 is analyzed and it is determined 4300 that the children of C31 are C23, in coverage class 6, and C24, in coverage class 1. The query begins at the top of the tree, drilling on the C hierarchy. As shown, C16 is at a lower depth than C31 so it is pushed up to the lower bound and the matching child is used.

As shown in FIG. 44, the C hierarchy is used to trace the path from C16 (the desired cell) to C31. This path moves through C23, so it is determined 4400 to descend into coverage class 6. Since a match is found on C23 it is determined to go to class 6 and continue with the C hierarchy.

When coverage class 6 is reached 4500, it is determined that the lower bound is C16, as shown in FIG. 45, and the correct coverage class has been found, so that the B hierarchy is drilled next.

As shown in FIG. 46, using the B hierarchy, the drill path from B21 (the target) to B31 (the lower bounds of coverage class 6) is derived. Since B21 is lower than B31, it is determined 4600 that the B hierarchy is to be drilled down. When the children of coverage class 6 are checked, it is determined that B21 (in coverage class 2) is a direct child of coverage class 6, thus indicating that coverage class 2 is to be drilled.

As shown in FIG. 47, the lower bound of coverage class 2 is checked and it is determined 4700 that it is lower than B21 (the target), thus indicating that the correct coverage class for the B hierarchy has been reached. The A hierarchy is checked next. The A hierarchy is used to derive the path from A13 (the lower bound of coverage class 2) and A31 (the target). The target is found in this path, indicating that coverage class 2 contains the desired cells. Now the query returns the value associated with coverage class 2.

If it had been determined that the target cell was not in the drill path (e.g., it was B11), then it would have been concluded that the cell did not exist in the compressed cube and a null value would have been returned.

The lower bound pushes up to the query value so that the next hierarchy (A), which also pushes up to the query value, is processed, thus concluding the query: A31 B21 C16 is contained in class 2.

The exemplary system and process discussed next yield output as if the user did a full table scan of a fully aggregated table. In this process, the compressed cube index is traversed, going from coverage class to coverage class, returning all the rows that each coverage class represents. An exemplary reason for doing such a traversal is that users may wish to query the uncompressed result of aggregation. The traversal is done by traversing the compressed cube index using a depth first search algorithm. For each dimension there exists an array of dimension positions corresponding to the span represented by the current coverage class. When the traversal steps down a hierarchy the array on that dimension is replaced with the child value stored in the parent class (an upper bound).

Since upper bounds are not stored in the coverage classes for this example, the drill path into the coverage class is used to establish what is the upper bound for that path. To ensure that all of the possible drill paths into a coverage class are covered, a standard depth first search on the compressed cube index is used.

Figure 48:
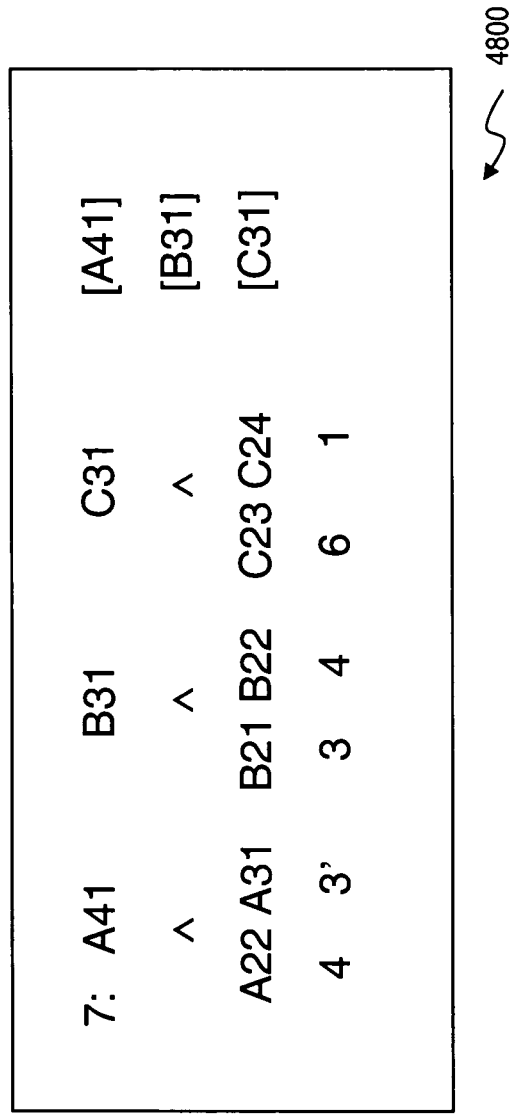
FIG. 48 depicts starting processing with the initial lower bounds of the top coverage class according to an embodiment of the present invention.

The traversal starts with the initial lower bounds of the top coverage class 4800, as shown in FIG. 48. An in memory array is created for each dimension of the cube. Initially, each array has only one value, the starting position of the top most coverage class. Then, as the traversal steps down into each coverage class, the array is expanded to include the drill path between the lower bound of that coverage class and the point at which the drilling entered the coverage class. The Cartesian product of these arrays represents the rows, represented by that particular coverage class, for that particular drill path.

For the example depicted in FIG. 48, like the point query, the traversal starts at the root of the tree (e.g., coverage class 7). An array is initialized on each dimension starting with the lower bound of the node and pushing up to the top of the hierarchies. Since the lower bound is at the top of all hierarchies each array begins one element wide.

As shown, the traversal starts at the root of the compressed cube index, i.e., coverage class 7 for this example. Here, the dimension arrays are initialized to the lower bounds of coverage class 7. Thus, each array starts with a single element.

Using the dimension arrays, output rows are produced for this class, as shown in FIG. 49, by performing a cross product 4900. The Cartesian product of a single element array is a single row.

Figure 50:
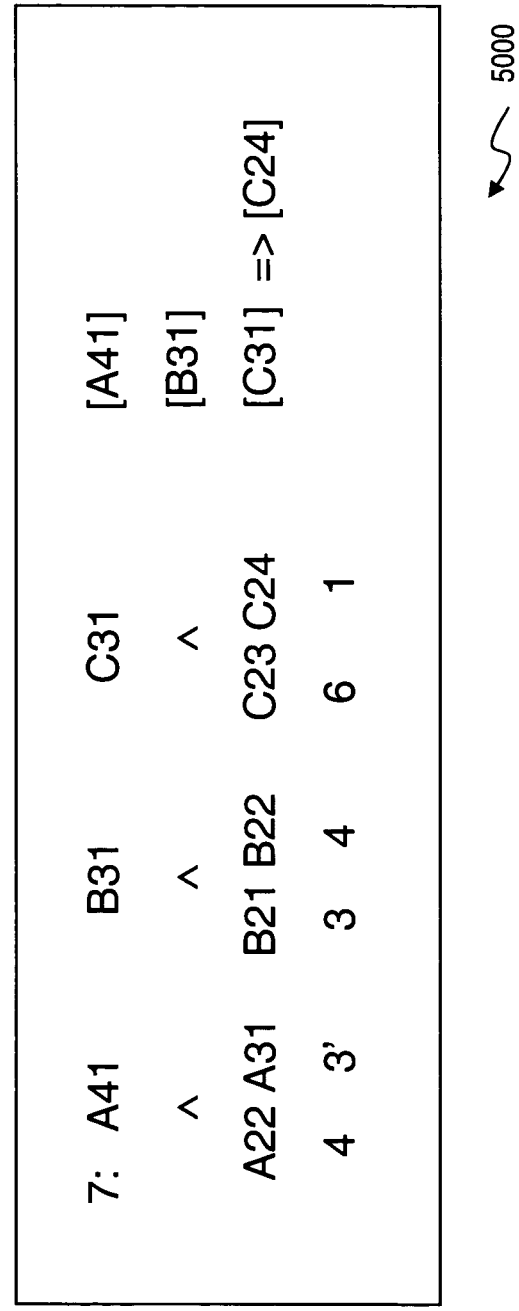
FIG. 50 depicts replacing an array on a dimension with that child value according to an embodiment of the present invention.

Having produced all the rows for this class, each of its children in turn are drilled down 5000, replacing the array on that dimension with the child value, as shown in FIG. 50.

Figures 51, 52:
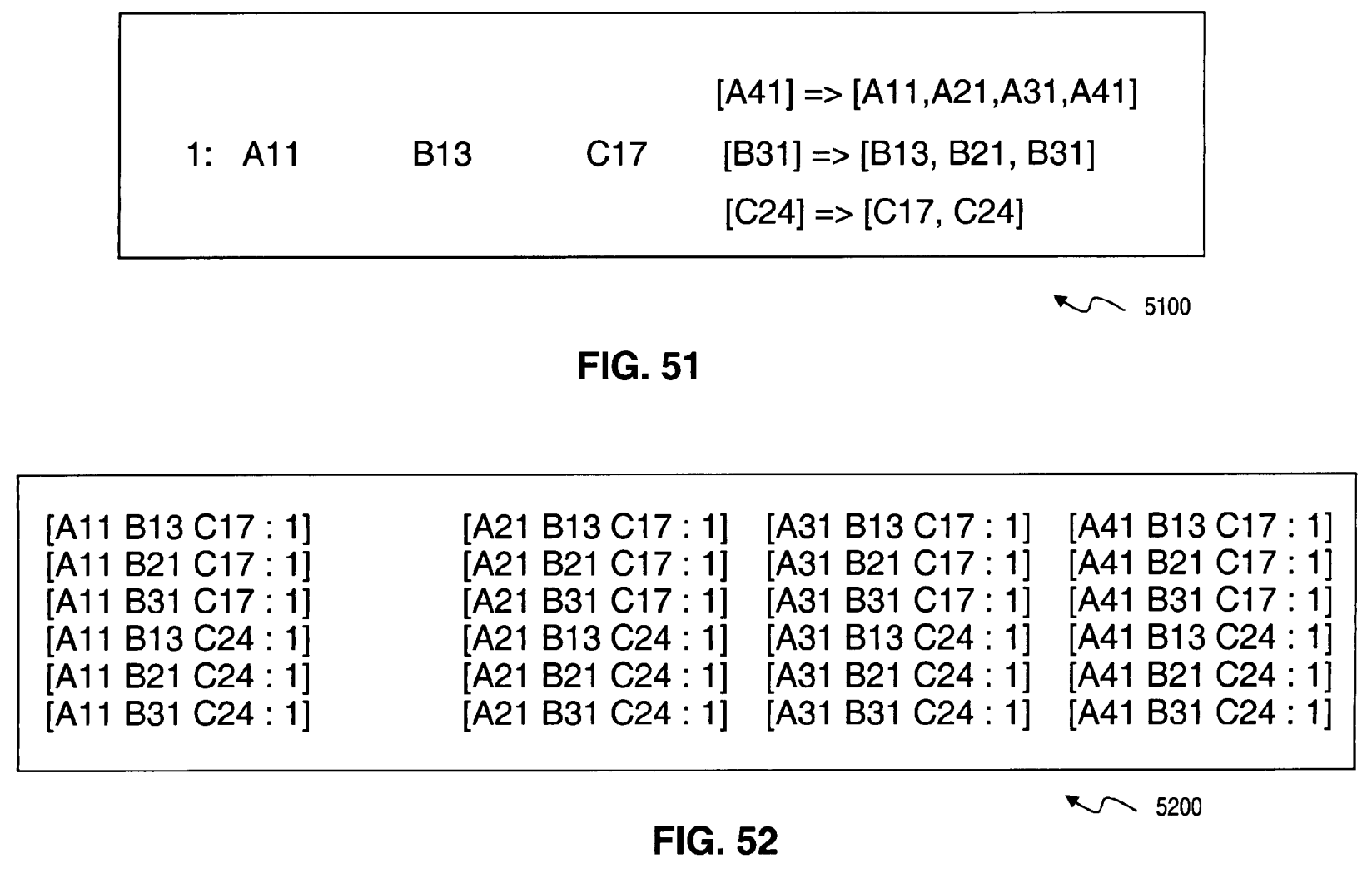

A traversal of the compressed cube index is begun 5100, as shown in FIG. 51. One dimension at a time, the child coverage classes are entered. By replacing the current value in the array with the child value, the upper bound in the child class is established for this drill path.

Each hierarchy array is expanded by pushing up from the lower bound until the upper bound supplied by the parent is reached. This processing is performed for hierarchies that are not 'more significant' than the drill hierarchy that was gone down to reach this point.

As this coverage class was entered, the arrays held the value <A41, B31, C24>, the upper bound for this drill path. Each of these elements is compared to the corresponding elements in the coverage class's lower bound. Then the dimension arrays are populated with all of the values between the lower and upper bounds.

This expansion is done only for the hierarchy which is being drilled on (e.g., C in this case) and its predecessors. Since C is being drilled on, the expansion is done for all 3 dimensions. If this coverage class (1) had been entered by drilling on the B hierarchy, it would only be done for the B and A hierarchies. This rule serves to prevent the production of duplicate rows. Once this is done, the Cartesian product of these arrays 5200 is the list of rows produced by this coverage class for this drill path, as shown in FIG. 52.

The depth first search would continue, but this node (for coverage class 1) has no children, so processing returns back up to the parent. FIG. 52 depicts the Cartesian product of the dimension arrays.

Figures 53, 54:
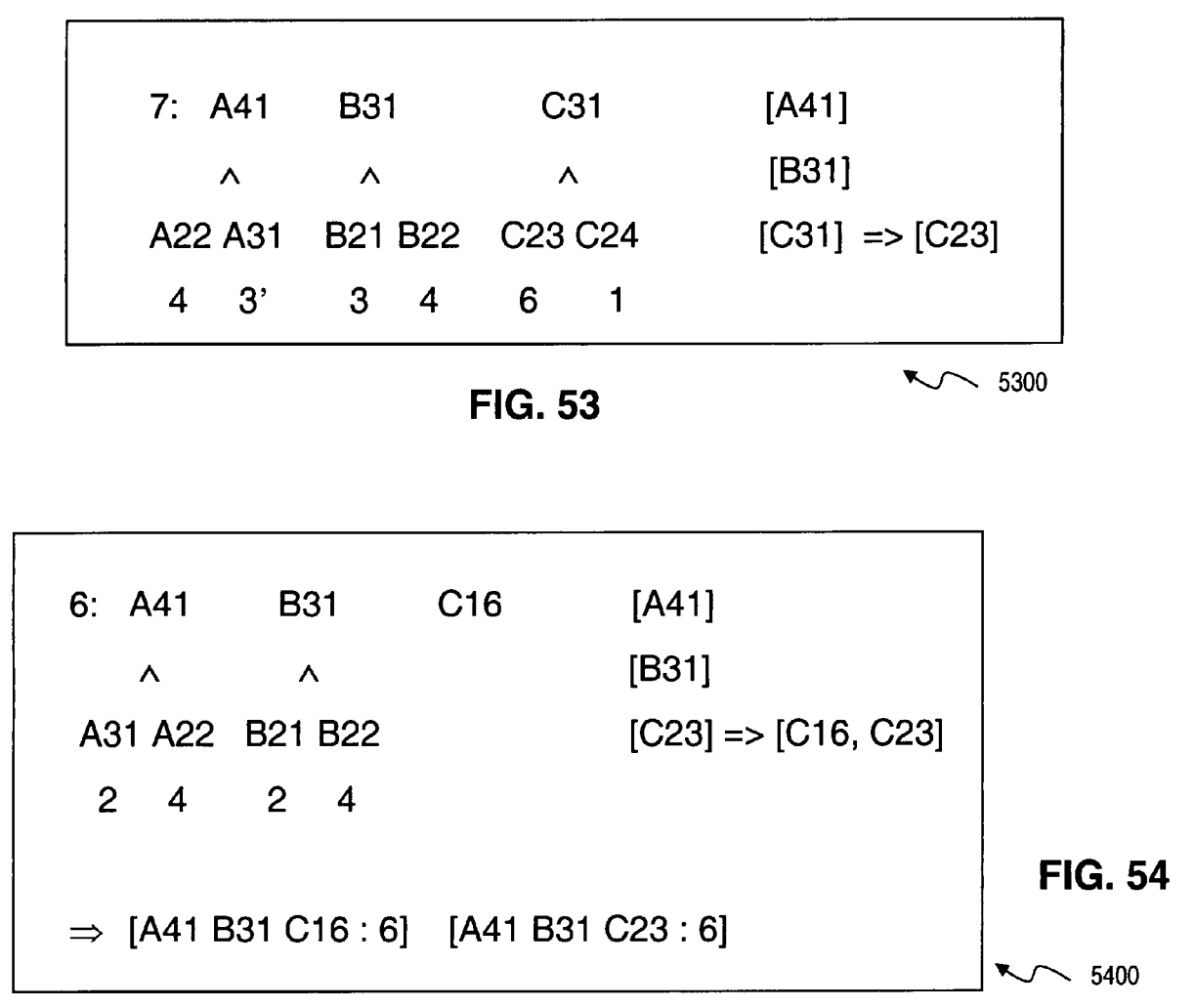

Having stepped down the first child in the C hierarchy, the traversal proceeds 5300 to the next child, as depicted in FIG. 53. The traversal proceeds with the depth first search from coverage class 7 (because coverage class 1 had no children), as shown in FIG. 54. This time the value in the C array is set to C23, the value of the upper bound for coverage class 6. The traversal 5400 thus proceeds as: (1) fill in arrays by pushing up from lower bound; (2) produce cross product output; and (3) begin drilling down children.

Now the process that was used in coverage class 1 is repeated. Interestingly for this example, the lower bound for coverage class 6 has the same values as coverage class 7, and thus only the dimensional array for hierarchy C is expanded. Once the two rows from the array cross product are produced, the arrays are left as they are and then the children classes are drilled.

Figures 55, 56:
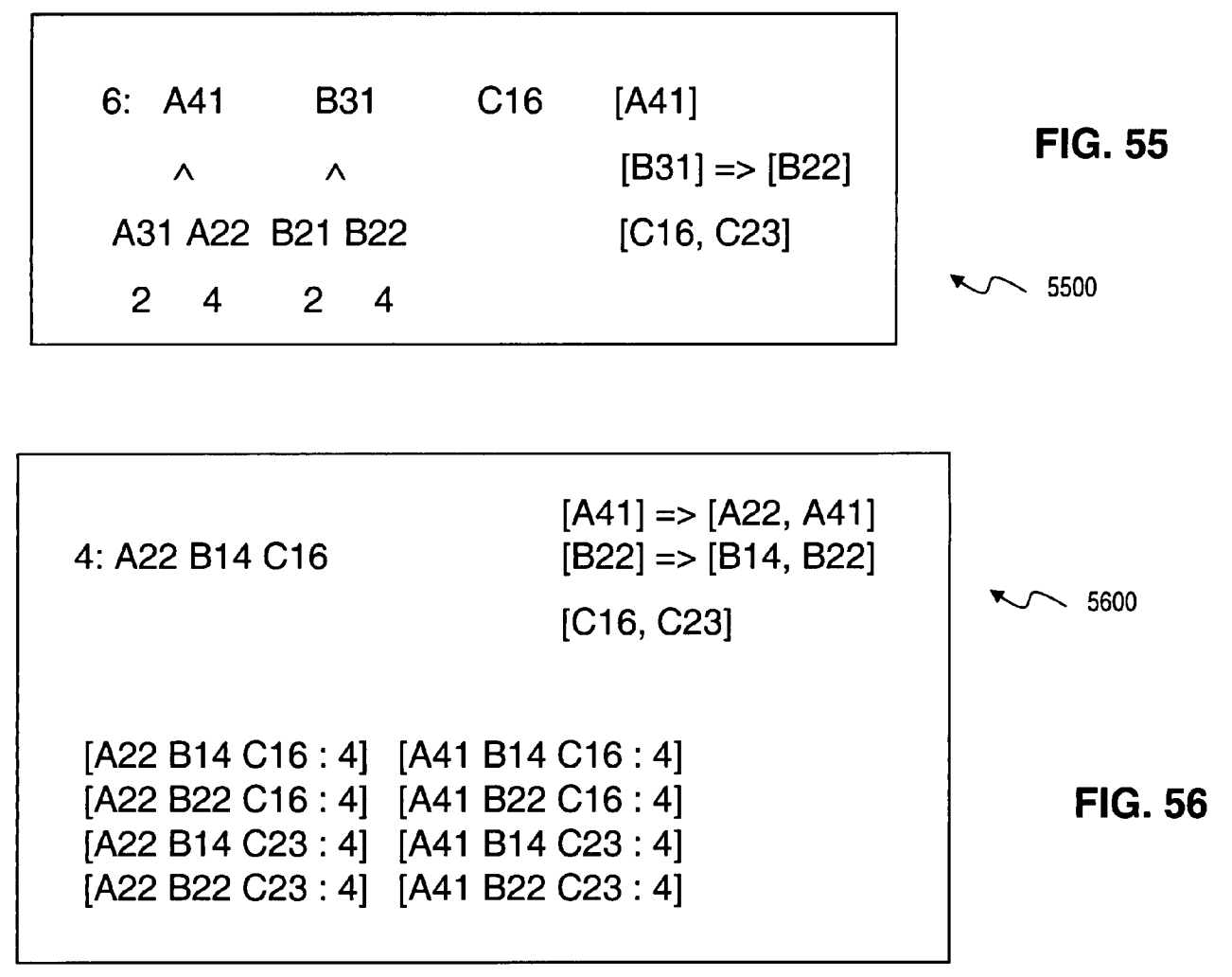

As shown in FIG. 55, the children are drilled down 5500 starting with the most significant hierarchy greater than or equal to the hierarchy that was drilled down to reach this point. Since the traversal is currently at the bottom of the C hierarchy as shown in FIG. 56, and there are still children of this coverage class, the preceding hierarchy is drilled 5600, as shown in FIG. 56, in this case, hierarchy B. Leaving the array for the C hierarchy as it is (with 2 elements) the value in the B array is replaced with that of its child, B22. Thus, when coverage class 4 is entered, the traversal arrives with two upper bounds (i.e., <A41, B22, C16> and <A41, B22, C23>). The traversal thus proceeds as: (1) push up the bounds; (2) produce output rows; and (3) return to parent.

Again, the method is repeated. First the lower bound of coverage class 4 (A22, B14, C16) is compared with the two upper bounds that were created before drilling (<A41, B22, C16> and <A41, B22, C23>). Then the B and A hierarchies are used to expand the arrays to fill in all of the elements in between the drill path. Once the arrays have been expanded, the output rows are produced by taking the cross product of the arrays. Since this is an input coverage class, it has no children and the traversal returns to the parent.

Figure 57:
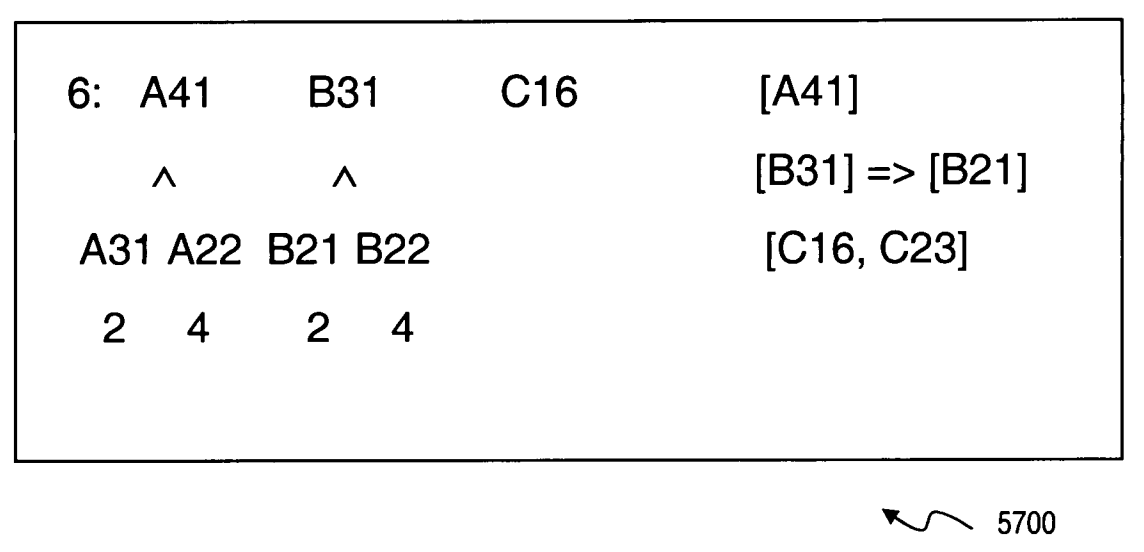

As shown in FIG. 57, the traversal is back 5700 at coverage class 6. This time the value in the B array is replaced with B21 and coverage class 2 is drilled, i.e., the other child down the B hierarchy. The traversal thus proceeds as: (1) push up the bounds; (2) produce output rows; and (3) return to parent.

Figure 58:
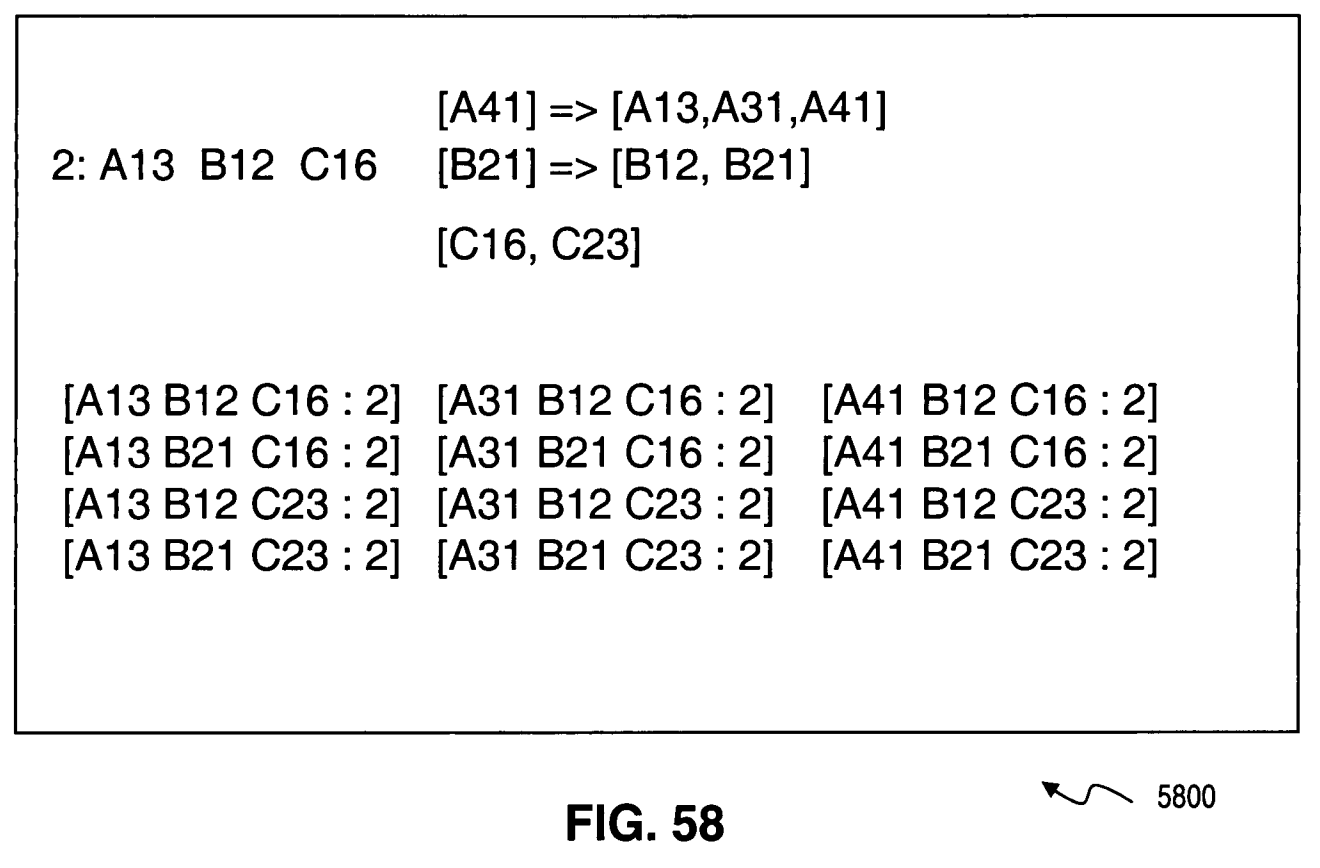

The operation 5800 for coverage class 2 is similar to the one for coverage class 4, as shown in FIG. 58. The B and A arrays are expanded based on the drill path between the lower and upper bounds, the cross product of the arrays is calculated to produce output rows, and because this too is an input coverage class, the traversal returns to the parent coverage class.

Now the traversal has covered the B hierarchies and must perform the same operation 5900 by drilling down the A hierarchy, as shown in FIG. 59. The traversal thus proceeds as: (1) push up the bounds; (2) produce output rows; and (3) return to parent. B is not pushed up, because B is more significant than the current hierarchy (A).

As shown in FIG. 60, this operation 6000 will be essentially the same as those previously discussed with one difference. Because the A hierarchy is being drilled down, the array is not expanded between the lower and upper bounds of the B hierarchy, only the A hierarchy. The lower bound itself, and the corresponding rows between B14 and B31 will be produced by another drill path. Because A22 is the lower bound for coverage class 4, none of the arrays are actually expanded. The two rows produced this time are different from those produced in the previous visit to coverage class 4.

Figure 61:
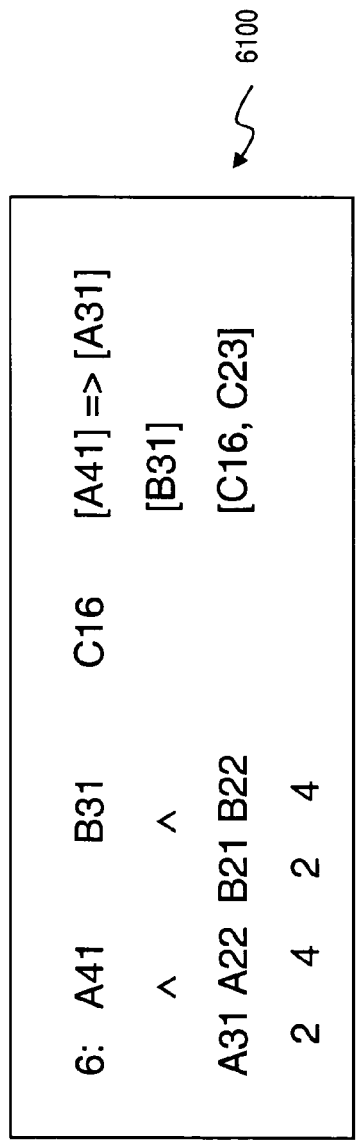
FIG. 61 depicts drilling down the first child of the A hierarchy according to an embodiment of the present invention.
Figure 62:
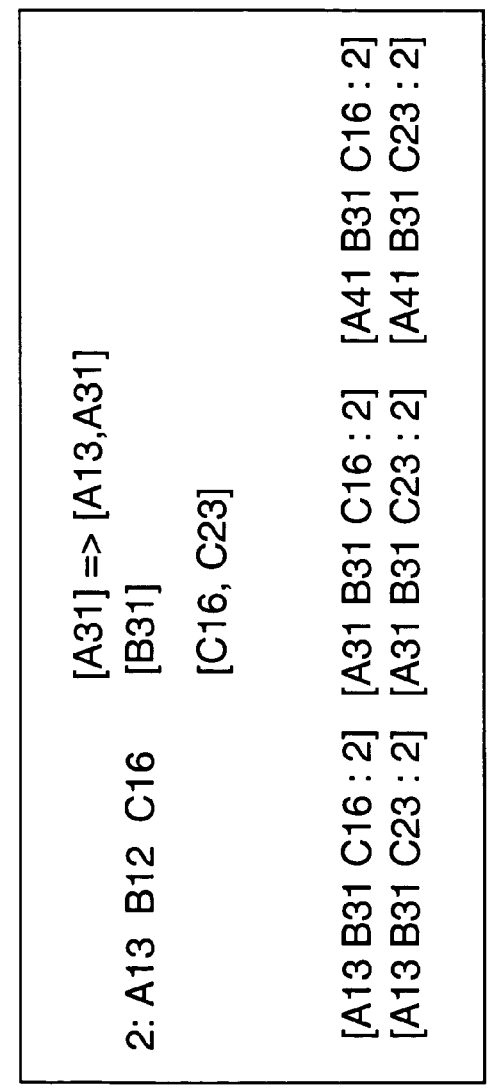
FIG. 62 depicts visiting coverage class 2, expanding the A array and producing a cross product according to an embodiment of the present invention.

To complete the scan for this drill path into coverage class 6, the first child of the A hierarchy, A31, is drilled down 6100 as shown in FIG. 61. The traversal proceeds as: (1) push up the bounds; (2) produce output rows; and (3) return to parent. This visit 6200 to coverage class 2, as shown in FIG. 62 is similar to the last one. The A array is expanded with the nodes between the lower and upper bounds on the A dimension and then the cross product of the rows is produced. After completing this, the traversal returns 6300 to the parent, as shown in FIG. 63.

Now all of the children in class 6 for this drill path have been traversed, so the traversal returns 6400 to the parent node, coverage class 7, as shown in FIG. 64. The traversal is complete for the C hierarchy, and so continues on to the B hierarchy.

As shown in FIG. 65, now that the C hierarchy for coverage class 7 is finished, the traversal drills down the B hierarchy 6500 into coverage class 4. The traversal proceeds as: (1) push up the bounds; (2) produce output rows; and (3) return to parent.

C is not pushed up, because C is more significant than the current hierarchy (B). This is the third time the traversal has visited coverage class 4. However, the two previous trips were down the C hierarchy. This time, the traversal is drilling down the B hierarchy which means the array for the C dimension is not expanded. The operations at this point are similar to those previously discussed. None of these rows 6600 have been previously produced, as shown in FIG. 66.

Figure 67:
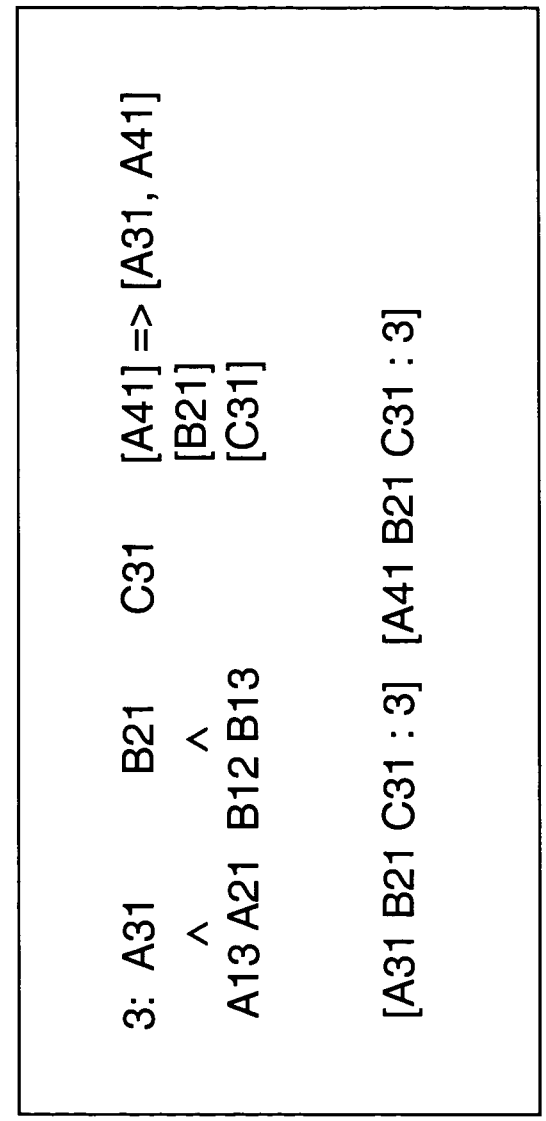
FIG. 67 depicts drilling down to coverage class 6 according to an embodiment of the present invention.

The traversal next drills down the B hierarchy 6700 to coverage class 3, as shown in FIG. 67. The traversal proceeds by pushing up the bounds, producing output rows, recursing down children, and returning to the parent. The operation continues as previously discussed. After expanding the arrays appropriately, the traversal produces the output rows, recursively descends to the child coverage classes producing rows, and eventually returns to the parent. Thus, the traversal continues until the entire tree is scanned.

Figure 68:
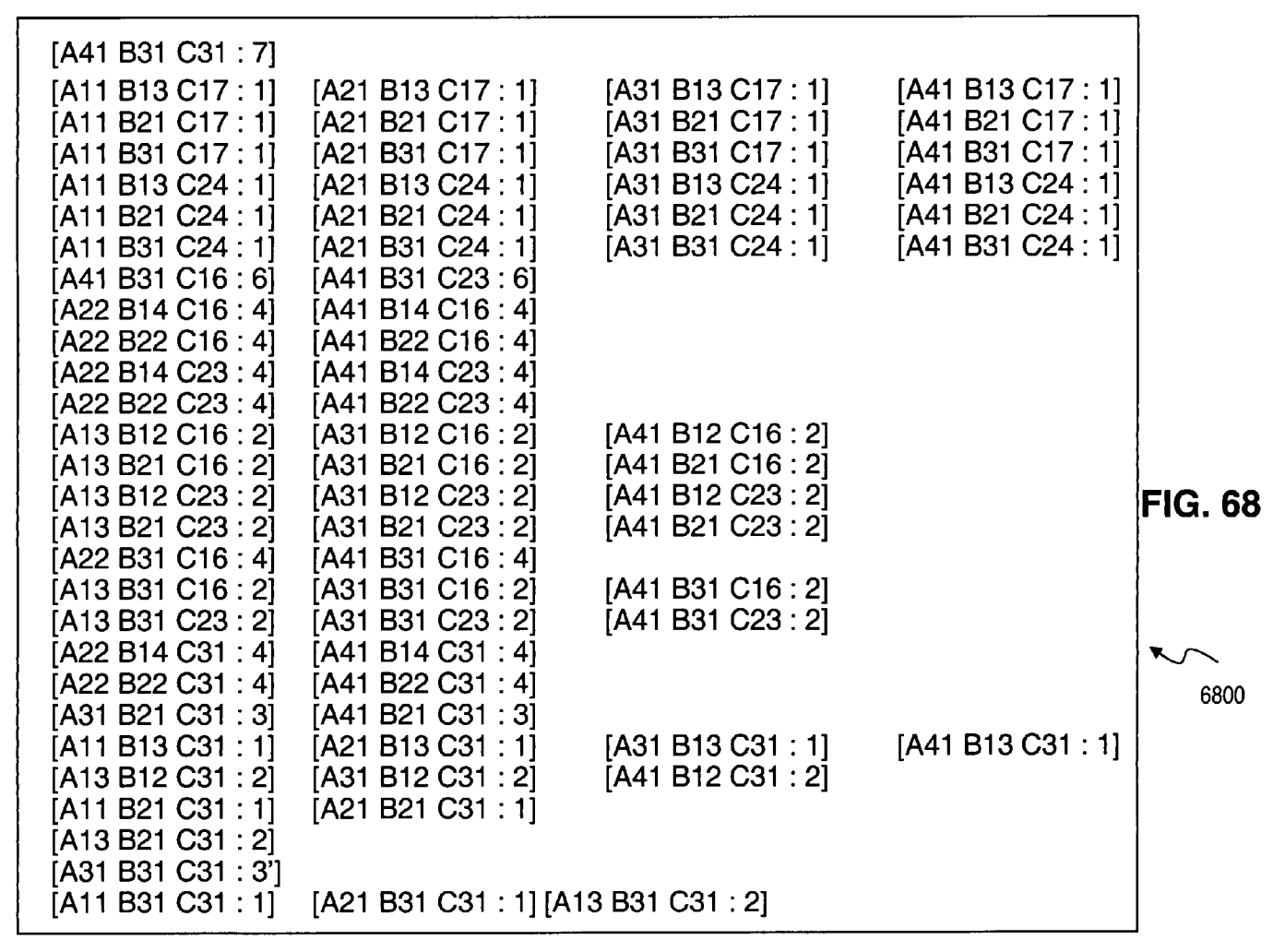

FIG. 68 depicts the list 6800 of the 75 rows produced by the traversal of the compressed cube index. In an analytical context a user typically works with a symmetric subset of data defined by status on each of the base dimensions (status on a dimension is a subset of dimension values). For example, a typical range query would be similar in form to:

WHERE a in ('A11', 'A21') and b in ('B31') and c in ('C11', 'C12', 'C13', 'C14')

A partial range scan may be performed similarly to a full cube scan with the following changes:

When the Cartesian output of a coverage class is created the base dimensions are pruned to the values actually represented in the range. So if processing would normally output cells for [A13, A21, A31], but only A21 is within the query range, then the Cartesian output is pruned down to just A21.

When descending the children of a coverage class, the scan does not descend if a hierarchy that has just been finished descending has a range that has been completely pruned. So if the C hierarchy has been scanned down until the correct lower bound is found and now the B hierarchy would be drilled down, but the Cartesian product on C had no values within the query range, then no children down B or A will be in the query range either so those sub-trees are not descended.

It is not uncommon within an OLAP space for multiple hierarchies to exist on a single attribute or dimension, for example time might have separate hierarchies for fiscal and calendar years. These hierarchies may be modeled in an OLAP engine as multidimensional hierarchies. The compressed cube may also deal with this situation. An exemplary first step is to validate that the hierarchies are acyclic, which may be accomplished by constructing a Directed Acyclic Graph (DAG) and checking for cycles. Second, any inconsistencies within the hierarchies may be resolved. For example, if a calendar hierarchy defines Q1 as the aggregation of JAN, FEB, and MAR, while a fiscal hierarchy defines Q1 as the aggregation of MAR, APR, and MAY, then the aggregation of Q1 is inconsistent between the hierarchies. This is resolved by ordering the hierarchies with later hierarchies dominating over earlier hierarchies.

This causes a number of small variations in the aggregation and query algorithms. When processing is in the ROLLUP phase it is now possible for a given dimension position to have multiple parents, and processing pushes the dimension value up to all of them. This will cause multiple entries to exist for a given coverage class at the next level.

Multiple hierarchies cause multiple top nodes on a dimension, which in turn yields multiple top nodes in the compressed cube tree. The upper bounds of all the topmost nodes are stored within a b-tree so that processing can locate the correct node to drill from during queries. When querying the correct node to drill from is selected by pushing up the 'first' hierarchy at every level. Once the ultimate upper bound of the query point has been found this bound is located in the top-node b-tree. If the bound is not found then NULL is returned, otherwise that node is used as the root of the tree.

When drilling, drill down is only done if the parent being drilled on was the 'first' parent of a particular child. This ensures that there is a unique path to any dimension value.

The compressed cube technology can be implemented as a new dimension type. This dimension is created over a list of base hierarchies rather than a list of base dimensions. It is possible to access the compressed cube dimension both by point access, and by range access. However, the order that rows are returned from a range scan may be in an effectively random order.

Although the previous discussion focuses on implementing compressed cubes as purely multi-dimensional database structures, the algorithms may be implemented in either a purely relational or a hybrid multi-dimensional or relational structure. An approach called compressed cube index involves creating multiple database objects that include similar information to the compressed cube dimension. The tables can be implemented by standard database table, a tree-structured index, or by an index-only table.

One database object has the lower bound of each class. The primary key is the class ID, and the data is the lower bounds, as well as any measures. Another database object has the children of each class down each hierarchy. (This can be implemented as N database objects, one of each dimension). The primary key is the class ID, dimension to descend, and child dimension value in that dimension. The payload is the node ID of the child.

The build alternates between phases of calculating all classes at a level, and inserting the newly generated classes into the database objects. In order to calculate the new classes at level N, processing may be able to query the partially built database objects that have all classes at level N−1. This discourages index creation that relies on sorting all the input rows as part of the index build. Instead, an array insert of all the new values for the new level is performed. The rows will be inserted in order. Since coverage class ID will be monotonically increasing, as if clustering is begun for the pure analytical case, a mechanism is provided to not cluster during builds of the compressed cube index.

During both the build and query phases, processing is enhanced by having quick access to the ancestors of each dimension value. A good way is the analytical workspace technique, which does it in a very small constant time by having an array that is paged but usually in cache. One approach is to develop a hybrid implementation that uses multi-dimensional data structures to enable fast parent-child lookups. Alternatively, a purely relational implementation could be created by having a new database object per dimension to include parent information. The former approach may be faster, but it may utilize more infrastructure than ideal for a build of the compressed cube index.

If clustering is begun for the pure analytical workspace case, a mechanism to not cluster during builds of the compressed cube index may be provided.

This section has described the compressed cube storage in terms of classes and lower bounds as they were stored directly on disk. In an alternative embodiment as shown in FIG. 69 the compressed cube access structures are stored within a relational database. This approach uses two indexed tables (or index organized tables) 6902 and 6904 to store information regarding coverage classes. The first table 6902 includes data for each class. Each row represents a single class, and includes its lower bound on each dimension, the node ID (Class ID), and the value(s) of the measure(s) (not shown). The second table 6904 contains information regarding the children of each class, including a plurality of rows for each class, each row representing one child that can be searched down a particular dimension. The table 6904 contains a column for class ID, a column to indicate which dimension/hierarchy this is a child of, and a column to indicate what the child value is. The two tables 6902, 6904 enable efficient access to each coverage class via the ID of the coverage class. Additionally, the tables 6902, 6904 enable an efficient drill down through the hierarchies using the second table. As an alternative embodiment, the second table can be split into multiple tables, one per dimension. An indicator of the top node 6906 enables a query request to initiate a search at the appropriate node (e.g., node 7 for this example).

Hardware Overview

Figure 70:
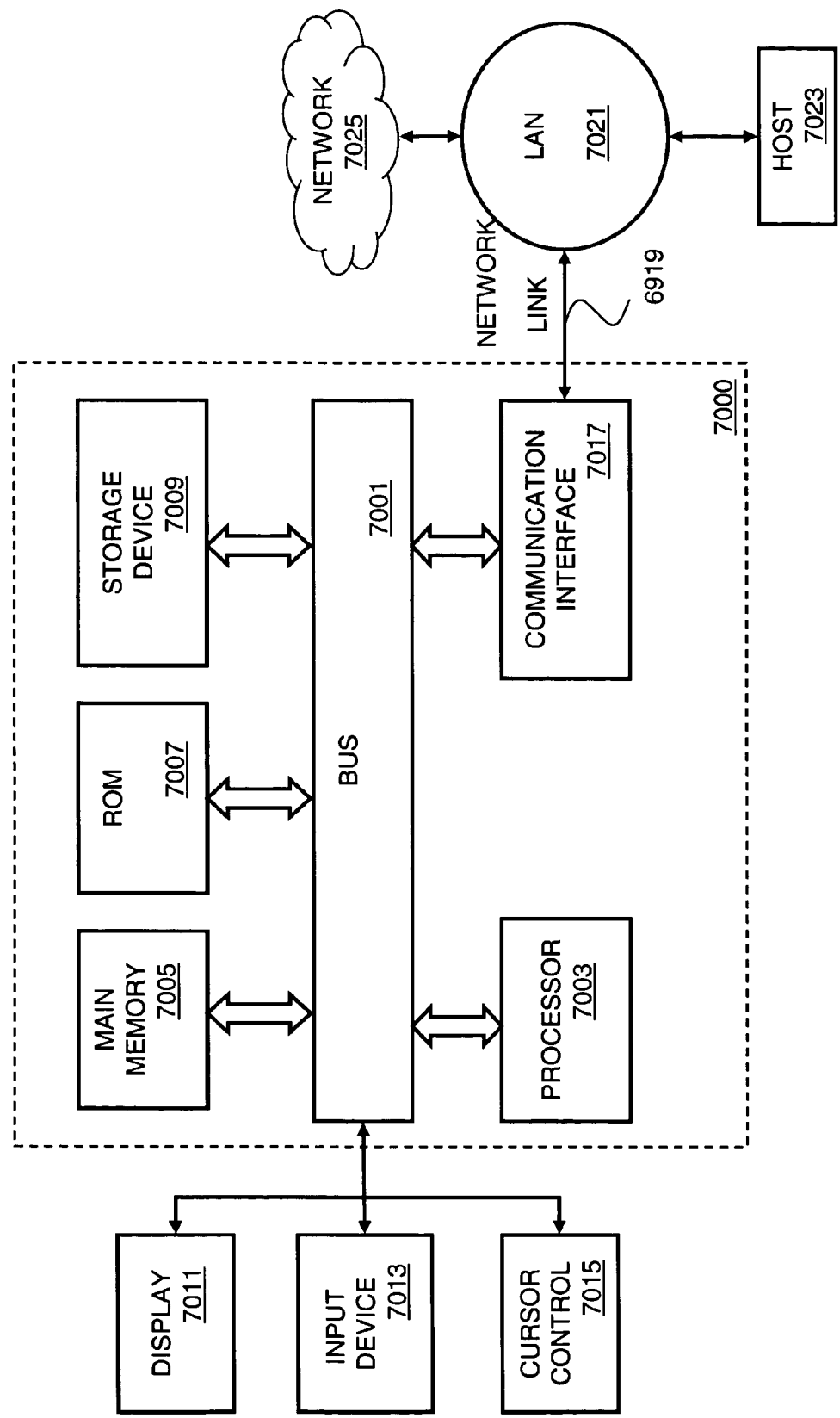
FIG. 70 depicts a computer system that can be used to implement an embodiment of the present invention.

FIG. 70 illustrates a computer system 7000 upon which an embodiment according to the present invention can be implemented. The computer system 7000 includes a bus 7001 or other communication mechanism for communicating information and a processor 7003 coupled to the bus 7001 for processing information. The computer system 7000 also includes main memory 7005, such as a random access memory (RAM) or other dynamic storage device, coupled to the bus 7001 for storing information and instructions to be executed by the processor 7003. Main memory 7005 can also be used for storing temporary variables or other intermediate information during execution of instructions by the processor 7003. The computer system 7000 may further include a read only memory (ROM) 7007 or other static storage device coupled to the bus 7001 for storing static information and instructions for the processor 7003. A storage device 7009, such as a magnetic disk or optical disk, is coupled to the bus 7001 for persistently storing information and instructions.

The computer system 7000 may be coupled via the bus 7001 to a display 7011, such as a cathode ray tube (CRT), liquid crystal display, active matrix display, or plasma display, for displaying information to a computer user. An input device 7013, such as a keyboard including alphanumeric and other keys, is coupled to the bus 7001 for communicating information and command selections to the processor 7003. Another type of user input device is a cursor control 7015, such as a mouse, a trackball, or cursor direction keys, for communicating direction information and command selections to the processor 7003 and for controlling cursor movement on the display 7011.

According to one embodiment of the invention, a compressed cube index is provided by the computer system 7000 in response to the processor 7003 executing an arrangement of instructions contained in main memory 7005. Such instructions can be read into main memory 7005 from another computer-readable medium, such as the storage device 7009. Execution of the arrangement of instructions contained in main memory 7005 causes the processor 7003 to perform the process steps described herein. One or more processors in a multi-processing arrangement may also be employed to execute the instructions contained in main memory 7005. In alternative embodiments, hard-wired circuitry may be used in place of or in combination with software instructions to implement the embodiment of the present invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the present invention are not limited to any specific combination of hardware circuitry and software.

The computer system 7000 also includes a communication interface 7017 coupled to bus 7001. The communication interface 7017 provides a two-way data communication coupling to a network link 7019 connected to a local network 7021. For example, the communication interface 7017 may be a digital subscriber line (DSL) card or modem, an integrated services digital network (ISDN) card, a cable modem, a telephone modem, or any other communication interface to provide a data communication connection to a corresponding type of communication line. As another example, communication interface 7017 may be a local area network (LAN) card (e.g. for Ethernet™ or an Asynchronous Transfer Model (ATM) network) to provide a data communication connection to a compatible LAN. Wireless links can also be implemented. In any such implementation, communication interface 7017 sends and receives electrical, electromagnetic, or optical signals that carry digital data streams representing various types of information. Further, the communication interface 7017 can include peripheral interface devices, such as a Universal Serial Bus (USB) interface, a PCMCIA (Personal Computer Memory Card International Association) interface, etc. Although a single communication interface 7017 is depicted in FIG. 70, multiple communication interfaces can also be employed.

The network link 7019 typically provides data communication through one or more networks to other data devices. For example, the network link 7019 may provide a connection through local network 7021 to a host computer 7023, which has connectivity to a network 7025 (e.g. a wide area network (WAN) or the global packet data communication network now commonly referred to as the "Internet") or to data equipment operated by a service provider. The local network 7021 and the network 7025 both use electrical, electromagnetic, or optical signals to convey information and instructions. The signals through the various networks and the signals on the network link 7019 and through the communication interface 7017, which communicate digital data with the computer system 7000, are exemplary forms of carrier waves bearing the information and instructions.

The computer system 7000 can send messages and receive data, including program code, through the network(s), the network link 7019, and the communication interface 7017. In the Internet example, a server (not shown) might transmit requested code belonging to an application program for implementing an embodiment of the present invention through the network 7025, the local network 7021 and the communication interface 7017. The processor 7003 may execute the transmitted code while being received and/or store the code in the storage device 7009, or other non-volatile storage for later execution. In this manner, the computer system 7000 may obtain application code in the form of a carrier wave.

The term "computer-readable medium" as used herein refers to any medium that participates in providing instructions to the processor 7005 for execution. Such a medium may take many forms, including but not limited to non-volatile media, volatile media, and transmission media. Non-volatile media include, for example, optical or magnetic disks, such as the storage device 7009. Volatile media include dynamic memory, such as main memory 7005. Transmission media include coaxial cables, copper wire and fiber optics, including the wires that comprise the bus 7001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by a processor.

While the present invention has been described in connection with a number of embodiments and implementations, the present invention is not so limited but covers various obvious modifications and equivalent arrangements, which fall within the purview of the appended claims.

What is claimed is:

1. A method of generating an index for a body of data, said method comprising:
   receiving a plurality of values associated with a plurality of respective attributes characterized by a plurality of respective hierarchies;
   generating entries in the index, the entries including a parent entry having lower bounds associated respectively with the values, each lower bound of said lower bounds representing a lowest point in a hierarchy having a particular value at which aggregation occurs, which is indicated by a plurality of matching rows with identical attribute or dimension values, and located at respective positions within the respective hierarchies;
   determining child positions, wherein one of the child positions is associated with one of the lower bounds of the parent entry and is located at a first position in one of the respective hierarchies, and the one of the child positions is strictly included within the one of the lower bounds of the parent entry within the one of the respective hierarchies;
   generating child entries based on the parent entry, wherein one of the child entries includes a child lower bound that is located at a second position in one of the respective hierarchies and the child lower bound is strictly included within the one of the lower bounds within said one of the respective hierarchies; and
   storing the one of the child positions in association with the parent entry and the one of the child entries.

2. The method according to claim 1, wherein each of the child entries includes a respective child lower bound of the child lower bounds that is located at a respective second position and the respective child lower bound is strictly included within a corresponding one of the lower bounds.

3. The method according to claim 2, further comprising:
   storing each of the child positions in association with the parent entry and the respective one of the child lower bounds.

4. The method according to claim 1, wherein the parent entry of the index represents a first coverage class and one of the child entries represents a second coverage class.

5. The method according to claim 1, wherein the one of the child positions indicates a position in the one of the respective hierarchies that is located in a level in the one of the respective hierarchies that is adjacent to a level of location of the associated one of the lower bounds of the parent entry.

6. The method according to claim 1, wherein the generating the entries includes pushing up at least one of the respective hierarchies.

7. The method according to claim 6, wherein the determining the child positions includes determining the child positions based on said pushing up the at least one of the respective hierarchies.

8. The method according to claim 6, wherein the determining the child positions includes drilling down at least one of the respective hierarchies.

9. The method according to claim 8, wherein:
   the drilling down is performed in an attribute drill down ordering on the respective attributes that is a reversal of an attribute pushup ordering of the respective attributes of a previously pushed up attribute, and
   the drilling down is performed in a hierarchy drill down ordering that is a reversal of a hierarchy pushup ordering of the respective hierarchies utilized when pushing up the respective hierarchies.

10. The method according to claim 1, wherein the generating the child entries includes processing the associated at least one of the lower bounds and a plurality of child values, each located in a descendant level to the associated at least one of the lower bounds within the one of the respective hierarchies.

11. The method according to claim 1, wherein the determining the child positions includes processing the associated one of the lower bounds and a plurality of child values, each located in a descendant level to the associated one of the lower bounds within the one of the respective hierarchies.

12. The method according to claim 11, further comprising:
   determining whether the child positions associated with a parent lower bound match; and
     when the child positions associated with the parent lower bound match, then replacing the parent lower bound with a value of the child positions associated with the parent lower bound, wherein the lower bounds includes the parent lower bound included in one of the parent entries.

13. The method according to claim 1, wherein said storing the one of the child positions includes storing a supplemental entry with the one of the child positions, a first indicator of the parent entry, and a second indicator of the one of the child entries.

14. The method according to claim 1, wherein one of the respective attributes includes a dimension of a multidimensional database, a column of a relational database table, or a field of a record, or said one of the respective hierarchies includes a predefined hierarchy or an implicit hierarchy.

15. A non-transitory computer-readable storage medium bearing an index for a body of data defined by attributes, said attributes characterized by respective hierarchies, said index comprising:
   a first indicator of a parent coverage class, wherein the parent coverage class specifies parent lower bounds, each of the parent lower bounds located in one of the respective hierarchies characterizing the attributes and representing a lowest point in the one of the respective hierarchies having a particular value at which aggregation occurs, which is indicated by a plurality of matching rows with identical attribute or dimension values;
   a child position within one of the respective hierarchies for a corresponding one of the attributes, wherein the child position is strictly included in one of the parent lower bounds specified for the corresponding one of the attributes; and
   a second indicator of a child coverage class, wherein the child coverage class specifies child lower bounds, each of the child lower bounds located in one of the respective hierarchies characterizing the attributes.

16. The computer-readable storage medium according to claim 15, wherein the index further comprises the first indicator of the parent coverage class in association with the parent lower bounds.

17. The computer-readable storage medium according to claim 16, wherein the index further comprises a measure associated with the parent coverage class.

18. The computer-readable storage medium according to claim 16, wherein:
   a first instance of the first indicator, the child position, and the second indicator is stored in a first file structure, and
   a second instance of the first indicator and the parent lower bounds is stored in a second file structure other than the first file structure.

19. The computer-readable storage medium according to claim 18, wherein the first file structure includes one of a database table, a tree-structured index, or an index-only table.

20. The computer-readable storage medium according to claim 18, wherein the first file structure includes a plurality of separate file structures, each of the separate file structures corresponding to one of the attributes.

21. The computer-readable storage medium according to claim 15, wherein one of the child lower bounds in the child coverage class is included within the child position within the one of the respective hierarchies.

22. The computer-readable storage medium according to claim 15, wherein one of the attributes includes a dimension of a multidimensional database, a column of a relational database table, or a field of a record, and wherein one of the respective hierarchies includes a predefined hierarchy or an implicit hierarchy.

23. A method of searching for an item using an index for a body of data defined by a plurality of attributes, said attributes characterized by respective hierarchies, the method implemented in a computer system comprising a processor, a memory, and computer program instructions for performing said method, said method comprising:
   comparing a value of the item in a first attribute with a first attribute lower bound value associated with a first node of the index, the first attribute lower bound representing a lowest point in a hierarchy having the value at which aggregation occurs, which is indicated by a plurality of matching rows with identical attribute or dimension values; and
   when the value of the item in the first attribute is lower in the hierarchy of the first attribute than the first attribute lower bound value associated with the first node of the index, performing:
   determining whether a child value of the first attribute lower bound value associated with the first node of the index is included in a path from the value of the item in the first attribute to the first attribute lower bound value associated with the first node of the index based on the hierarchy of the first attribute, and
   when the child value is included in the path, comparing the value of the item in the first attribute with a first attribute lower bound value associated with a second node of the index, based on an indicator of a coverage class associated with the child value included in the first node of the index.

24. The method according to claim 23, further comprising:
   if the value of the item in the first attribute is at least as high in the hierarchy of the first attribute as the first attribute lower bound value associated with the second node of the index, performing:
   comparing the value of the item in a second attribute with a second attribute lower bound value associated with the second node of the index.

25. The method according to claim 24, wherein an ordering of the first attribute and the second attribute is determined as a reversal of an ordering of the respective hierarchies utilized in generating the index.

26. The method according to claim 24, further comprising, after said comparing the value of the item in the second attribute with the second attribute lower bound value associated with the second node of the index,
   when the value of the item in the second attribute is a value other than values included in a path in the hierarchy of the second attribute as traversed by a drill path, returning a null value.

27. The method according to claim 23, wherein one of the attributes includes a dimension of a multidimensional database, a column of a relational database table, or a field of a record, and wherein one of the respective hierarchies includes a predefined hierarchy or an implicit hierarchy.

28. A method of traversing a body of data defined by a plurality of attributes, said plurality of attributes characterized by respective hierarchies, using an index, comprising:
   initializing an array on each of the plurality of attributes based on a lower bound value of each attribute which is associated with a child node of a plurality of nodes included in the index, each lower bound of said lower bounds representing a lowest point in a hierarchy having a particular value at which aggregation occurs, which is indicated by a plurality of matching rows with identical attribute or dimension values, and a path from each lower bound of said lower bounds value of the child node to a value of a parent node
   lower bound value in each of the respective hierarchies, wherein the child node is determined by accessing a child coverage class indicator associated with the parent node; and generating a cross product of rows based on the array on each one of the plurality of attributes.

29. The method according to claim 28, wherein one of the plurality of attributes includes a dimension of a multidimensional database, a column of a relational database table, or a field of a record, and wherein one of the respective hierarchies includes a predefined hierarchy or an implicit hierarchy.

30. The method according to claim 28, further comprising:
before initializing based on a lower bound value and a path from each lower bound of said lower bounds value of the child node to the value of the parent node lower bound value, performing:
initializing an array on each one of the plurality of attributes based on a lower bound value of each attribute for a start node of the index.

31. The method according to claim 28, further comprising drilling down based on each child coverage class indicator associated with the child node.

32. The method according to claim 31, wherein said drilling down is performed in an order that is determined as a reversal of an ordering of the respective hierarchies utilized in generating the index.

33. The method according to claim 28, further comprising:
receiving a set of query values associated with one of the attributes, and wherein said generating the cross product further comprises generating the cross product of rows based on the array on each one of the plurality of attributes and the set of query values.

34. A non-transitory computer-readable storage medium storing sequences of instructions for generating an index for a body of data, wherein the sequences of instructions, which when executed by one or more processors, cause:
receiving a plurality of values associated with a plurality of respective attributes characterized by a plurality of respective hierarchies;
generating entries in the index, the entries including a parent entry having lower bounds associated respectively with the values, each lower bound of said lower bounds representing a lowest point in a hierarchy having a particular value at which aggregation occurs, which is indicated by a plurality of matching rows with identical attribute or dimension values, and located at respective positions within the respective hierarchies;
determining child positions, wherein one of the child positions is associated with one of the lower bounds of the parent entry and is located at a first position in one of the respective hierarchies, and the one of the child positions is strictly included within the one of the lower bounds of the parent entry within the one of the respective hierarchies;
generating child entries based on the parent entry, wherein one of the child entries includes a child lower bound that is located at a second position in one of the respective hierarchies and the child lower bound is strictly included within the one of the lower bounds within said one of the respective hierarchies; and
storing the one of the child positions in association with the parent entry and the one of the child entries.

35. The non-transitory computer-readable storage medium according to claim 34, wherein each of the child entries includes a respective child lower bound of the child lower bounds that is located at a respective second position and the respective child lower bound is strictly included within a corresponding one of the lower bounds.

36. The non-transitory computer-readable storage medium according to claim 35, wherein the sequences of instructions include instructions, that when executed by one or more processors, cause:
storing each of the child positions in association with the parent entry and the respective one of the child lower bounds.

37. The non-transitory computer-readable storage medium according to claim 34, wherein the parent entry of the index represents a first coverage class and one of the child entries represents a second coverage class.

38. The non-transitory computer-readable storage medium according to claim 34, wherein the one of the child positions indicates a position in the one of the respective hierarchies that is located in a level in the one of the respective hierarchies that is adjacent to a level of location of the associated one of the lower bounds of the parent entry.

39. The non-transitory computer-readable storage medium according to claim 34, wherein the generating the entries includes pushing up at least one of the respective hierarchies.

40. The non-transitory computer-readable storage medium according to claim 39, wherein the determining the child positions includes drilling down at least one of the respective hierarchies.

41. The non-transitory computer-readable storage medium according to claim 40, wherein the sequences of instructions include instructions, that when executed by one or more processors, cause:
the drilling down to be preformed in an attribute drill down ordering on the respective attributes that is a reversal of an attribute pushup ordering on the respective attributes of a previously pushed up attribute, and
the drilling down to be performed in a hierarchy drill down ordering that is a reversal of a hierarchy pushup ordering of the respective hierarchies utilized when pushing up the respective hierarchies.

42. The non-transitory computer-readable storage medium according to claim 35, wherein the generating the child entries includes processing the associated at least one of the lower bounds and a plurality of child values, each located in a descendant level to the associated at least one of the lower bounds within the one of the respective hierarchies.

43. The non-transitory computer-readable storage medium according to claim 42, wherein the determining the child positions includes determining the child positions based on said pushing up the at least one of the respective hierarchies.

44. The non-transitory computer-readable storage medium according to claim 34, wherein the determining the child positions includes processing the associated one of the lower bounds and a plurality of child values, each located in a descendent level to the associated one of the lower bounds within the one of the respective hierarchies.

45. The non-transitory computer-readable storage medium according to claim 44, wherein the sequences of instructions include instructions, that when executed by one or more processors, cause:
determining whether the child positions associated with a parent lower bound match; and
when the child positions associated with the parent lower bound match, then replacing the parent lower bound with a value of the child positions associated with the parent lower bound, wherein the lower bounds includes the parent lower bound included in one of the parent entries.

46. The non-transitory computer-readable storage medium according to claim 34, wherein said storing the one of the child positions includes storing a supplemental entry with the one of the child positions, a first indicator of the parent entry, and a second indicator of the one of the child entries.

47. The non-transitory computer-readable storage medium according to claim 34, wherein one of the respective attributes includes a dimension of a multidimensional database, a column of a relational database table, or a field of a record, or said one of the respective hierarchies includes a predefined hierarchy or an implicit hierarchy.

48. A non-transitory computer-readable storing medium storing sequences of instructions for searching for an item using an index for a body of data defined by a plurality of attributes, said attributes characterized by respective hierarchies, said sequences of instructions when executed by one or more processors cause:
    comparing a value of the item in a first attribute with a first attribute lower bound value associated with a first node of the index, the first attribute lower bound representing a lower point in a hierarchy having the value at which aggregation occurs, which is indicated by a plurality of matching rows with identical attribute or dimension values; and
    when the value of the item in the first attribute is lower in the hierarchy of the first attribute than the first attribute lower bound value associated with the first node of the index, performing:
    determining whether a child value of the first attribute lower bound value associated with the first node of the index is included in a path from the value of the item in the first attribute to the first attribute lower bound value associated with the first node of the index based on the hierarchy of the first attribute, and
    when the child value is included in the path, comparing the value of the item in the first attribute with a first attribute lower bound value associated with a second node of the index, based on an indicator of a coverage class associated with the child value included in the first node of the index.

49. The non-transitory computer-readable storage medium according to claim 48, wherein the sequences of instructions include instructions, that when executed by one or more processors, cause:
    if the value of the item in the first attribute is at least as high in the hierarchy of the first attribute as the first attribute lower bound value associated with the second node of the index, performing:
    comparing the value of the item in a second attribute with a second attribute lower bound value associated with the second node of the index.

50. The non-transitory computer-readable storage medium according to claim 49, wherein the sequences of instructions include instructions, that when executed by one or more processors, cause an ordering of the first attribute and the second attribute to be determined as a reversal of an ordering of the respective hierarchies utilized in generating the index.

51. The non-transitory computer-readable storage medium according to claim 49, wherein the sequences of instructions include instructions, that when executed by one or more processors, cause after said comparing the value of the item in the second attribute with the second attribute lower bound value associated with the second node of the index, when the value of the item in the second attribute is a value other than values included in a path in the hierarchy of the second attribute as traversed by a drill path, returning a null value.

52. The non-transitory computer-readable storage medium according to claim 48, wherein one of the attributes includes a dimension of a multidimensional database, a column of a relational database table, or a field of a record, and wherein one of the respective hierarchies includes a predefined hierarchy or an implicit hierarchy.

53. A non-transitory computer-readable storage medium storing sequences of instructions for traversing a body of data defined by a plurality of attributes, said plurality of attributes characterized by respective hierarchies, using an index, said sequences of instructions, which when executed by one or more processors cause:
    initializing an array on each of the plurality of attributes based on a lower bound value of each attribute which is associated with a child node of a plurality of nodes included in the index, each lower bound of said lower bounds representing a lowest point in a hierarchy having a particular value at which aggregation occurs, which is indicated by a plurality of matching rows with identical attribute or dimension values, and a path from each lower bound of said lower bounds value of the child node to a value of a parent node
    lower bound value in each of the respective hierarchies, wherein the child node is determined by accessing a child coverage class indicator associated with the parent node; and
    generating a cross product of rows based on the array on each one of the plurality of attributes.

54. The non-transitory computer-readable storage medium according to claim 53, wherein one of the plurality of attributes includes a dimension of a multidimensional database, a column of a relation database table, or a field of a record, and wherein one of the respective hierarchies includes a predefined hierarchy or an implicit hierarchy.

55. The non-transitory computer-readable storage medium according to claim 53, wherein the sequences of instructions include instructions, that when executed by one or more processors, cause:
    before initializing based on a lower bound value and a path from each lower bound of said lower bounds value of the child node to the value of the parent node lower bound value, performing:
    initializing an array on each one of the plurality of attributes based on a lower bound value of each attribute for a start node of the index.

56. The non-transitory computer-readable storage medium according to claim 53, wherein the sequences of instructions include instructions, that when executed by one or more processors, cause drilling down based on each child coverage class indicator associated with the child node.

57. The non-transitory computer-readable storage medium according to claim 56 wherein the sequences of instructions include instructions, that when executed by one or more processors, cause drilling down to be performed in an order that is determined as a reversal of an ordering of the respective hierarchies utilized in generated the index.

58. The non-transitory computer-readable storage medium according to claim 53, wherein the sequences of instructions include instructions, that when executed by one or more processors, cause:
    receiving a set of query values associated with one of the attributes, and wherein said generating the cross product further comprises generating the cross product of rows based on the array on each one of the plurality of attributes and the set of query values.

* * * * *